US012207069B2

(12) United States Patent
Degner et al.

(10) Patent No.: US 12,207,069 B2
(45) Date of Patent: Jan. 21, 2025

(54) HEADPHONES

(71) Applicant: APPLE INC., Cupertino, CA (US)

(72) Inventors: Brett W. Degner, Menlo Park, CA (US); Michael E. Leclerc, Sunnyvale, CA (US); David H. Narajowski, Los Gatos, CA (US); Kristopher P. Laurent, Campbell, CA (US); William K. Smith, San Francisco, CA (US); Christopher J. Stringer, Woodside, CA (US); Daniele De Iuliis, San Francisco, CA (US); Markus Diebel, San Francisco, CA (US); Sung-Ho Tan, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 174 days.

(21) Appl. No.: 18/094,596

(22) Filed: Jan. 9, 2023

(65) Prior Publication Data

US 2023/0164488 A1 May 25, 2023

Related U.S. Application Data

(63) Continuation of application No. 17/177,063, filed on Feb. 16, 2021, now Pat. No. 11,570,549, which is a (Continued)

(51) Int. Cl.
*H04R 5/00* (2006.01)
*H04R 1/10* (2006.01)
*H04R 5/033* (2006.01)

(52) U.S. Cl.
CPC ......... *H04R 5/0335* (2013.01); *H04R 1/1008* (2013.01); *H04R 1/1041* (2013.01); *H04R 2420/07* (2013.01)

(58) Field of Classification Search
CPC .. H04R 5/0335; H04R 1/1008; H04R 1/1041; H04R 2420/07
See application file for complete search history.

(56) References Cited

U.S. PATENT DOCUMENTS 2,924,672 A 2/1960 Cagen
3,682,268 A 8/1972 Gorike
(Continued)

FOREIGN PATENT DOCUMENTS

CN 1794751 A 6/2006
CN 201100960 Y 8/2008
(Continued)

OTHER PUBLICATIONS

Office Action issued in China Application No. CN202110242819.9, dated Aug. 18, 2023 in 5 pages.
(Continued)

*Primary Examiner* — Tuan D Nguyen
(74) *Attorney, Agent, or Firm* — Kilpatrick Townsend & Stockton LLP

(57) ABSTRACT

This disclosure includes several different features suitable for use in circumaural and supra-aural headphones designs. Designs that reduce the size of headphones and allow for small form-factor storage configurations are discussed. User convenience features that include synchronizing earpiece stem positions and automatically detecting the orientation of the headphones on a user's head are also discussed. Various power-saving features, design features, sensor configurations and user comfort features are also discussed.

20 Claims, 45 Drawing Sheets

Related U.S. Application Data continuation of application No. 16/362,404, filed on Mar. 22, 2019, now Pat. No. 10,945,076, which is a continuation of application No. PCT/US2017/052978, filed on Sep. 22, 2017, said application No. 16/362,404 is a continuation of application No. 16/335,846, filed on Mar. 22, 2019, now Pat. No. 10,848,847.

(60) Provisional application No. 62/398,854, filed on Sep. 23, 2016.

(56) References Cited

U.S. PATENT DOCUMENTS

| | | | |
|---|---|---|---|
| 3,902,120 | A | 8/1975 | Dascal et al. |
| 3,919,501 | A | 11/1975 | Cech et al. |
| 4,027,113 | A | 5/1977 | Matsumoto et al. |
| 4,551,584 | A | 11/1985 | Mathiasen |
| 4,609,786 | A | 9/1986 | Omoto et al. |
| 5,056,161 | A | 10/1991 | Breen |
| 5,099,519 | A | 3/1992 | Guan |
| 5,117,465 | A | 5/1992 | Macdonald |
| 5,233,650 | A | 8/1993 | Chan |
| 5,469,505 | A | 11/1995 | Gattey et al. |
| 5,625,903 | A | 5/1997 | Schultz et al. |
| 5,862,241 | A | 1/1999 | Nelson |
| 5,996,123 | A | 12/1999 | Leight et al. |
| 6,333,982 | B1 | 12/2001 | Sapiejewski et al. |
| 6,629,579 | B1 | 10/2003 | Hasegawa |
| 7,171,698 | B2 | 2/2007 | Saffran |
| 8,050,444 | B2 | 11/2011 | Smith |
| 8,170,261 | B2 | 5/2012 | Danielson et al. |
| 8,422,718 | B2 | 4/2013 | Santiago |
| 8,605,935 | B1 | 12/2013 | Huang |
| 8,737,668 | B1 | 5/2014 | Blair et al. |
| 8,861,770 | B2 | 10/2014 | Blair et al. |
| 9,113,246 | B2 | 8/2015 | Bastide et al. |
| 9,148,717 | B2 | 9/2015 | Shaffer |
| 9,344,794 | B1 | 5/2016 | Blonder |
| 9,467,780 | B2 | 10/2016 | Kelly et al. |
| 9,838,776 | B2 | 12/2017 | Broadley et al. |
| 9,930,444 | B1 | 3/2018 | Stanley et al. |
| 10,034,092 | B1 | 7/2018 | Nawfal et al. |
| 10,129,632 | B2 | 11/2018 | Chute et al. |
| 10,219,068 | B2 | 2/2019 | Cochran et al. |
| 10,277,974 | B2 | 4/2019 | Shiomi et al. |
| 10,354,639 | B2 | 7/2019 | Scanlan |
| 10,848,847 | B2 | 11/2020 | Degner et al. |
| 10,945,076 | B2 | 3/2021 | Degner et al. |
| 11,252,492 | B2 | 2/2022 | Kole et al. |
| 11,259,107 | B2 | 2/2022 | Minerbi et al. |
| 11,323,793 | B2 | 5/2022 | Laurent et al. |
| 11,330,354 | B2 | 5/2022 | Degner et al. |
| 11,375,306 | B2 | 6/2022 | Andersen et al. |
| 11,477,575 | B2 | 10/2022 | Degner et al. |
| 11,570,549 | B2 | 1/2023 | Degner et al. |
| 2003/0210801 | A1 | 11/2003 | Naksen et al. |
| 2004/0011149 | A1 | 1/2004 | Carroll |
| 2004/0216946 | A1 | 11/2004 | Lenhard-Backhaus |
| 2006/0159279 | A1 | 7/2006 | Kuo et al. |
| 2007/0053539 | A1 | 3/2007 | Tsunoda et al. |
| 2007/0184881 | A1 | 8/2007 | Wahl et al. |
| 2007/0258614 | A1 | 11/2007 | Langberg |
| 2008/0056525 | A1 | 3/2008 | Fujiwara et al. |
| 2008/0166002 | A1 | 7/2008 | Amsel |
| 2008/0175406 | A1 | 7/2008 | Smith |
| 2009/0041267 | A1 | 2/2009 | Lee et al. |
| 2009/0103762 | A1 | 4/2009 | Ishida et al. |
| 2009/0268936 | A1 | 10/2009 | Goldberg et al. |
| 2009/0285435 | A1 | 11/2009 | Nelson et al. |
| 2011/0002478 | A1 | 1/2011 | Pollard et al. |
| 2011/0002497 | A1 | 1/2011 | Fukuma |
| 2011/0103635 | A1 | 5/2011 | Asakura et al. |
| 2011/0129111 | A1 | 6/2011 | Santiago |
| 2011/0206216 | A1 | 8/2011 | Brunner et al. |
| 2011/0286620 | A1 | 11/2011 | Flynn |
| 2012/0014554 | A1 | 1/2012 | Santiago |
| 2012/0082321 | A1 | 4/2012 | Akaike et al. |
| 2012/0140973 | A1 | 6/2012 | Olodort et al. |
| 2012/0269374 | A1 | 10/2012 | Lee et al. |
| 2012/0272484 | A1 | 11/2012 | Willborn |
| 2012/0275615 | A1 | 11/2012 | Kelly et al. |
| 2013/0038458 | A1 | 2/2013 | Toivola et al. |
| 2013/0202126 | A1 | 8/2013 | Chen et al. |
| 2013/0208910 | A1 | 8/2013 | Hansen et al. |
| 2013/0233745 | A1 | 9/2013 | Tierney et al. |
| 2013/0272560 | A1 | 10/2013 | Dougherty et al. |
| 2013/0279724 | A1 | 10/2013 | Stafford et al. |
| 2013/0343592 | A1 | 12/2013 | Schmidt et al. |
| 2014/0079238 | A1 | 3/2014 | Bastide et al. |
| 2014/0079250 | A1 | 3/2014 | Hirota |
| 2014/0205129 | A1 | 7/2014 | Blair et al. |
| 2014/0219479 | A1 | 8/2014 | Wilk |
| 2014/0226849 | A1 | 8/2014 | Porter et al. |
| 2014/0241567 | A1 | 8/2014 | Crosby et al. |
| 2014/0254854 | A1 | 9/2014 | Blonder |
| 2014/0270228 | A1 | 9/2014 | Oishi et al. |
| 2015/0023515 | A1 | 1/2015 | Reimert |
| 2015/0193664 | A1 | 7/2015 | Marti et al. |
| 2015/0195639 | A1 | 7/2015 | Azmi et al. |
| 2015/0195640 | A1 | 7/2015 | Essabar et al. |
| 2015/0222980 | A1 | 8/2015 | Pizzaro et al. |
| 2015/0245124 | A1 | 8/2015 | Lee |
| 2015/0281823 | A1 | 10/2015 | Taylor |
| 2015/0281846 | A1 | 10/2015 | Locke et al. |
| 2015/0350765 | A1 | 12/2015 | David |
| 2016/0014539 | A1 | 1/2016 | Yeh |
| 2016/0029137 | A1 | 1/2016 | Price |
| 2016/0142809 | A1 | 5/2016 | Tanoue et al. |
| 2016/0193085 | A1 | 7/2016 | Jenkins et al. |
| 2016/0205459 | A1 | 7/2016 | Kamada et al. |
| 2016/0277823 | A1 | 9/2016 | Huang et al. |
| 2016/0373848 | A1 | 12/2016 | Tews et al. |
| 2017/0034612 | A1 | 2/2017 | Timothy et al. |
| 2017/0188132 | A1 | 6/2017 | Hirsch et al. |
| 2017/0201820 | A1 | 7/2017 | Inoue et al. |
| 2017/0257695 | A1 | 9/2017 | Smiechowski |
| 2017/0264984 | A1 | 9/2017 | Pelland |
| 2017/0280227 | A1 | 9/2017 | Huang |
| 2017/0289671 | A1 | 10/2017 | Patel et al. |
| 2017/0374448 | A1 | 12/2017 | Patel et al. |
| 2018/0014973 | A1 | 1/2018 | Echeverri et al. |
| 2018/0213313 | A1 | 7/2018 | Andrikowich et al. |
| 2018/0220213 | A1 | 8/2018 | Wu et al. |
| 2018/0220224 | A1 | 8/2018 | Chute et al. |
| 2019/0007768 | A1 | 1/2019 | Kim |
| 2019/0098121 | A1 | 3/2019 | Jeon et al. |
| 2019/0104356 | A1 | 4/2019 | Daley et al. |
| 2019/0110929 | A1 | 4/2019 | Persson et al. |
| 2019/0182580 | A1 | 6/2019 | Cochran et al. |
| 2019/0222936 | A1 | 7/2019 | Degner et al. |
| 2020/0029146 | A1 | 1/2020 | Kamimura |
| 2020/0196698 | A1 | 6/2020 | Winters et al. |
| 2020/0280801 | A1 | 9/2020 | Andersen et al. |
| 2021/0029435 | A1 | 1/2021 | Siahaan et al. |
| 2021/0037309 | A1 | 2/2021 | Saule et al. |
| 2021/0152941 | A1 | 5/2021 | Degner et al. |
| 2021/0168506 | A1 | 6/2021 | Degner et al. |

FOREIGN PATENT DOCUMENTS

| | | | |
|---|---|---|---|
| CN | 201986123 | U | 9/2011 |
| CN | 202004940 | U | 10/2011 |
| CN | 202004947 | U | 10/2011 |
| CN | 102231866 | A | 11/2011 |
| CN | 102342130 | A | 2/2012 |
| CN | 202750206 | U | 2/2013 |
| CN | 202799062 | U | 3/2013 |
| CN | 202998400 | U | 6/2013 |
| CN | 103348698 | A | 10/2013 |
| CN | 203233530 | U | 10/2013 |
| CN | 103686506 | A | 3/2014 |
| CN | 203675282 | U | 6/2014 |

(56) References Cited

FOREIGN PATENT DOCUMENTS

| | | | |
|---|---|---|---|
| CN | 103945295 | A | 7/2014 |
| CN | 104023105 | A | 9/2014 |
| CN | 104301826 | A | 1/2015 |
| CN | 104469624 | A | 3/2015 |
| CN | 104509129 | A | 4/2015 |
| CN | 104618830 | A | 5/2015 |
| CN | 104954917 | A | 9/2015 |
| CN | 104980832 | A | 10/2015 |
| CN | 105208475 | A | 12/2015 |
| CN | 105323667 | A | 2/2016 |
| CN | 105474663 | A | 4/2016 |
| CN | 205142456 | U | 4/2016 |
| CN | 205142459 | U | 4/2016 |
| CN | 105554603 | A | 5/2016 |
| CN | 105812977 | A | 7/2016 |
| CN | 205450450 | U | 8/2016 |
| CN | 106464999 | A | 2/2017 |
| CN | 106998511 | A | 8/2017 |
| CN | 107040835 | A | 8/2017 |
| CN | 107209069 | A | 9/2017 |
| CN | 107277659 | A | 10/2017 |
| EP | 1549105 | A1 | 6/2005 |
| EP | 2081404 | A2 | 7/2009 |
| EP | 2963942 | A1 | 1/2016 |
| EP | 3226577 | A1 | 10/2017 |
| EP | 3565271 | A1 | 11/2019 |
| EP | 3734989 | A2 | 11/2020 |
| GB | 223043 | A | 10/1924 |
| GB | 2019160 | A | 10/1979 |
| GB | 2103902 | A | 2/1983 |
| JP | 536220 | U | 1/1978 |
| JP | 57005985 | | 2/1982 |
| JP | 6374891 | U | 5/1988 |
| JP | 1023586 | A | 1/1998 |
| JP | 2005311630 | A | 11/2005 |
| JP | 2006304052 | A | 11/2006 |
| JP | 2007267310 | A | 10/2007 |
| JP | 2008066977 | A | 3/2008 |
| JP | 2009105554 | A | 5/2009 |
| JP | 2011015235 | A | 1/2011 |
| JP | 2013038671 | A | 2/2013 |
| JP | 2013527636 | A | 6/2013 |
| JP | 2013138349 | A | 7/2013 |
| JP | 2015026948 | A | 2/2015 |
| JP | 2015037246 | A | 2/2015 |
| JP | 2015050581 | A | 3/2015 |
| JP | 2016082561 | A | 5/2016 |
| JP | 2018507663 | A | 3/2018 |
| KR | 20110011672 | A | 2/2011 |
| KR | 101188892 | B1 | 10/2012 |
| KR | 101353588 | B1 | 1/2014 |
| KR | 20160002415 | A | 1/2016 |
| KR | 20170039568 | A | 4/2017 |
| KR | 20170082405 | A | 7/2017 |
| KR | 20170109650 | A | 9/2017 |
| TW | 449222 | U | 8/2001 |
| TW | M370905 | U | 12/2009 |
| WO | 9504347 | A1 | 2/1995 |
| WO | 2008004274 | A1 | 1/2008 |
| WO | 2008089444 | A2 | 7/2008 |
| WO | 2009061223 | A2 | 5/2009 |
| WO | 2009061223 | A3 | 7/2009 |
| WO | 2010008829 | A1 | 1/2010 |
| WO | 2010038299 | A1 | 4/2010 |
| WO | 2011031910 | A1 | 3/2011 |
| WO | 2013099417 | A1 | 7/2013 |
| WO | 2015087431 | A1 | 6/2015 |
| WO | 2015100499 | A1 | 7/2015 |
| WO | 2016002150 | A1 | 1/2016 |
| WO | 2016145443 | A1 | 9/2016 |
| WO | 2017027405 | A1 | 2/2017 |
| WO | 2018057907 | A1 | 3/2018 |

OTHER PUBLICATIONS

Summons to Attend Oral Proceedings issued in European Application No. EP19179498.1, dated Jan. 30, 2024 in 6 pages.

"G930 Headband Replacement", Flverance Package, YouTube, Available Online at: https://www.youtube.com/watch?v=-1 HfnB 3Ty84, Sep. 15, 2015, 3 pages (of-record in parent application).

"Geekria Replacement Earpads Earpads Cushions Replacement for Logitech G430 G930", Available Online at: https://www.amazon.com/Geekria-Replacement-Cushions-Logitech-Headphones/dp/B074P 338RX?th=I, Feb. 1, 2018, 8 pages (of-record in parent application).

U.S. Appl. No. 16/335,846 , "Corrected Notice of Allowability", Sep. 10, 2020, 2 pages (of-record in parent application).

U.S. Appl. No. 16/335,846 , "Corrected Notice of Allowability", Sep. 18, 2020, 2 pages (of-record in parent application).

U.S. Appl. No. 16/335,846 , "Non-Final Office Action", Jan. 31, 2020, 11 pages (of-record in parent application).

U.S. Appl. No. 16/335,846 , "Notice of Allowance", Jul. 31, 2020, 11 pages (of-record in parent application).

U.S. Appl. No. 16/362,386 , "First Action Interview Office Action Summary", Mar. 9, 2021, 4 pages (of-record in parent application).

U.S. Appl. No. 16/362,386 , "First Action Interview Pilot Program Pre-Interview Communication", Oct. 21, 2020, 5 pages (of- record in parent application).

U.S. Appl. No. 16/362,386 , "Notice of Allowance", Jul. 16, 2021, 9 pages (of-record in parent application).

U.S. Appl. No. 16/362,393 , "Corrected Notice of Allowability", Jan. 24, 2022, 2 pages (of-record in parent application).

U.S. Appl. No. 16/362,393 , "Corrected Notice of Allowability", Mar. 31, 2022, 3 pages (of-record in parent application).

U.S. Appl. No. 16/362,393 , "Final Office Action", Apr. 20, 2021, 12 pages (of-record in parent application).

U.S. Appl. No. 16/362,393 , "Non-Final Office Action", Oct. 16, 2020, 11 pages (of-record in parent application).

U.S. Appl. No. 16/362,393 , "Non-Final Office Action", Aug. 5, 2021, 15 pages (of-record in parent application).

U.S. Appl. No. 16/362,393 , "Notice of Allowance", Jan. 5, 2022, 10 pages (of-record in parent application).

U.S. Appl. No. 16/362,399 , "Corrected Notice of Allowability", Jul. 28, 2021, 2 pages (of-record in parent application).

U.S. Appl. No. 16/362,399 , "Corrected Notice of Allowability", Jun. 14, 2021, 3 pages (of-record in parent application).

U.S. Appl. No. 16/362,399 , "First Action Interview Office Action Summary", Feb. 12, 2021, 4 pages (of-record in parent application).

U.S. Appl. No. 16/362,399 , "First Action Interview Pilot Program Pre-Interview Communication", Oct. 29, 2020, 4 pages (of-record in parent application).

U.S. Appl. No. 16/362,399 , "Notice of Allowance", Apr. 27, 2021, 12 pages (of-record in parent application).

U.S. Appl. No. 16/362,404 , "Non-Final Office Action", May 22, 2020, 9 pages (of-record in parent application).

U.S. Appl. No. 16/362,404 , "Notice of Allowance", Oct. 21, 2020, 9 pages (of-record in parent application).

U.S. Appl. No. 16/362,404 , "Supplemental Notice of Allowability", Dec. 2, 2020, 2 pages (of-record in parent application).

U.S. Appl. No. 16/362,404 , "Supplemental Notice of Allowability", Jan. 28, 2021, 2 pages (of-record in parent application).

U.S. Appl. No. 16/878,536 , "First Action Interview Pilot Program Pre-Interview Communication", Mar. 22, 2021, 4 pages (of-record in parent application).

U.S. Appl. No. 16/878,536 , "Notice of Allowance", Jun. 1, 2021, 7 pages (of-record in parent application).

U.S. Appl. No. 16/878,536 , "Supplemental Notice of Allowability", Jul. 12, 2021, 2 pages (of-record in parent application).

U.S. Appl. No. 16/878,547 , "Corrected Notice of Allowability", Nov. 4, 2021, 2 pages (of-record in parent application).

U.S. Appl. No. 16/878,547 , "Notice of Allowance", Oct. 1, 2021, 8 pages (of-record in parent application).

U.S. Appl. No. 16/878,556 , "First Action Interview Pilot Program Pre-Interview Communication", Mar. 19, 2021, 4 pages (of-record in parent application).

(56) References Cited

OTHER PUBLICATIONS

U.S. Appl. No. 16/878,556 , "Notice of Allowance", Jun. 16, 2021, 8 pages (of-record in parent application).
U.S. Appl. No. 16/878,556 , "Supplemental Notice of Allowance", Jul. 9, 2021, 2 pages (of-record in parent application).
U.S. Appl. No. 16/878,561 , "Corrected Notice of Allowability", Nov. 24, 2021, 2 pages (of-record in parent application).
U.S. Appl. No. 16/878,561 , "Non-Final Office Action", Jun. 18, 2021, 16 pages (of-record in parent application).
U.S. Appl. No. 16/878,561 , "Notice of Allowance", Oct. 14, 2021, 7 pages (of-record in parent application).
U.S. Appl. No. 16/878,565 , "Final Office Action", Oct. 5, 2021, 7 pages (of-record in parent application).
U.S. Appl. No. 16/878,565 , "First Action Interview Pilot Program Pre-Interview Communication", May 12, 2021, 5 pages (of-record in parent application).
U.S. Appl. No. 16/878,565 , "Notice of Allowance", Mar. 28, 2022, 9 pages (of-record in parent application).
U.S. Appl. No. 16/878,565 , "Supplemental Notice of Allowability", Apr. 20, 2022, 2 pages (of-record in parent application).
U.S. Appl. No. 17/061,098 , "Non-Final Office Action", Feb. 28, 2022, 15 pages (of-record in parent application).
U.S. Appl. No. 17/071,819 , "Corrected Notice of Allowability", Apr. 4, 2022, 2 pages (of-record in parent application).
U.S. Appl. No. 17/071,819 , "First Action Interview Pilot Program Pre-Interview Communication", Sep. 15, 2021, 4 pages (of-record in parent application).
U.S. Appl. No. 17/071,819 , "Notice of Allowance", Jan. 31, 2022, 10 pages (of-record in parent application).
U.S. Appl. No. 17/158,810 , "Non-Final Office Action", Jan. 25, 2022, 10 pages (of-record in parent application).
U.S. Appl. No. 17/158,810 , "Notice of Allowance", Jun. 16, 2022, 9 pages (of-record in parent application).
U.S. Appl. No. 17/158,810 , "Supplemental Notice of Allowability", Aug. 3, 2022, 2 pages (of-record in parent application).
U.S. Appl. No. 17/177,063 , "Non-Final Office Action", May 11, 2022, 13 pages (of-record in parent application).
U.S. Appl. No. 17/177,063 , "Notice of Allowance", Sep. 27, 2022, 11 pages (of-record in parent application).
BOXER , "Gioteck EX-05 Review", Available Online at: https://www.t3.com/reviews/gioteck-ex- 05-review, 2016, 5 pages (of-record in parent application).
CN201780058416.0 , "Notice of Decision to Grant", May 25, 2021, 4 pages (of-record in parent application).
CN201780058416.0 , "Office Action", Jul. 3, 2020, 14 pages (of-record in parent application).
CN201780058416.0 , "Office Action", Mar. 1, 2021, 3 pages (of-record in parent application).
CN201910341349.4 , "Notice of Decision to Grant", Sep. 23, 2021, 2 pages (of-record in parent application).
CN201910341349.4 , "Office Action", Feb. 21, 2020, 13 pages (of-record in parent application).
CN201910341349.4 , "Office Action", Dec. 2, 2020, 16 pages (of-record in parent application).
CN201910341349.4 , "Office Action", Apr. 25, 2021, 3 pages (of-record in parent application).
CN201910341350.7 , "Notice of Decision to Grant", Jul. 2, 2021, 2 pages (of-record in parent application).
CN201910341350.7 , "Office Action", Mar. 15, 2021, 13 pages (of-record in parent application).
CN201910341350.7 , "Office Action", Jul. 20, 2020, 20 pages (of-record in parent application).
CN201910341357.9 , "Notice of Decision to Grant", Sep. 14, 2021, 2 pages (of-record in parent application).
CN201910341357.9 , "Office Action", Mar. 3, 2021, 12 pages (of-record in parent application).
CN201910341357.9 , "Office Action", Aug. 31, 2020, 15 pages (of-record in parent application).
CN201910341357.9 , "Office Action", Nov. 27, 2019, 20 pages (of-record in parent application).
CN201910341358.3 , "Notice of Decision to Grant", Nov. 26, 2020, 2 pages (of-record in parent application).
CN201910341358.3 , "Office Action", Jul. 29, 2020, 12 pages (of-record in parent application).
CN201910341358.3 , "Office Action", Nov. 4, 2019, 22 pages (of-record in parent application).
CN201980019404.6 , "Office Action", Apr. 21, 2021, 20 pages (of-record in parent application).
CN201980019404.6 , "Office Action", Apr. 8, 2022, 7 pages (of-record in parent application).
CN201980019404.6 , "Office Action", Jul. 13, 2022, 7 pages (of-record in parent application).
CN201980019404.6 , "Office Action", Nov. 15, 2021, 8 pages (of-record in parent application).
CN202010571760.3 , "Office Action", Dec. 3, 2021, 11 pages (of-record in parent application).
CN202010571760.3 , "Office Action", Aug. 3, 2022, 9 pages (of-record in parent application).
CN202010571796.1 , "Office Action", Jan. 6, 2022, 10 pages (of-record in parent application).
CN202010571796.1 , "Office Action", Oct. 10, 2022, 6 pages (of-record in parent application).
EP17778143.2 , "Office Action", Dec. 2, 2021, 6 pages (of-record in parent application).
EP18815488.4 , "Office Action", Apr. 30, 2021, 4 pages (of-record in parent application).
EP18815488.4 , "Office Action", Feb. 5, 2021, 4 pages (of-record in parent application).
EP18815488.4 , "Office Action", Feb. 18, 2022, 6 pages (of-record in parent application).
EP18815488.4 , "Office Action", Nov. 29, 2022, 6 pages (of-record in parent application).
EP18815488.4 , "Office Action", Jul. 21, 2021, 9 pages (of-record in parent application).
EP19178742.3 , "Extended European Search Report", Jul. 29, 2019, 6 pages (of-record in parent application).
EP19178742.3 , "Office Action", Dec. 2, 2021, 6 pages (of-record in parent application).
EP19179498.1 , "Extended European Search Report", Aug. 8, 2019, 8 pages (of-record in parent application).
EP19179498.1 , "Office Action", Jun. 2, 2021, 4 pages (of-record in parent application).
EP19717705.8 , "Office Action", Sep. 12, 2022, 6 pages (of-record in parent application).
EP20178836.1 , "Extended European Search Report", Nov. 13, 2020, 11 pages (of-record in parent application).
EP20178836.1 , "Office Action", Feb. 3, 2022, 5 pages (of-record in parent application).
EP20178836.1 , "Office Action", Jul. 16, 2021, 6 pages (of-record in parent application).
EP20178836.1 , "Partial European Search Report", Aug. 17, 2020, 11 pages (of-record in parent application).
IN201917010989 , "First Examination Report", Feb. 18, 2021, 7 pages (of-record in parent application).
IN201918013164 , "First Examination Report", Feb. 18, 2021, 6 pages (of-record in parent application).
IN202017039606 , "First Examination Report", May 27, 2021, 6 pages (of-record in parent application).
IN202118052983 , "First Examination Report", Jun. 30, 2022, 6 pages (of-record in parent application).
IN202118052984 , "First Examination Report", Jun. 30, 2022, 6 pages (of-record in parent application).
JP2019-070683 , "Notice of Allowance", Mar. 29, 2021, 5 pages (of-record in parent application).
JP2019-070683 , "Office Action", May 22, 2020, 12 pages (of-record in parent application).
JP2019-070684 , "Notice of Decision to Grant", Apr. 12, 2021, 5 pages (of-record in parent application).
JP2019-070684 , "Office Action", May 22, 2020, 12 pages (of-record in parent application).
JP2019-515893 , "Notice of Allowance", May 21, 2021, 3 pages (of-record in parent application).

(56) References Cited

OTHER PUBLICATIONS

JP2019-515893 , "Office Action", Mar. 9, 2020, 14 pages (of-record in parent application).
JP2019-515893 , "Office Action", Oct. 16, 2020, 15 pages (of-record in parent application).
JP2020-549624 , "Notice of Allowance", Nov. 7, 2022, 3 pages (of-record in parent application).
JP2020-549624 , "Office Action", Jun. 13, 2022, 18 pages (of-record in parent application).
JP2020-549624 , "Office Action", Sep. 27, 2021, 9 pages (of-record in parent application).
JP2021-102592 , "Office Action", Jun. 6, 2022, 8 pages (of-record in parent application).
JP2021-102593 , "Office Action", May 13, 2022, 12 pages (of-record in parent application).
KR10-2019-7008043 , "Notice of Decision to Grant", Oct. 22, 2020, 5 pages (of-record in parent application).
KR10-2019-7008043 , "Office Action", Jan. 29, 2020, 12 pages (of-record in parent application).
KR10-2019-7009018 , "Notice of Decision to Grant", Oct. 27, 2020, 3 pages (of-record in parent application).
KR10-2019-7009018 , "Office Action", Dec. 24, 2019, 13 pages (of-record in parent application).
KR10-2019-7009018 , "Office Action", Apr. 28, 2020, 5 pages (of-record in parent application).
KR10-2019-7009025 , "Notice of Decision to Grant", Mar. 29, 2021, 5 pages (of-record in parent application).
KR10-2019-7009025 , "Office Action", Feb. 18, 2020, 12 pages (of-record in parent application).
KR10-2019-7009025 , "Office Action", Oct. 22, 2020, 9 pages (of-record in parent application).
KR10-2020-7012847 , "Notice of Decision to Grant", Jul. 27, 2021, 6 pages (of-record in parent application).
KR10-2020-7012847 , "Office Action", Mar. 31, 2021, 7 pages (of-record in parent application).
KR10-2020-7013623 , "Notice of Decision to Grant", Jul. 27, 2021, 5 pages (of-record in parent application).
KR10-2020-7013623 , "Office Action", Mar. 31, 2021, 10 pages (of-record in parent application).
KR10-2020-7026645 , "Notice of Decision to Grant", Mar. 29, 2022, 2 pages (of-record in parent application).
KR10-2020-7026645 , "Office Action", Aug. 27, 2021, 16 pages (of-record in parent application).
KR10-2021-7002922 , "Notice of Decision to Grant", Oct. 29, 2021, 3 pages (of-record in parent application).
KR10-2021-7002922 , "Office Action", Apr. 27, 2021, 15 pages (of-record in parent application).
KR10-2021-7015409 , "Notice of Decision to Grant", Feb. 24, 2022, 3 pages (of-record in parent application).
KR10-2021-7015409 , "Office Action", Aug. 27, 2021, 9 pages (of-record in parent application).
KR10-2021-7016617 , "Notice of Decision to Grant", Mar. 30, 2022, 3 pages (of-record in parent application).
KR10-2021-7016617 , "Office Action", Jul. 27, 2021, 11 pages (of-record in parent application).
KR10-2021-7016621 , "Notice of Decision to Grant", Mar. 30, 2022, 3 pages (of-record in parent application).
KR10-2021-7016621 , "Office Action", Jul. 27, 2021, 5 pages (of-record in parent application).
KR10-2022-7014204 , "Office Action", Dec. 5, 2022, 9 pages (of-record in parent application).
Kuipers , "Gioteck EX-05, Draadloze Headset Review", Available Online at: https://nl.hardware.infojreviews/2719/2/gioteck-ex-05-draadloze-headset-review-feature-set, May 12, 2012, 2 pages (of-record in parent application).
Marcus , "AKG K872 Review", Headfonics, Available Online at: https://headfonics.com/2016/12/the-k872-by-akg/, Dec. 21, 2016, 14 pages (of-record in parent application).
PCT/US2017/052978 , "International Preliminary Report on Patentability", Apr. 4, 2019, 8 pages (of-record in parent application).
PCT/US2017/052978 , "International Search Report and Written Opinion", Nov. 22, 2017, 14 pages (of-record in parent application).
PCT/US2018/062143 , "International Preliminary Report on Patentability", Jun. 4, 2020, 12 pages (of-record in parent application).
PCT/US2018/062143 , "International Search Report and Written Opinion", Jun. 12, 2019, 18 pages (of-record in parent application).
PCT/US2018/062143 , "Invitation to Pay Additional Fees and, Where Applicable, Protest Fee", Mar. 6, 2019, 11 pages (of-record in parent application).
PCT/US2019/025384 , "International Preliminary Report on Patentability", Oct. 15, 2020, 10 pages (of-record in parent application).
PCT/US2019/025384 , "International Search Report and Written Opinion", Jun. 25, 2019, 14 pages (of-record in parent application).
Ramo et al., "An Allpass Hear-Through Headset", 22nd European Signal Processing Conference (EUSIPCO), Sep. 2014, 5 pages (of-record in parent application).
TW108111777 , "Notice of Decision to Grant", Jun. 17, 2022, 3 pages (of-record in parent application).
TW108111777 , "Office Action", Jun. 10, 2020, 15 pages (of-record in parent application).
TW108111777 , "Office Action", Mar. 14, 2022, 3 pages (of-record in parent application).
TW108111777 , "Office Action", Mar. 15, 2021, 4 pages (of-record in parent application).
Tyler , "How to Replace G930 Headband and Ear Pads", YouTube, XP 55958011, Available Online at: https://www.youtube.com/watch?v=efnCnEgzqxU, Mar. 9, 2016, 2 pages (of-record in parent application).
Office Action issued in Japan Application No. JP2023-006677, dated Feb. 13, 2024 in 15 pages.
Office Action issued in China Application No. CN202110899469.3, dated Mar. 2, 2024 in 5 pages.
Supplemental Notice of Allowability issued in U.S. Appl. No. 17/177,063, dated Dec. 28, 2022 in 2 pages.
Office Action issued in China Application No. CN202110242819.9, dated Jan. 28, 2023 in 9 pages.
Office Action issued in European Application No. EP19179498.1, dated Jan. 23, 2023 in 4 pages.
Notice of Allowance issued in Japan Application No. JP2021-102592, dated Dec. 23, 2022, 3 pages.
Office Action issued in China Application No. CN202110242819.9, dated May 13, 2023 in 14 pages.
Intention to Grant issued in European Application No. EP17778143.2, dated Jun. 2, 2023 in 8 pages.

A-A

*B-B*

C-C

D-D

E-E

HEADPHONES

CROSS REFERENCES TO RELATED APPLICATIONS

This application is a continuation of U.S. patent application Ser. No. 17/177,063, filed Feb. 16, 2021, which is a continuation of U.S. application Ser. No. 16/362,404, filed Mar. 22, 2019, which is a continuation of U.S. National Stage application Ser. No. 16/335,846, filed Mar. 22, 2019, now U.S. Pat. No. 10,848,847, and is a bypass continuation of International Patent Application No. PCT/US2017/052978, filed Sep. 22, 2017, which claims the benefit of U.S. Provisional Application Ser. No. 62/398,854, filed Sep. 23, 2016; the disclosures of which are hereby incorporated by reference in their entirety for all purposes.

FIELD

The described embodiments relate generally to various headphone features. More particularly, the various features help improve the overall user experience by incorporating an array of sensors and new mechanical features into the headphones.

BACKGROUND

Headphones have now been in use for over 100 years, but the design of the mechanical frames used to hold the earpieces against the ears of a user have remained somewhat static. For this reason, some over-head headphones are difficult to easily transport without the use of a bulky case or by wearing them conspicuously about the neck when not in use. Conventional interconnects between the earpieces and band often use a yoke that surrounds the periphery of each earpiece, which adds to the overall bulk of each earpiece. Furthermore, headphones users are required to manually verify that the correct earpieces are aligned with the ears of a user any time the user wishes to use the headphones. Consequently, improvements to the aforementioned deficiencies are desirable.

SUMMARY

This disclosure describes several improvements on circumaural and supra-aural headphone frame designs.

An earpiece is disclosed and includes the following: an earpiece housing; a speaker disposed within a central portion of the earpiece housing; and a pivot mechanism disposed at a first end of the earpiece housing, the pivot mechanism comprising: a stem, and a spring configured to oppose a rotation of the earpiece housing with respect to the stem, the spring comprising a first end coupled to the stem and a second end coupled to the earpiece housing.

Headphones are disclosed and include the following: a first earpiece; a second earpiece; a headband assembly, comprising a headband spring; a first pivot assembly joining the first earpiece to a first side of the headband assembly, the first pivot assembly comprising: a first stem, and a first pivot spring configured to oppose a rotation of the first earpiece relative to the first stem, the first pivot spring comprising a first end coupled to the first earpiece and a second end coupled to the first stem; and a second pivot assembly joining the second earpiece to a second side of the headband assembly, the second pivot assembly comprising: a second stem, and a second pivot spring configured to oppose a rotation of the second earpiece relative to the second stem, the second pivot spring comprising a first end coupled to the second earpiece and a second end coupled to the second stem.

Headphones are disclosed and include the following: a first earpiece; a second earpiece; a headband assembly, comprising a headband spring; first and second pivot assemblies joining opposing sides of the headband assembly to respective first and second earpieces, each of the pivot assemblies substantially enclosed within respective first and second earpieces, a stem of each of the pivot assemblies coupling its respective pivot assembly to the headband assembly.

Headphones are disclosed and include the following: a first earpiece; a second earpiece; and a headband coupling the first and second earpieces together and being configured to synchronize a movement of the first earpiece with a movement of the second earpiece such that a distance between the first earpiece and a center of the headband remains substantially equal to a distance between the second earpiece and the center of the headband.

Headphones are disclosed and include the following: a headband having a first end and a second end opposite the first end; a first earpiece coupled to the headband a first distance from the first end; a second earpiece coupled to the headband a second distance from the second end; and a cable routed through the headband and mechanically coupling the first earpiece to the second earpiece, the cable being configured to maintain the first distance substantially the same as the second distance by changing the first distance in response to a change in the second distance.

Headphones are disclosed and include the following: a first earpiece; a second earpiece; a headband assembly coupling the first and second earpieces together and comprising an earpiece synchronization system, the earpiece synchronization system configured to change a first distance between the first earpiece and the headband assembly concurrently with a change in a second distance between the second earpiece and the headband assembly.

Headphones are disclosed and include the following: a first earpiece; a second earpiece; a headband coupling the first earpiece to the second earpiece; earpiece position sensors configured to measure an angular orientation of the first and second earpieces with respect to the headband; and a processor configured to change an operational state of the headphones in accordance with the angular orientation of the first and second earpieces.

Headphones are disclosed and also include: a headband; a first earpiece pivotally coupled to a first side of the headband and having a first axis of rotation; a second earpiece pivotally coupled to a second side of the headband and having a second axis of rotation; earpiece position sensors configured to measure an orientation of the first earpiece relative to the first axis of rotation and an orientation of the second earpiece relative to the second axis of rotation; and a processor configured to: place the headphones in a first operational state when the first earpiece is biased in a first direction from a neutral state of the first earpiece and the second earpiece is biased in a second direction opposite the first direction from a neutral state of the second earpiece, and place the headphones in a second operational state when the first earpiece is biased in the second direction from the neutral state of the first earpiece and the second earpiece is biased in the first direction from a neutral state of the second earpiece.

Headphones are disclosed and include the following: a headband; a first earpiece comprising a first earpiece housing; a first pivot mechanism disposed within the first earpiece housing, the first pivot mechanism comprising: a first stem base portion that protrudes though an opening defined by the first earpiece housing, the first stem base portion coupled to a first portion of the headband, and a first orientation sensor configured to measure an angular orientation of the first earpiece relative to the headband; a second earpiece comprising a second earpiece housing; a second pivot mechanism disposed within the second earpiece housing, the second pivot mechanism comprising: a second stem base portion that protrudes though an opening defined by the second earpiece housing, the second stem base portion coupled to a second portion of the headband, and a second orientation sensor configured to measure an angular orientation of the second earpiece relative to the headband; and a processor that sends a first audio channel to the first earpiece when sensor readings received from the first and second orientation sensors are consistent with the first earpiece covering a first ear of a user and is configured to send a second audio channel to the first earpiece when the sensor readings are consistent with the first earpiece covering a second ear of the user.

Headphones are disclosed and include the following: a first earpiece having a first earpad; a second earpiece having a second earpad; and a headband joining the first earpiece to the second earpiece, the headphones being configured to move between an arched state in which a flexible portion of the headband is curved along its length and a flattened state, in which the flexible portion of the headband is flattened along its length, the first and second earpieces being configured to fold towards the headband such that the first and second earpads contact the flexible headband in the flattened state.

Headphones are disclosed and include the following: a first earpiece; a second earpiece; and a headband assembly coupled to both the first and second earpieces, the headband assembly comprising: linkages pivotally coupled together, and an over-center locking mechanism coupling the first earpiece to a first end of the headband assembly and having a first stable position in which the linkages are flattened and a second stable position in which the linkages form an arch.

Headphones are disclosed and include the following: a first earpiece; a second earpiece; and a flexible headband assembly coupled to both the first and second earpieces, the flexible headband assembly comprising: hollow linkages pivotally coupled together and defining an interior volume within the flexible headband assembly, and bi-stable elements disposed within the interior volume and configured to oppose transition of the flexible headband assembly between a first state in which a central portion of the hollow linkages are straightened and a second state in which the hollow linkages form an arch.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
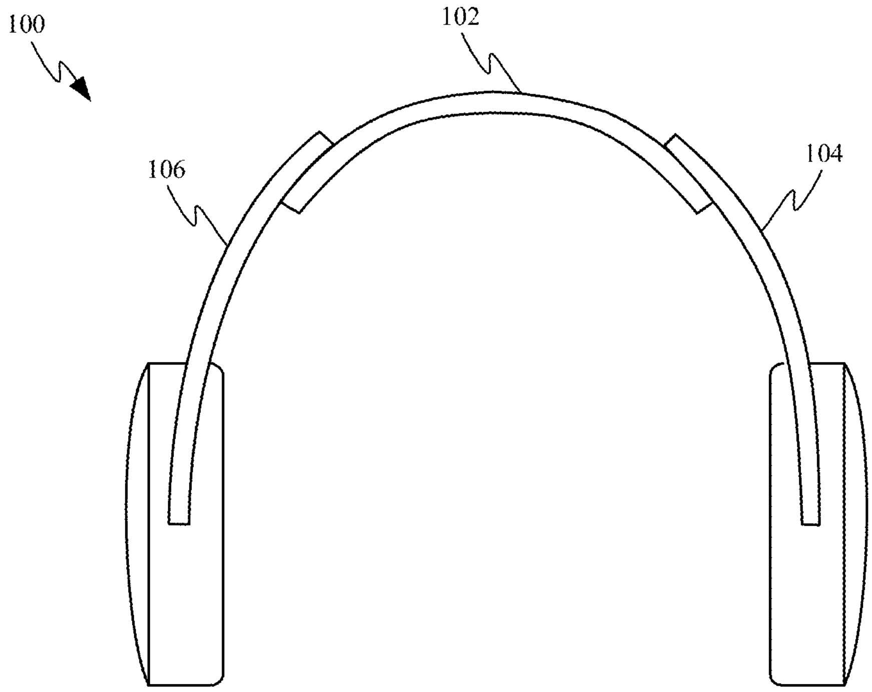
FIG. 1A shows a front view of an exemplary set of over ear or on-ear headphones.

Headphones have been in production for many years, but numerous design problems remain. For example, the functionality of headbands associated with headphones has generally been limited to a mechanical connection functioning only to maintain the earpieces of the headphones over the ears of a user and provide an electrical connection between the earpieces. The headband tends to add substantially to the bulk of the headphones, thereby making storage of the headphones problematic. Stems connecting the headband to the earpieces that are designed to accommodate adjustment of an orientation of the earpieces with respect to a user's ears also add bulk to the headphones. Stems connecting the headband to the earpieces that accommodate elongation of the headband generally allow a central portion of the headband to shift to one side of a user's head. This shifted configuration can look somewhat odd and depending on the design of the headphones can also make the headphones less comfortable to wear.

While some improvements such as wireless delivery of media content to the headphones has alleviated the problem of cord tangle, this type of technology introduces its own batch of problems. For example, because wireless headphones require battery power to operate, a user who leaves the wireless headphones turned on could inadvertently exhaust the battery of the wireless headphones, making them unusable until a new battery can be installed or for the device to be recharged. Another design problem with many headphones is that a user must generally figure out which earpiece corresponds to which ear to prevent the situation in which the left audio channel is presented to the right ear and the right audio channel is presented to the left ear.

A solution to the unsynchronized positioning of the earpieces is to incorporate an earpiece synchronization component taking the form of a mechanical mechanism disposed within the headband that synchronizes the distance between the earpieces and respective ends of the headband. This type of synchronization can be performed in multiple ways. In some embodiments, the earpiece synchronization component can be a cable extending between both stems that can be configured to synchronize the movement of the earpieces. The cable can be arranged in a loop where different sides of the loop are attached to respective stems of the earpieces so that motion of one earpiece away from the headband causes the other earpiece to move the same distance away from the opposite end of the headband. Similarly, pushing one earpiece towards one side of the headband translates the other earpiece the same distance towards the opposite side of the headband. In some embodiments, the earpiece synchronization component can be a rotating gear embedded within the headband can be configured to engage teeth of each stem to keep the earpieces synchronized.

One solution to the conventional bulky connections between headphones stems and earpieces is to use a spring-driven pivot mechanism to control motion of the earpieces with respect to the band. The spring-driven pivot mechanism can be positioned near the top of the earpiece, allowing it to be incorporated within the earpiece instead of being external to the earpiece. In this way, pivoting functionality can be built into the earpieces without adding to the overall bulk of the headphones. Different types of springs can be utilized to control the motion of the earpieces with respect to the headband. Specific examples that include torsional springs and leaf springs are described in detail below. The springs associated with each earpiece can cooperate with springs within the headband to set an amount of force exerted on a user wearing the headphones. In some embodiments, the springs within the headband can be low spring-rate springs configured to minimize the force variation exerted across a large spectrum of users with different head sizes. In some embodiments, the travel of the low-rate springs in the headband can be limited to prevent the headband from clamping to tightly about the neck of a user when being worn around the neck.

One solution to the large headband form-factor problem is to design the headband to flatten against the earpieces. The flattening headband allows for the arched geometry of the headband to be compacted into a flat geometry, allowing the headphones to achieve a size and shape suitable for more convenient storage and transportation. The earpieces can be attached to the headband by a foldable stem region that allows the earpieces to be folded towards the center of the headband. A force applied to fold each earpiece in towards the headband is transmitted to a mechanism that pulls the corresponding end of the headband to flatten the headband. In some embodiments, the stem can include an over-center locking mechanism that prevents inadvertent return of the headphones to an arched state without requiring the addition of a release button to transition the headphones back to the arched state.

A solution to the power management problems associated with wireless headphones includes incorporating an orientation sensor into the earpieces that can be configured to monitor an orientation of the earpieces with respect to the band. The orientation of the earpieces with respect to the band can be used to determine whether or not the headphones are being worn over the ears of a user. This information can then be used to put the headphones into a standby mode or shut the headphones down entirely when the headphones are not determined to be positioned over the ears of a user. In some embodiments, the earpiece orientation sensors can also be utilized to determine which ears of a user the earpieces are currently covering. Circuitry within the headphones can be configured to switch the audio channels routed to each earpiece in order to match a determination regarding which earpiece is on which ear of the user.

These and other embodiments are discussed below with reference to FIGS. 1-17B; however, those skilled in the art will readily appreciate that the detailed description given herein with respect to these figures is for explanatory purposes only and should not be construed as limiting.

Symmetric Telescoping Earpieces

Figure 1B:
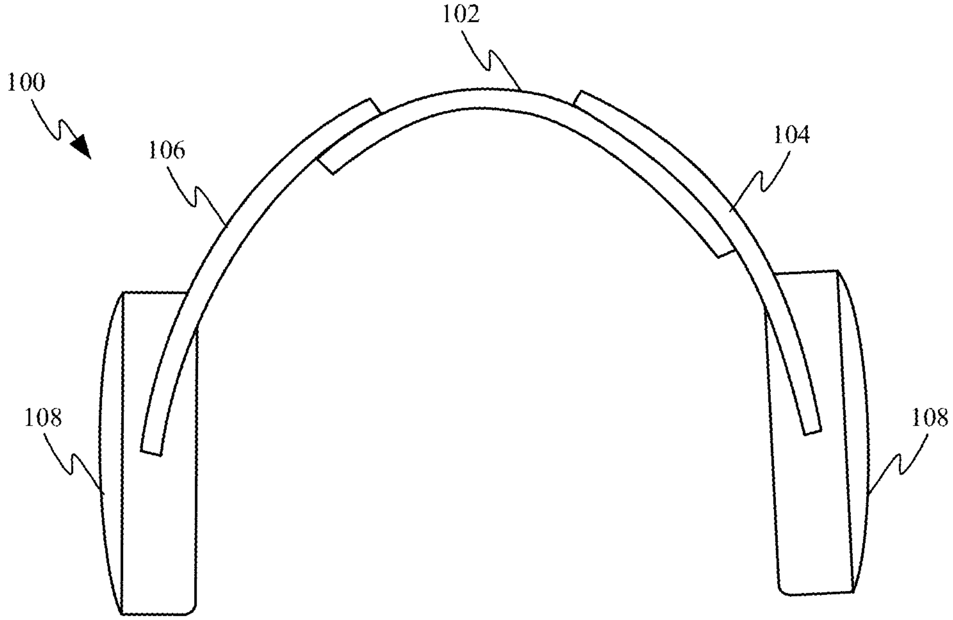
FIG. 1B shows headphone stems extending different distances from a headband assembly.

FIG. 1A shows a front view of an exemplary set of over ear or on-ear headphones 100. Headphones 100 includes a band 102 that interacts with stems 104 and 106 to allow for adjustability of the size of headphones 100. In particular, stems 104 and 106 are configured to shift independently with respect to band 102 in order to accommodate multiple different head sizes. In this way, the position of earpieces 108 and 110 can be adjusted to position earpieces 108 and 110 directly over the ears of a user. Unfortunately, as can be seen in FIG. 1B, this type of configuration allows stems 104 and 106 to become mismatched with respect to band 102. The configuration shown in FIG. 1B can be less comfortable for a user and additionally lack cosmetic appeal. To remedy these issues, the user would be forced to manually adjust stems 104 and 106 with respect to band 102 in order to achieve a desirable look and comfortable fit. FIGS. 1A-1B also show how stems 104 and 106 extend down to a central portion of earpieces 108 in order to allow earpieces 108 to rotate to accommodate the curvature of a user's head. As mentioned above the portions of stems 104 and 106 that extend down around earpieces 108 increase the diameters of earpieces 108.

Figure 2A:
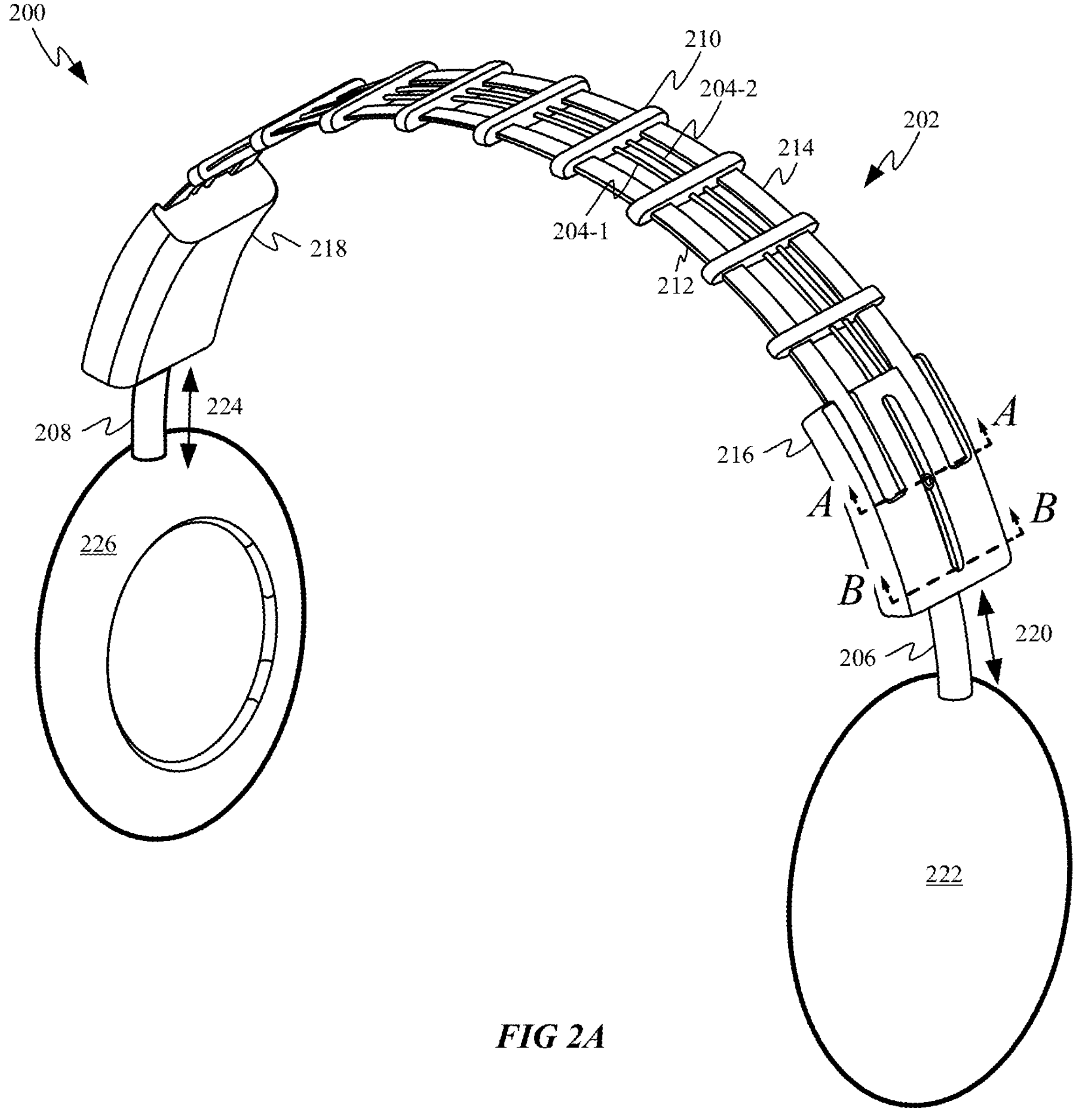
FIG. 2A shows a perspective view of a first side of headphones with synchronized headphone stems.

FIG. 2A shows a perspective view of headphones 200 with a headband 202 configured to solve the problems depicted in FIGS. 1A-1B. Headband 202 is depicted without a cosmetic covering to reveal internal features. In particular, headband 202 can include a wire loop 204 configured to synchronize the movement of stems 206 and 208. Wire guides 210 can be configured to maintain a curvature of wire loop 204 that matches the curvature of leaf springs 212 and 214. Leaf springs 212 and 214 can be configured to define the shape of headband 202 and to exert a force upon the head of a user. Each of wire guides 210 can include openings through which opposing sides of wire loop 204 and leaf springs 212 and 214 can pass. In some embodiments, the openings for wire loop 204 can be defined by low-friction bearings to prevent noticeable friction from impeding the motion of wire loop 204 through the openings. In this way, wire guides 210 define a path along which wire loop 204 extends between stem housings 216 and 218. Wire loop 204 is coupled to both stem 206 and stem 208 and functions to maintain a distance 120 between an earpiece 122 and stem housing 116 substantially the same as a distance 124 between earpiece 126 and stem housing 118. A first side 204-1 of wire loop 204 is coupled to stem 206 and a second side 204-2 of wire loop 204 is coupled to stem 208. Because opposite sides of the wire loop are attached to stems 206 and 208 movement of one of the stems results in movement of the other stem in the same direction.

Figure 2B:
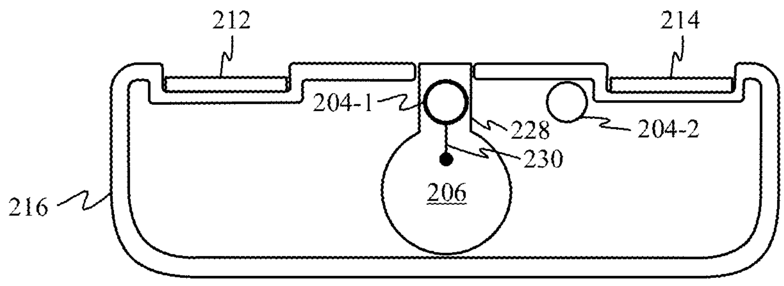
FIGS. 2B-2C show cross-sectional views of the headphones depicted in FIG. 2A in accordance with section lines A-A and B-B, respectively.

FIG. 2B shows a cross-sectional view of a portion of stem housing 116 in accordance with section line A-A. In particular, FIG. 2B shows how a protrusion 228 of stem 206 engages part of wire loop 204. Because protrusion 228 of stem 206 is coupled with wire loop 204, when a user of headphones 100 pulls earpiece 222 farther away from stem housing 216, wire loop 204 is also pulled causing wire loop 204 to circulate through headband 202. The circulation of wire loop 204 through headband 202 adjusts the position of earpieces 226, which is similarly coupled to wire loop 204 by a protrusion of stem 208. In addition to forming a mechanical coupling with wire loop 204, protrusion 228 can also be electrically coupled to wire loop 204. In some embodiments, protrusion 228 can include an electrically conductive pathway 230 that electrically couples wire loop 204 to electrical components within earpiece 222. In some embodiments, wire loop 204 can be formed from an electrically conductive material, so that signals can be transferred between components within earpieces 222 and 226 by way of wire loop 204.

Figure 2C:
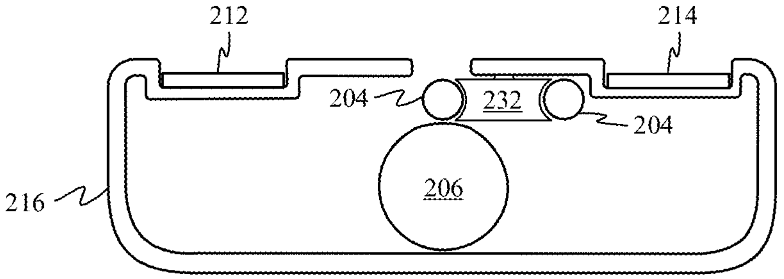

FIG. 2C shows another cross-sectional view of stem housing 116 in accordance with section line B-B. In particular, FIG. 2C shows how wire loop 204 engages pulley 232 within stem housing 216. Pulley 232 minimizes any friction generated by the movement of earpiece 222 closer or farther away from stem housing 216. Alternatively, wire loop 204 can be routed through a static bearing within stem housing 216.

Figure 2D:
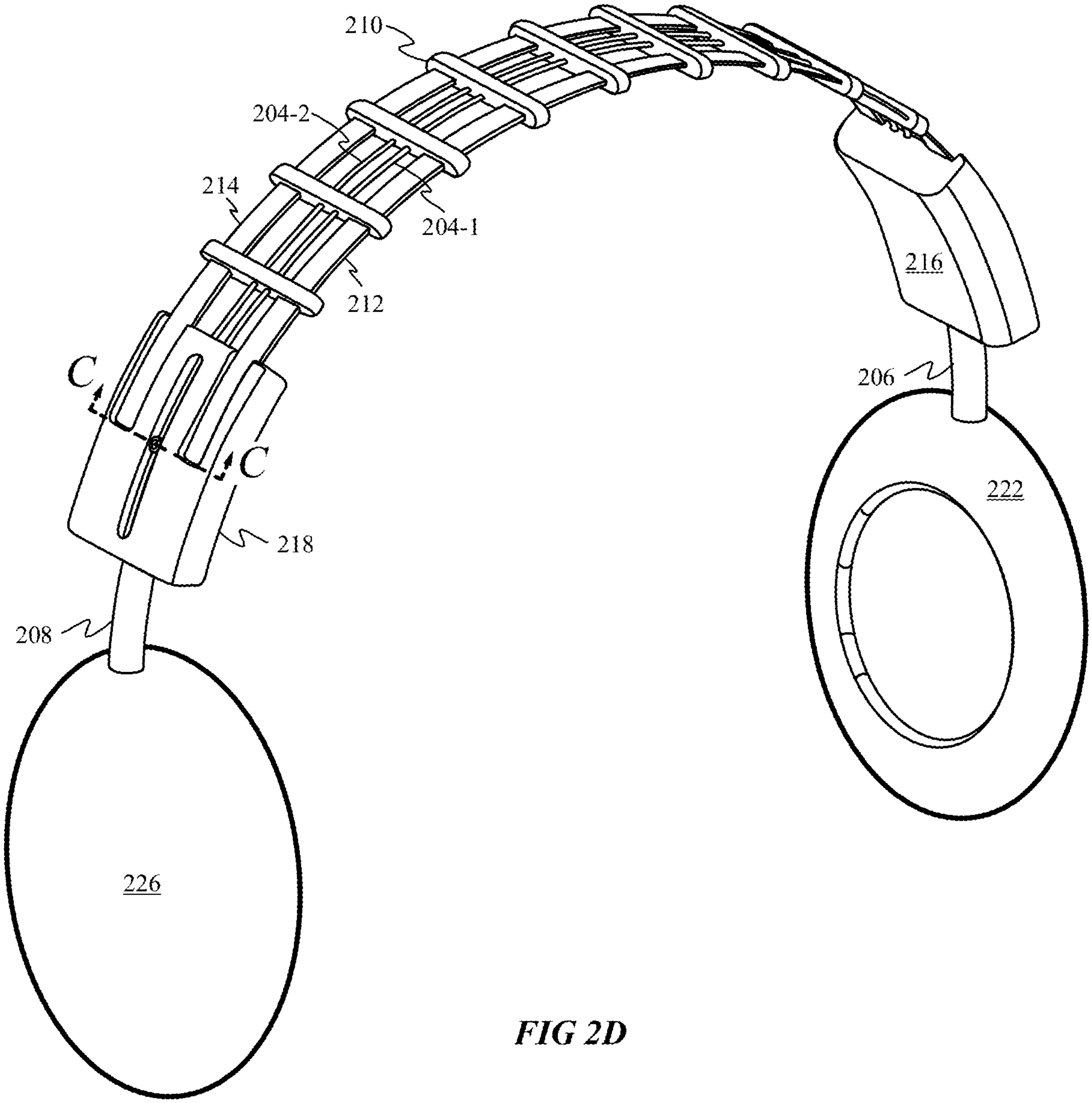
FIG. 2D shows a perspective view of an opposite side of the headphones depicted in FIG. 2D.

FIG. 2D shows another perspective view of headphones 200. In this view, it can be seen that first side 204-1 and second side 204-2 of wire loop 204 shift laterally as they cross from one side of headband 202 to the other. This can be accomplished by the openings defined by wire guides 210 being gradually offset so that by the time sides 204-1 and 204-2 reach stem housing 218, second side 204-2 is centered and aligned with stem 208, as depicted in FIG. 2E.

Figure 2E:
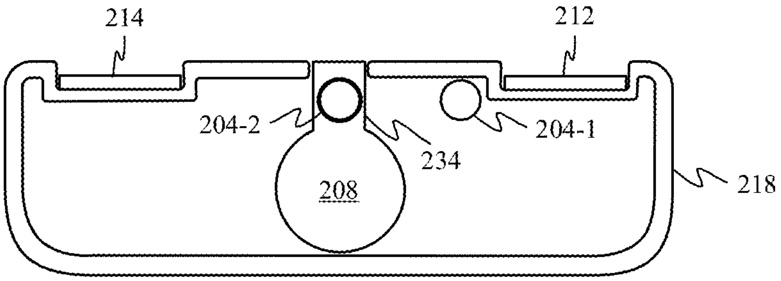
FIG. 2E shows a cross-sectional view of the headphones depicted in FIG. 2D in accordance with section line C-C.

FIG. 2E shows how second side 204-2 is engaged by protrusion 234. Because stems 206 and 208 are attached to respective first and second sides of wire loop 204, pushing earpiece 226 towards stem housing 218 also results in earpiece 222 being pushed towards stem housing 216. Another advantage of the configuration depicted in FIGS. 2A-2E is that regardless of the direction of travel of stems 206 and 208, wire loop 204 always stays in tension. This keeps the amount of force needed to extend or retract earpieces 222 and 226 consistent regardless of direction.

Figure 2F:
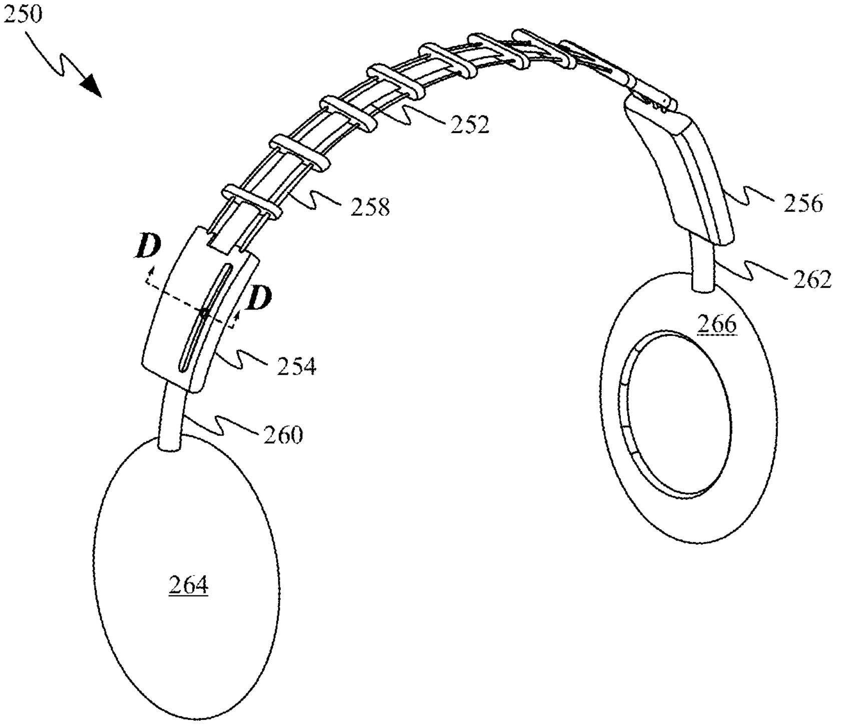
FIGS. 2F-2G show perspective views of a second side of headphones with synchronized headphone stems and a unitary spring band.
Figure 2G:
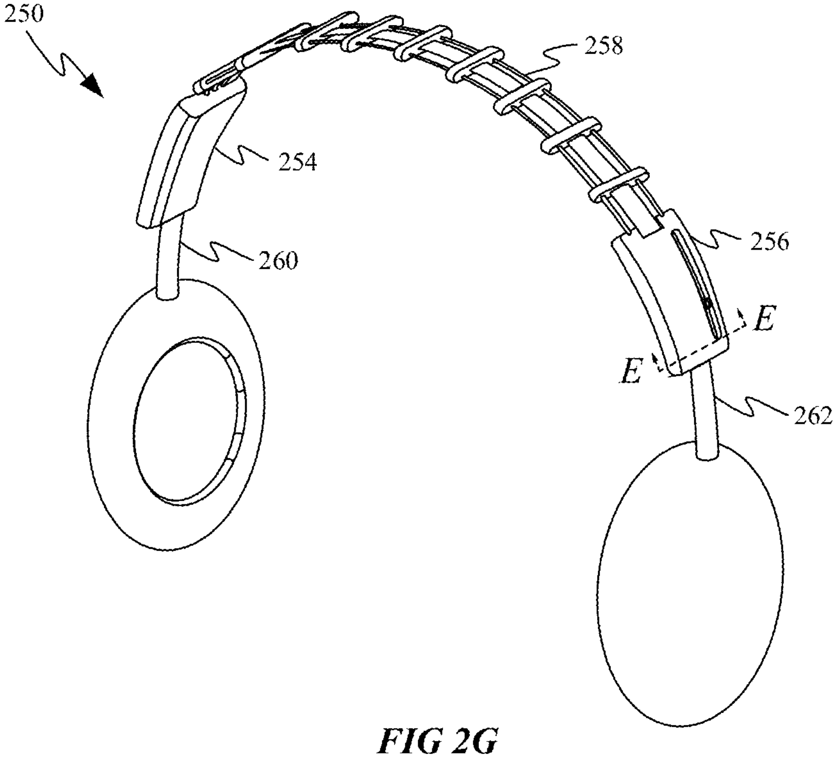

FIGS. 2F-2G show perspective views of headphones 250. Headphones 250 are similar to headphones 200 with the exception that only a single leaf spring 252 is used to connect stem housing 254 to stem housing 256. In this embodiment, wire loop 258 can be positioned to either side of leaf spring 252. Instead of being positioned directly below one side of wire loop 258, stems 260 and 262 can be positioned directly between the two sides of wire loop 258 and connected to one side of wire loop 258 by an arm of stems 260 and 262.

Figure 2H:
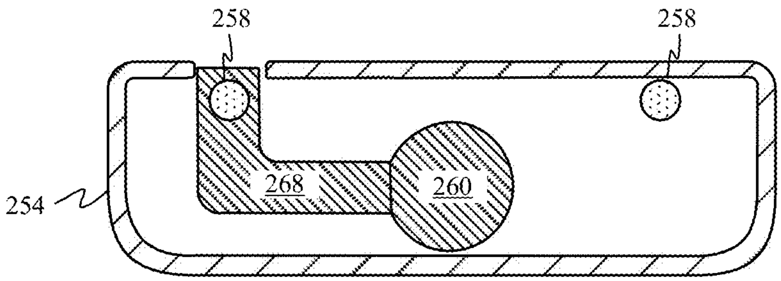
FIGS. 2H-2I show cross-sectional views of the headphones depicted in FIGS. 2F-2G in accordance with section lines D-D and E-E, respectively.
Figure 2I:
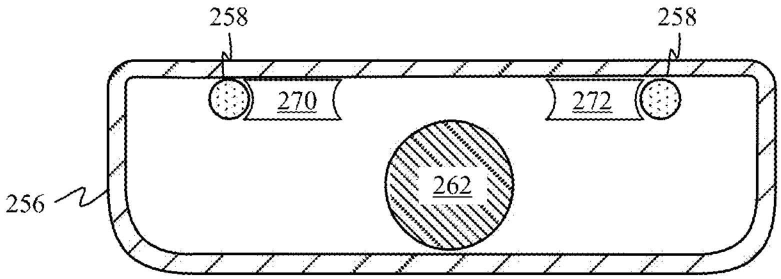

FIGS. 2H and 2I show cross-sectional views of an interior portion of stem housings 254 and 256. FIG. 2H shows a cross-sectional view of stem housing 254 in accordance with section line D-D. FIG. 2H shows how stem 260 can include a laterally protruding arm 268 that engages wire loop 258. In this way, laterally protruding arm 268 couples stem 260 to wire loop 258 so that when earpiece 264 is moved earpiece 266 is kept in an equivalent position. FIG. 2I shows a cross-sectional view of stem housing 256 in accordance with section line E-E. FIG. 2I shows how wire loop 258 can be routed within stem housing 256 by pulleys 270 and 272. By routing wire loop 258 above stem 262 any interference between wire loop 258 and stem 206 can be avoided.

Figure 3A:
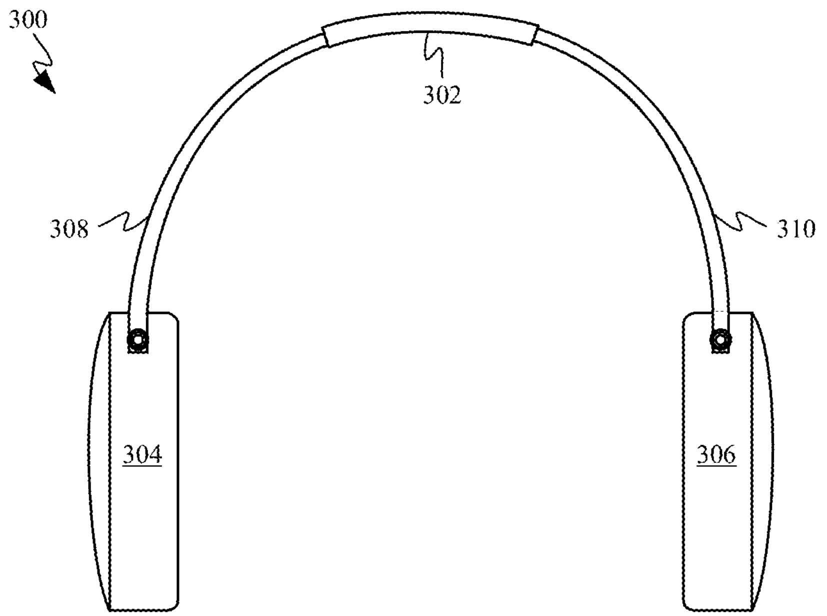
FIG. 3A shows exemplary headphones having a headband assembly configured to synchronize adjustment of the positions of its earpieces.
Figure 3B:
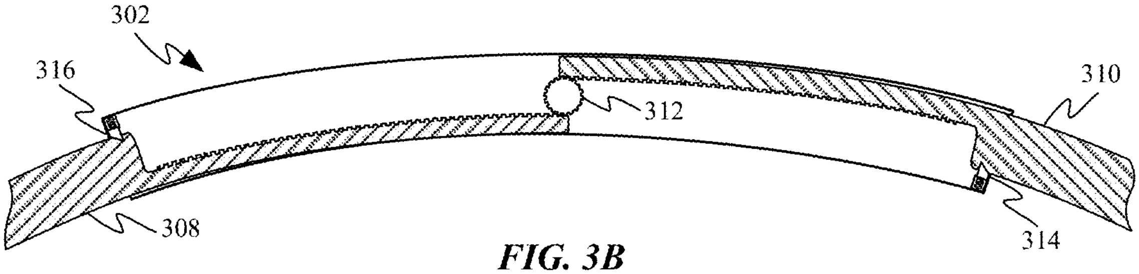
FIG. 3B shows a cross-sectional view of a headband assembly when the headphones are expanded to their largest size.
Figure 3C:
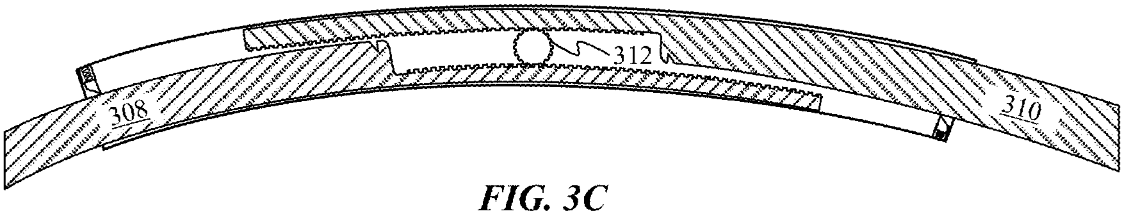
FIG. 3C shows a cross-sectional view of the headband assembly when the headphones are contracted to a smaller size.

FIGS. 3A-3C show another headphones embodiment configured to solve problems described in FIGS. 1A-1B. FIG. 3A shows headphones 300, which includes headband assembly 302. Headband assembly 302 is joined to earpieces 304 and 306 by stems 308 and 310. A size and shape of headband assembly 302 can vary depending on how much adjustability is desirable for headphones 300.

FIG. 3B shows a cross-sectional view of headband assembly 302 when headphones 300 are expanded to their largest size. In particular, FIG. 3B shows how headband assembly 302 includes a gear 312 configured to engage teeth defined by the ends of each of stems 308 and 310. In some embodiments, stems 308 and 310 can be prevented from pulling completely out of headband assembly 302 by spring pins 314 and 316 by engaging openings defined by stems 308 and 310.

FIG. 3C shows a cross-sectional view of headband assembly 302 when headphones 300 are contracted to a smaller size. In particular, FIG. 3C shows how gear 312 keeps the position of stems 308 and 310 synchronized on account of any movement of stem 308 or stem 310 being translated to the other stem by gear 312. In some embodiments, a stiffness of the housing defining the exterior of headband assembly 302 can be selected to match the stiffness of stems 308 and 310 to provide a user of headphones 300 with a headband having a more consistent feel.

Figure 3D:
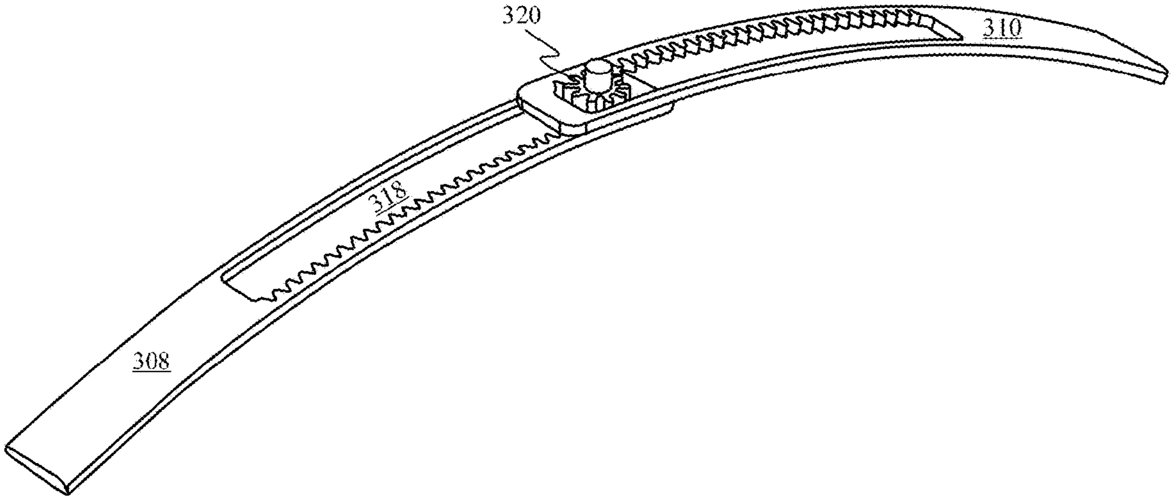
FIGS. 3D-3F show perspective top and cross-sectional views of a headband assembly configured to synchronize earpiece position.

FIG. 3D shows an alternative embodiment of stems 308 and 310. A cover concealing the ends of stems 308 and 310 has been removed to more clearly show the features of the mechanism synchronizing the positions of the stems. Stem 308 defines an opening 318 extending through a portion of stem 308. One side of opening 318 has teeth configured to engage gear 320. Similarly, stem 310 defines an opening 322 extending through a portion of stem 310. One side of opening 322 has teeth configured to engage gear 320. Because opposing sides of openings 318 and 322 engage gear 320, any motion of one of stems 308 and 310 causes the other stem to move. In this way, earpieces positioned at the ends of each of stem 308 and stem 310 are synchronized.

Figure 3E:
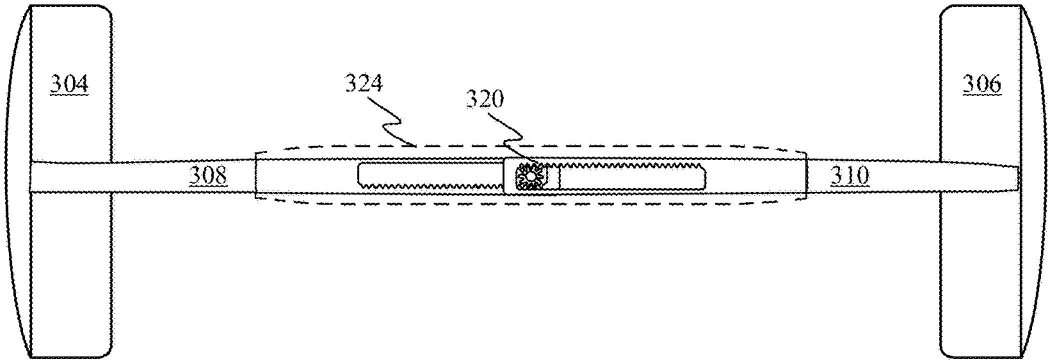
Figure 3F:
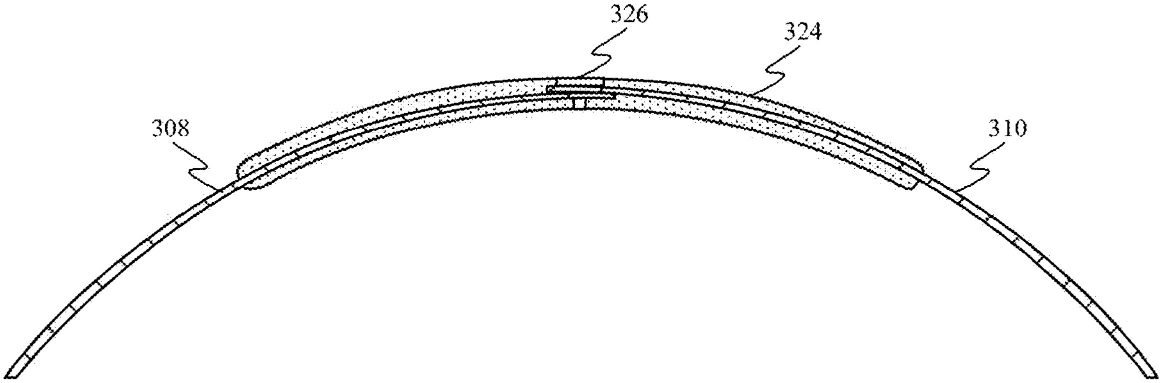

FIG. 3E shows a top view of stems 308 and 310. FIG. 3E also shows an outline of a cover 324 for concealing the geared openings defined by stems 308 and 310 and controlling the motion of the ends of stems 308 and 310. FIG. 3F shows a cross-sectional side view of stems 308 and 310 covered by cover 324. Gear 320 can include bearing 326 for defining the axis of rotation for gear 320. In some embodiments, the top of bearing 326 can protrude from cover 324, allowing a user to adjust the earpiece positions by manually rotating bearing 326. It should be appreciated that a user could also adjust the earpiece positions by simply pushing or pulling on one of stems 308 and 310.

Figure 3G:
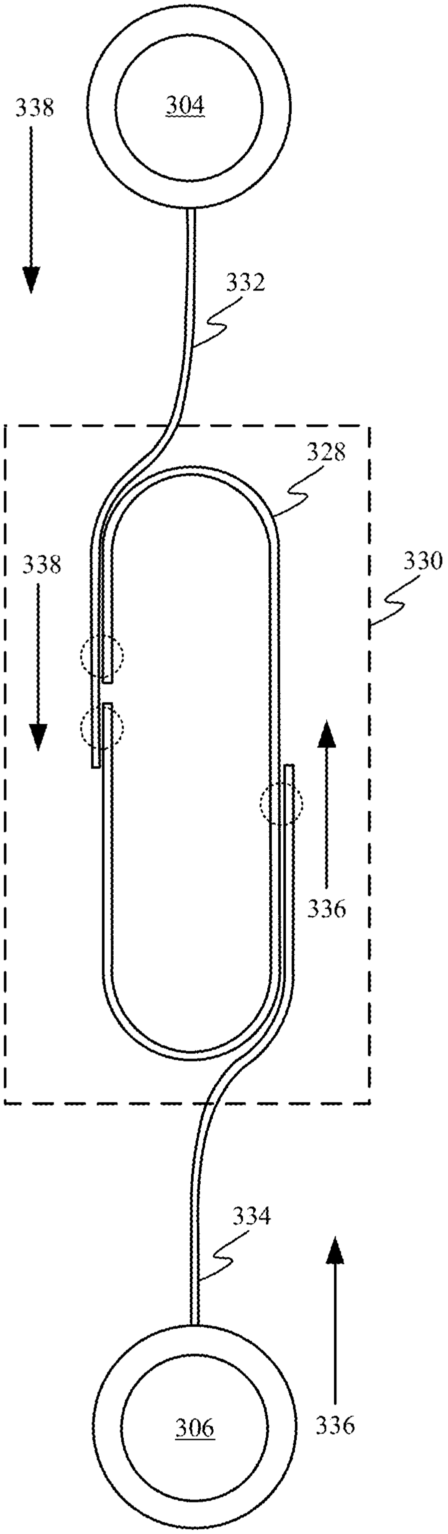
FIGS. 3G-3H show a top view of an earpiece synchronization assembly.
Figure 3H:
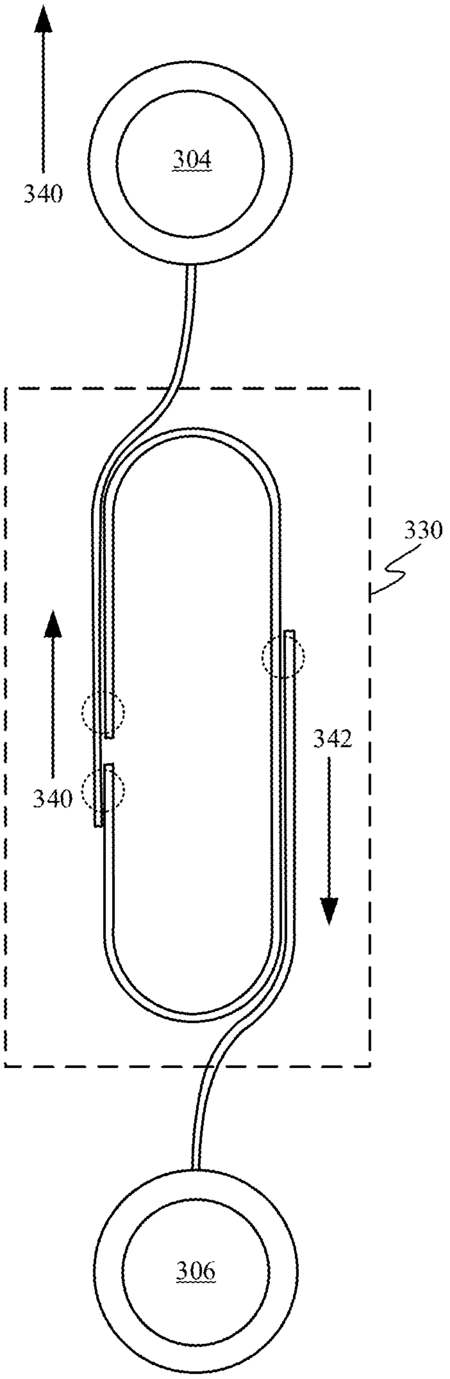

FIG. 3G shows a flattened schematic view of another earpiece synchronization system that utilizes a loop 328 within a headband 330 (the rectangular shape is used merely to show the location of headband 330 and should not be construed as for exemplary purposes only) to keep a distance between each of earpieces 304 and 306 and headband 330 synchronized. Stem wires 332 and 334 couple respective earpieces 304 and 306 to loop 328. Stem wires 332 and 334 can be formed of metal and soldered to opposing sides of loop 328. Because stem wires 332 and 334 are coupled to opposing sides of loop 328, movement of earpiece 306 in direction 336 results in stem wire 332 moving in direction 338. Consequently, moving earpiece 306 into closer proximity with headband 330 also moves stem wire 332, which results in earpiece 304 being brought into closer proximity with headband 330. In addition to showing a new location of earpieces 304 and 306 after being moved into closer proximity to headband 330, FIG. 3H shows how moving earpiece 304 in direction 340 automatically moves earpiece 306 in direction 342 and farther away from headband 330. While not depicted it should be appreciated that headband 330 could include various reinforcement members to keep loop 328 and stem wires 332 and 334 in the depicted shapes.

Figure 3I:
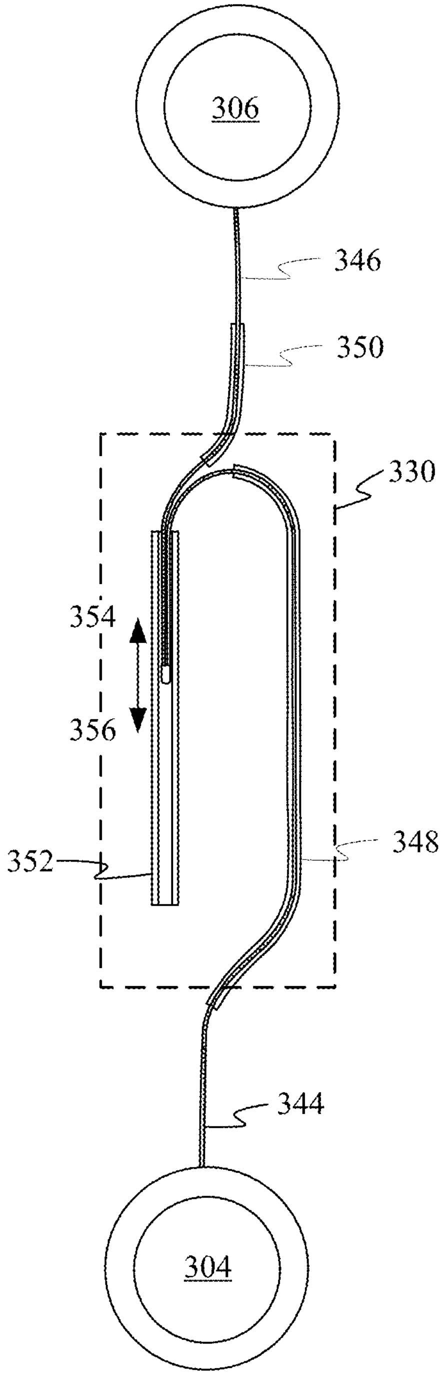
FIGS. 3I-3J show a flattened schematic view of another earpiece synchronization system similar to the one depicted in FIGS. 3G-3H.
Figure 3J:
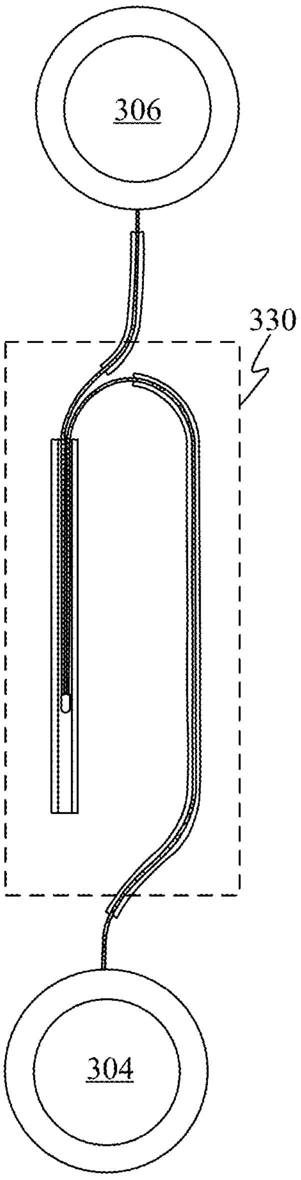

FIGS. 3I-3J show a flattened schematic view of another earpiece synchronization system similar to the one depicted in FIGS. 3G-3H. FIG. 3I shows how the ends of stems 344 and 346 can be coupled directly to each other without an intervening loop. By extending stems 344 and 346 into a pattern, having a similar shape as loop 328, a similar outcome can be achieved without the need for an additional loop structure. Movement of stems 344 and 346 is assisted by reinforcement members 348, 350 and 352, which help to prevent buckling of stems 344 and 346 while the position of earpieces 304 and 306 are being adjusted. Reinforcement members 348-352 can define channels through which stems 344 and 346 smoothly pass. These channels can be particularly helpful in locations where stems 344 and 346 curve. While not defining a curved channel, reinforcement member 352 still serves an important purpose of limiting the direction of travel of the ends of stems 344 and 346 to directions 354 and 356. Movement in direction 356 results in earpieces moving toward headband 330, as depicted in FIG. 3J. Movement in direction 354 results in earpieces 304 and 306 moving farther away from headband 330.

Figure 3K:
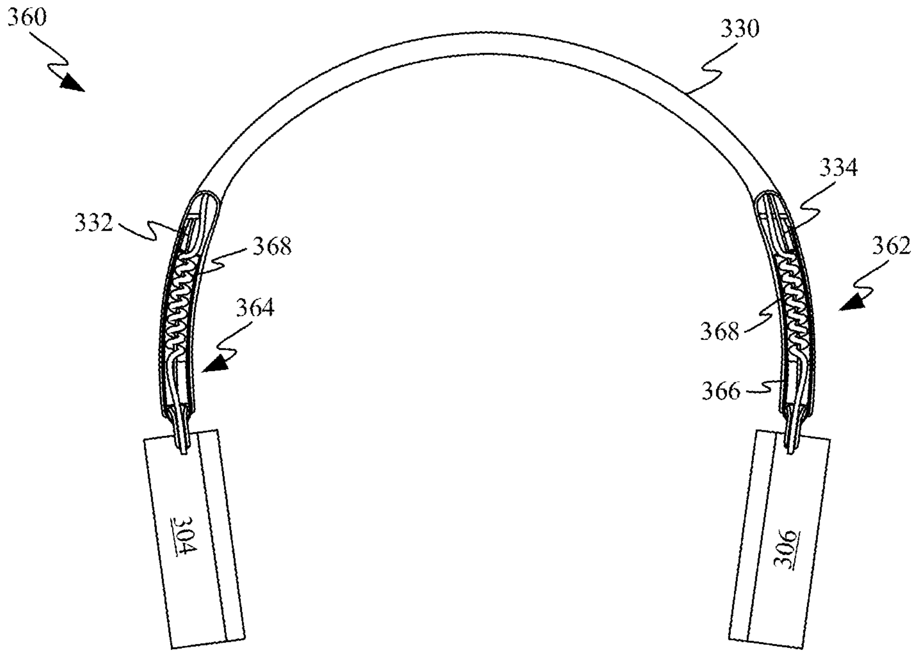
FIGS. 3K-3L show cutaway views of headphones 360 that are suitable for incorporation of either one of the earpiece synchronization systems depicted in FIGS. 3G-3J.
Figure 3L:
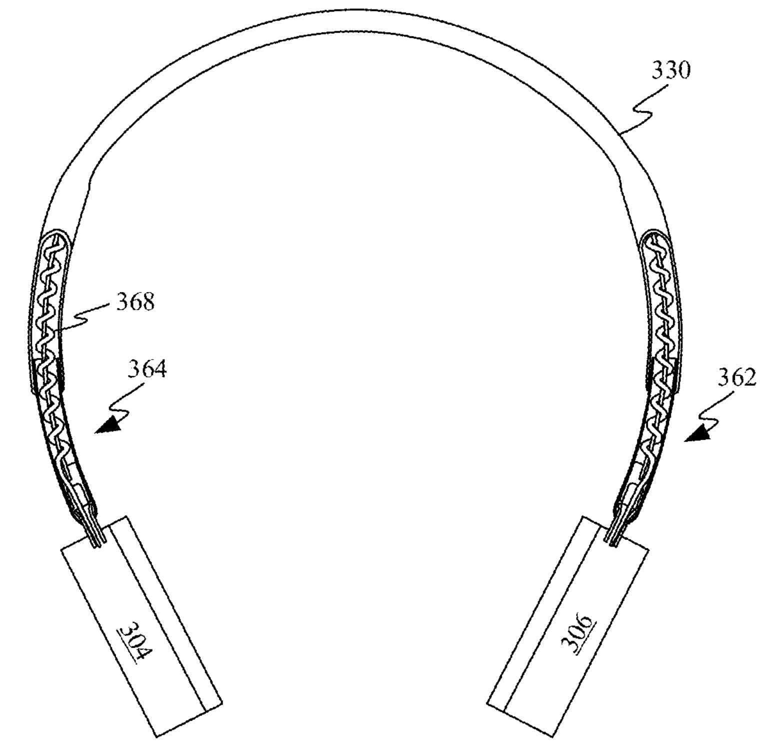

FIGS. 3K-3L show cutaway views of headphones 360 that are suitable for incorporation of either one of the earpiece synchronization systems depicted in FIGS. 3G-3J. FIG. 3K shows headphones 360 with earpieces retracted and stem wires 332 and 334 extending out of headband 330 to engage and synchronize a position of stem assembly 362 with a position of stem assembly 364. Stem 334 is depicted coupled to support structure 366 within stem assembly 364, which allows extension and retraction of stem 334 to keep stem assembly 362 synchronized with stem assembly 364. As depicted, stem assembly 362 is disposed within a channel defined by headband 330, which allows stem assembly 362 to move relative to headband 330. FIG. 3K also shows how data synchronization cable 368 can extend through headband 330 and wrap around a portion of both stem wire 334 and stem wire 332. By wrapping around stem wires 332 and 334, data synchronization cable 368 is able to act as a reinforcement member to prevent buckling of stem wires 332 and 334. Data synchronization cable 368 is generally configured to exchange signals between earpieces 304 and 306 in order to keep audio precisely synchronized during playback operations of headphones 360.

FIG. 3L shows how the coil configuration of data synchronization cable 368 accommodates extension of stem assemblies 362 and 364. Data synchronization cable 368 can have an exterior surface with a coating that allows stem wires 332 and 334 to slide through a central opening defined by the coils. FIG. 3L also shows how earpieces 304 and 306 maintain the same distance from a central portion of headband 330.

Figure 3M:
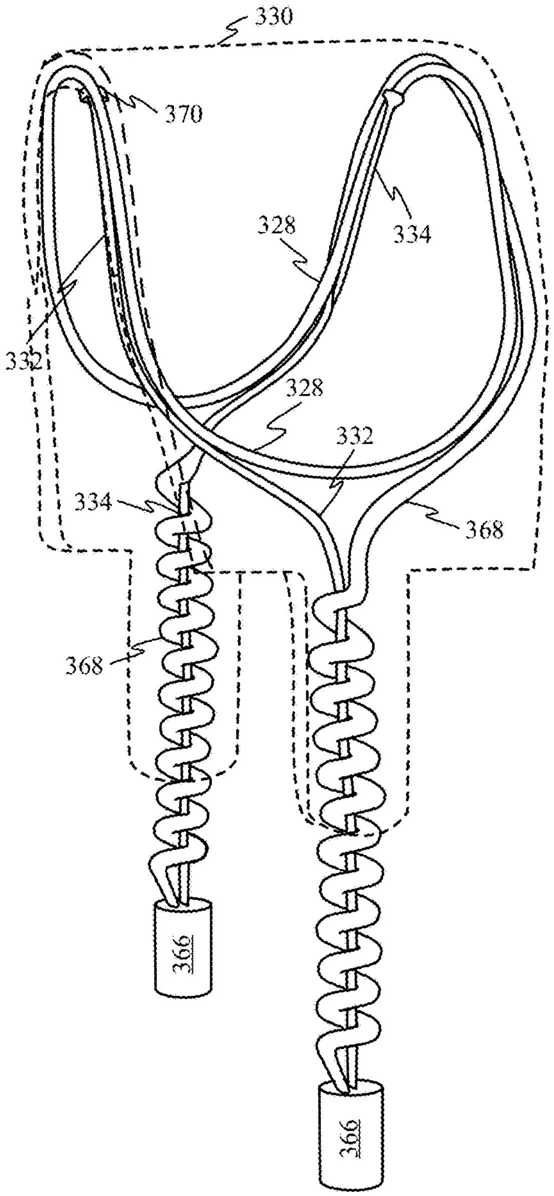
FIGS. 3M-3N show perspective views of the earpiece synchronization system depicted in FIGS. 3G-3H in retracted and extended positions as well as a data synchronization cable.
Figure 3N:
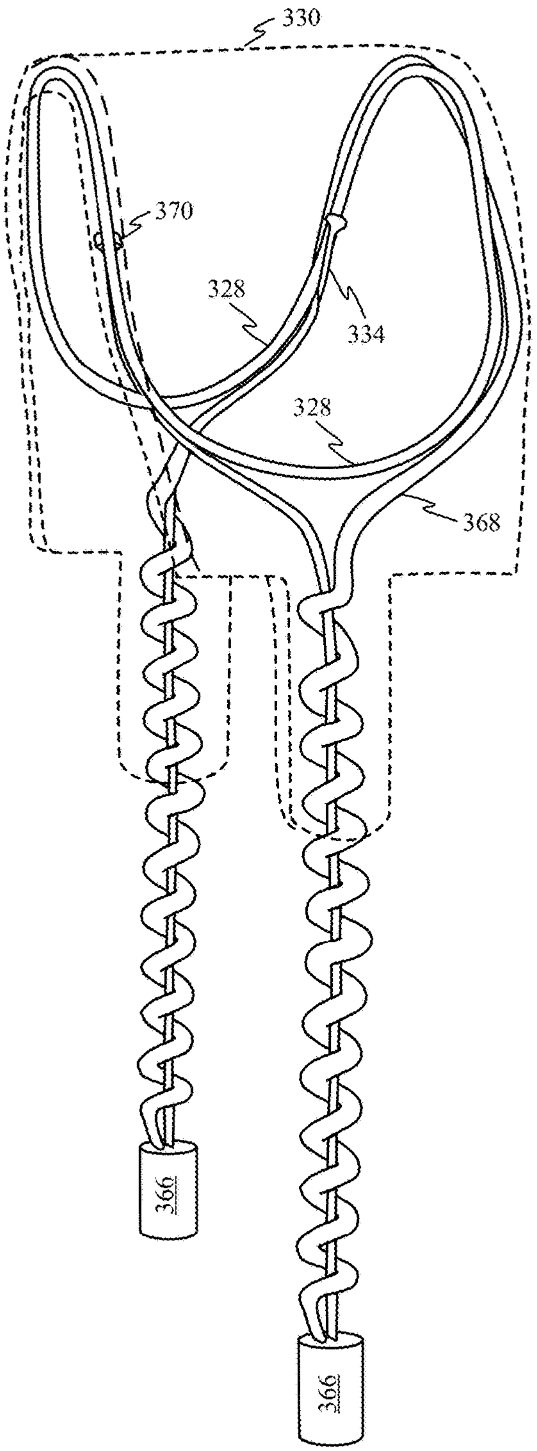

FIGS. 3M-3N show perspective views of the earpiece synchronization system depicted in FIGS. 3G-3H in retracted and extended positions as well as a data synchronization cable 368. FIG. 3M shows how stem wire 332 includes an attachment feature 370 that at least partially surrounds a portion of loop 328. In this way, stem wire 332, stem wire 334 and support structures 366 move along with loop 328. FIG. 3M also shows a dashed line illustrating how a covering for headband 330 can at least partially conform with loop 328, stem wire 332 and stem wire 334.

Figure 3O:
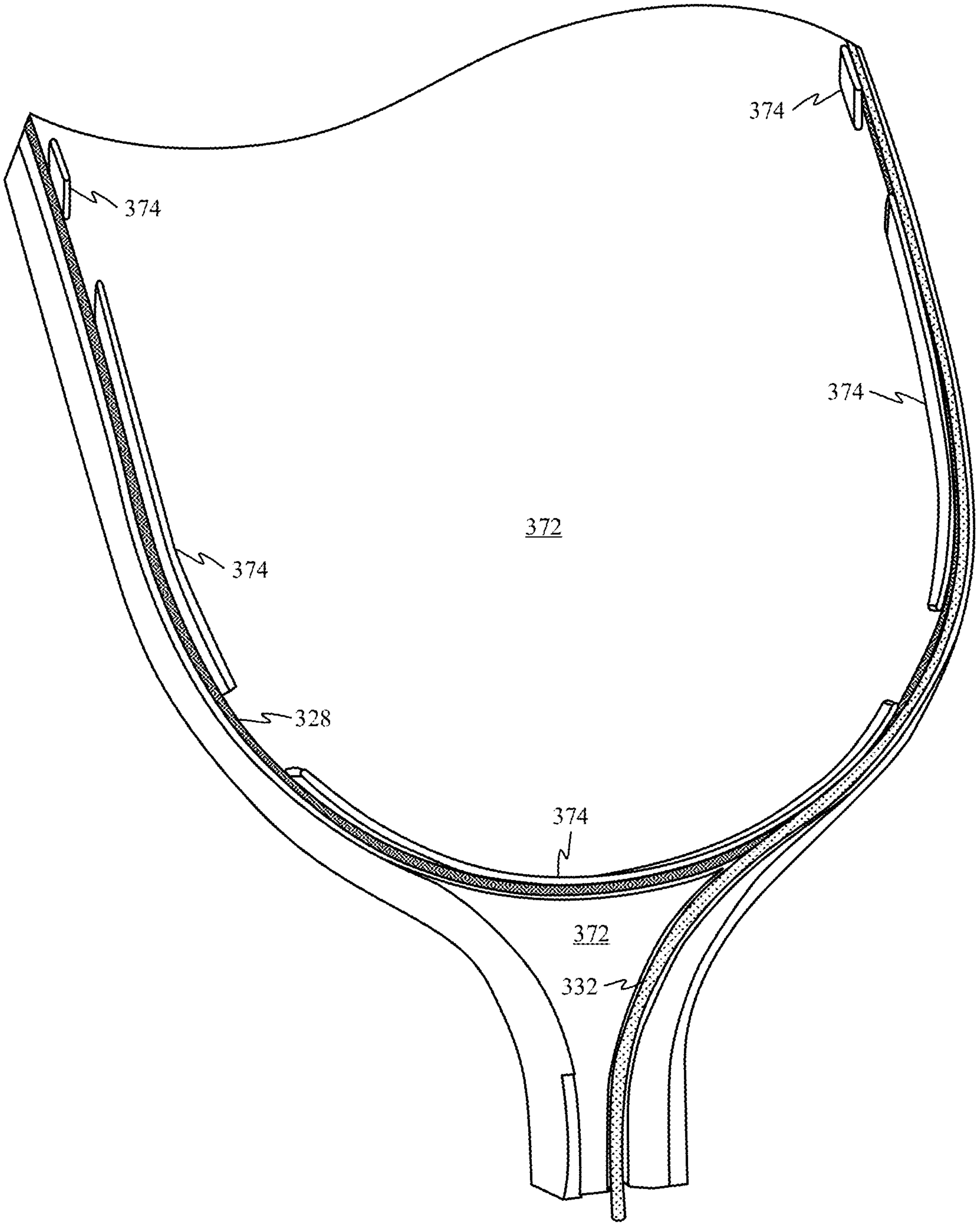
FIG. 3O shows a portion of a canopy structure and how an earpiece synchronization system can be routed through reinforcement members of the canopy structure that includes.

FIG. 3O shows a portion of canopy structure 372 and how an earpiece synchronization system can be routed through reinforcement members 374 of canopy structure 372. Reinforcement members 374 help guide loop 328 and stem wire 332 along a desired path. In some embodiments, canopy structure 372 can include a spring mechanism that helps keep earpieces secured to a user's ears.

Off-Center Pivoting Earpieces

Figure 4A:
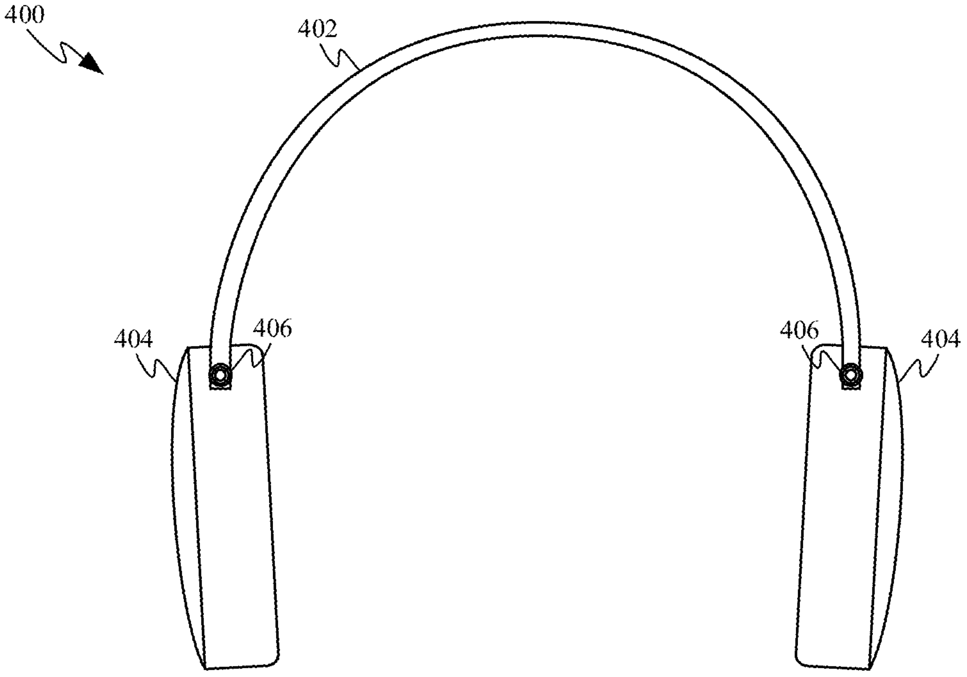
FIGS. 4A-4B show front views of headphones 400 having off-center pivoting earpieces.
Figure 4B:
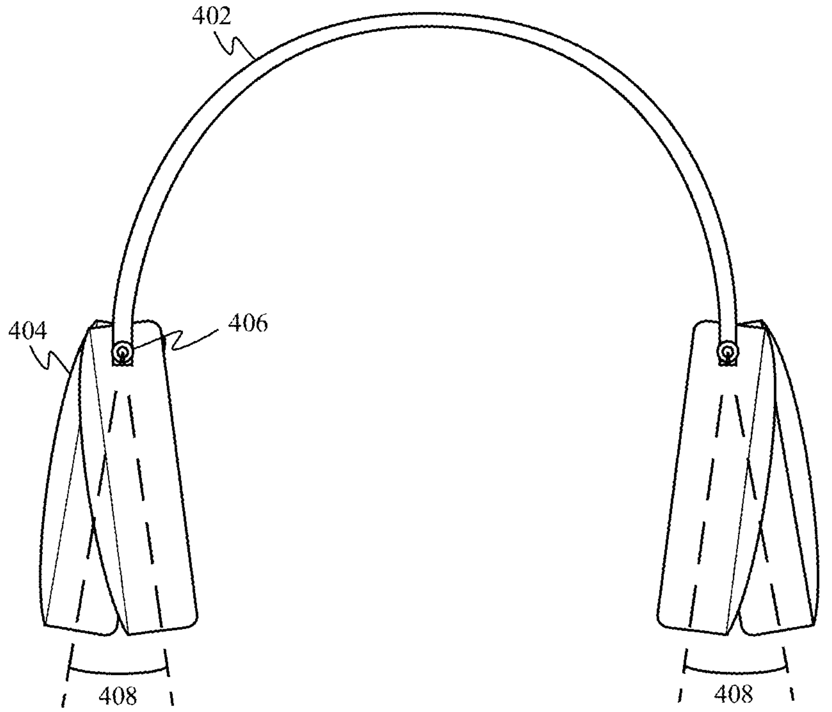

FIGS. 4A-4B show front views of headphones 400 having off-center pivoting earpieces. FIG. 4A shows a front view of headphones 400, which includes headband assembly 402. In some embodiments, headband assembly 402 can include an adjustable band and stems for customizing the size of headphones 400. Each end of headband assembly 402 is depicted being coupled to an upper portion of earpieces 404. This differs from conventional designs, which place the pivot point in the center of earpieces 404 so that earpieces can naturally pivot in a direction that allows earpieces 404 to move to an angle in which earpieces 404 are positioned parallel to a surface of a user's head. Unfortunately, this type of design generally requires bulky arms that extend to either side of earpiece 404, thereby substantially increasing the size and weight of earpieces 404. By locating pivot point 406 near the top of earpieces 404, associated pivot mechanism components can be packaged within earpieces 404.

FIG. 4B shows an exemplary range of motion 408 for each of earpieces 404. Range of motion 408 can be configured to accommodate a majority of users based on studies performed on average head size measurements. This more compact configuration can still perform the same functions as the more traditional configuration described above, which includes applying a force through the center of the earpiece and establishing an acoustic seal. In some embodiments, range of motion 408 can be about 18 degrees. In some embodiments, range of motion 408 may not have a defined stop but instead grow progressively harder to deform as it gets farther from a neutral position. The pivot mechanism components can include spring elements configured to apply a modest retaining force to the ears of a user when the headphones are in use. The spring elements can also bring earpieces back to a neutral position once headphones 400 are no longer being worn.

Figure 5A:
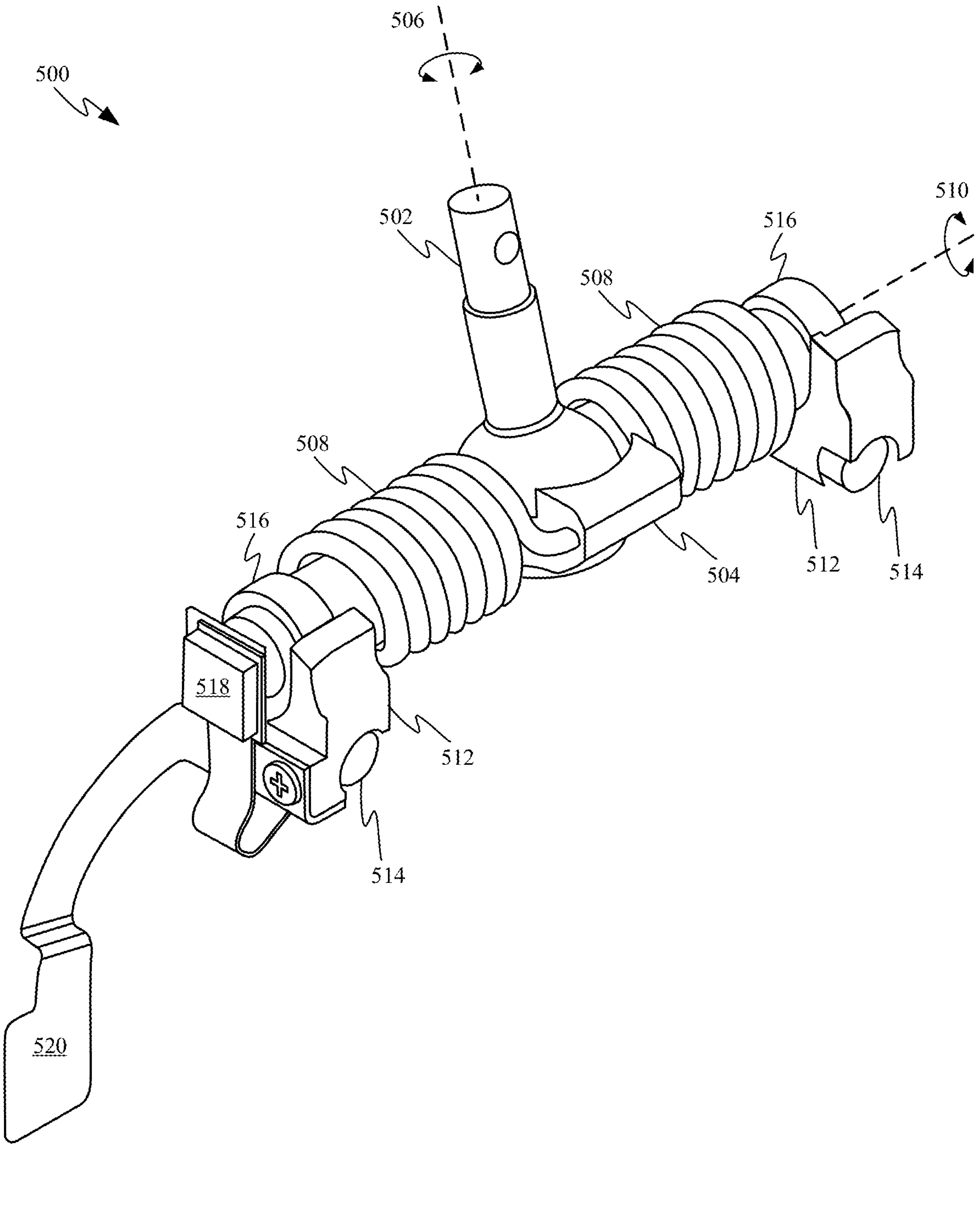
FIG. 5A shows an exemplary pivot mechanism that includes torsion springs.

FIG. 5A shows an exemplary pivot mechanism 500 for use in the upper portion of an earpiece. Pivot mechanism 500 can be configured to accommodate motion around two axes, thereby allowing adjustments to both roll and yaw for earpieces 404 with respect to headband assembly 402. Pivot mechanism 500 includes a stem 502, which can be coupled to a headband assembly. One end of stem 502 is positioned within bearing 504, which allows stem 502 to rotate about yaw axis 506. Bearing 504 also couples stem 502 to torsional springs 508, which oppose rotation of stem 502 with respect to earpiece 404 about roll axis 510. Each of torsional springs 508 can also be coupled to mounting blocks 512. Mounting blocks 512 can be secured to an interior surface of earpiece 404 by fasteners 514. Bearing 504 can be rotationally coupled to mounting blocks 512 by bushings 516, which allow bearing 504 to rotate with respect to mounting blocks 512. In some embodiments, the roll and yaw axes can be substantially orthogonal with respect to one another. In this context, substantially orthogonal means that while the angle between the two axes might not be exactly 90 degrees that an angle between the two axes would stay between 85 and 95 degrees.

FIG. 5A also depicts magnetic field sensor 518. Magnetic field sensor 518 can take the form of a magnetometer or Hall Effect sensor capable of detecting motion of a magnet within pivot mechanism 500. In particular, magnetic field sensor 518 can be configured to detect motion of stem 502 with respect to mounting blocks 512. In this way, magnetic field sensor 518 can be configured to detect when headphones associated with pivot mechanism 500 are being worn. For example, when magnetic field sensor 518 takes the form of a Hall Effect sensor, rotation of a magnet coupled with bearing 504 can result in the polarity of the magnetic field emitted by that magnet saturating magnetic field sensor 518. Saturation of the Hall Effect sensor by a magnetic field causes the Hall Effect sensor to send a signal to other electronic devices within headphones 400 by way of flexible circuit 520.

Figure 5B:
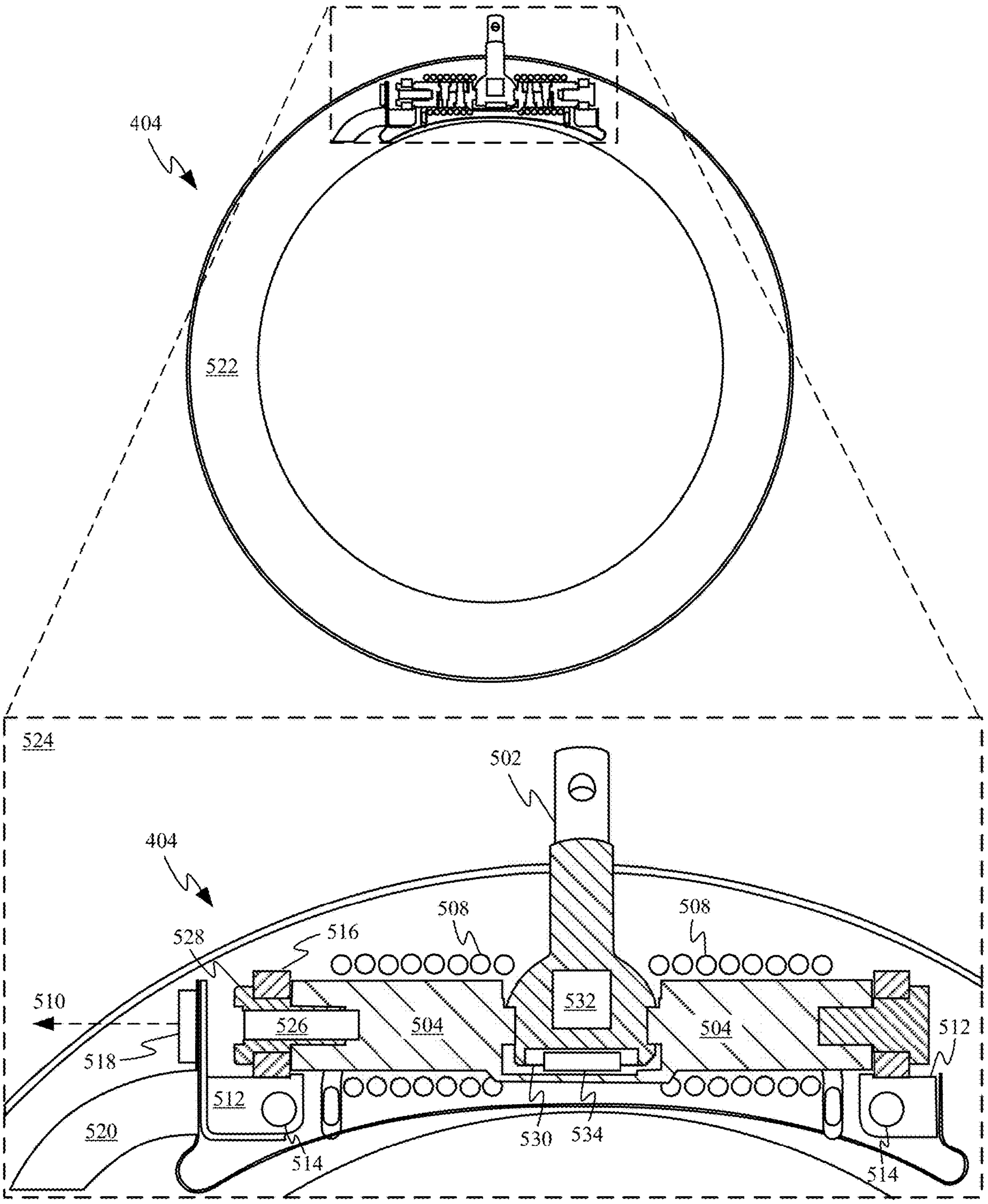
FIG. 5B shows the pivot mechanism depicted in FIG. 5A positioned behind a cushion of an earpiece.

FIG. 5B shows a pivot mechanism 500 positioned behind a cushion 522 of earpiece 404. In this way, pivot mechanism 500 can be integrated within earpiece 404 without impinging on space normally left open to accommodate the ear of a user. Close-up view 524 shows a cross-sectional view of pivot mechanism 500. In particular, close-up view 524 shows a magnet 526 positioned within a fastener 528. As stem 502 is rotated about roll axis 510, magnet 526 rotates with it. Magnetic field sensor 518 can be configured to sense rotation of the field emitted by magnet 526 as it rotates. In some embodiments, the signal generated by magnetic field sensor 518 can be used to activate and/or deactivate headphones 400. This can be particularly effective when the neutral state of earpiece 404 corresponds to the bottom end of each earpiece 404 is oriented towards the user at an angle that causes earpiece 404 to be rotated away from the users head when worn by most users. By designing headphones 400 in this manner, rotation of magnet 526 away from its neutral position can be used as a trigger that headphones 400 are in use. Correspondingly, movement of magnet 526 back to its neutral position can be used as an indicator that headphones 400 are no longer in use. Power states of headphones 400 can be matched to these indications to save power while headphones 400 are not in use.

Close up view 524 of FIG. 5B also shows how stem 502 is able to twist within bearing 504. Stem 502 is coupled to threaded cap 530, which allows stem 502 to twist within bearing 504 about yaw axis 506. In some embodiments, threaded cap 530 can define mechanical stops that limit the range of motion through which stem 502 can twist. A magnet 532 is disposed within stem 502 and is configured to rotate along with stem 502. A magnetic field sensor 534 can be configured to measure the rotation of a magnetic field emitted by magnet 532. In some embodiments, a processor receiving sensor readings from magnetic field sensor 534 can be configured to change an operating parameter of headphones 400 in response to the sensor readings indicating a threshold amount of change in the angular orientation of magnet 532 relative to the yaw axis has occurred.

Figure 6A:
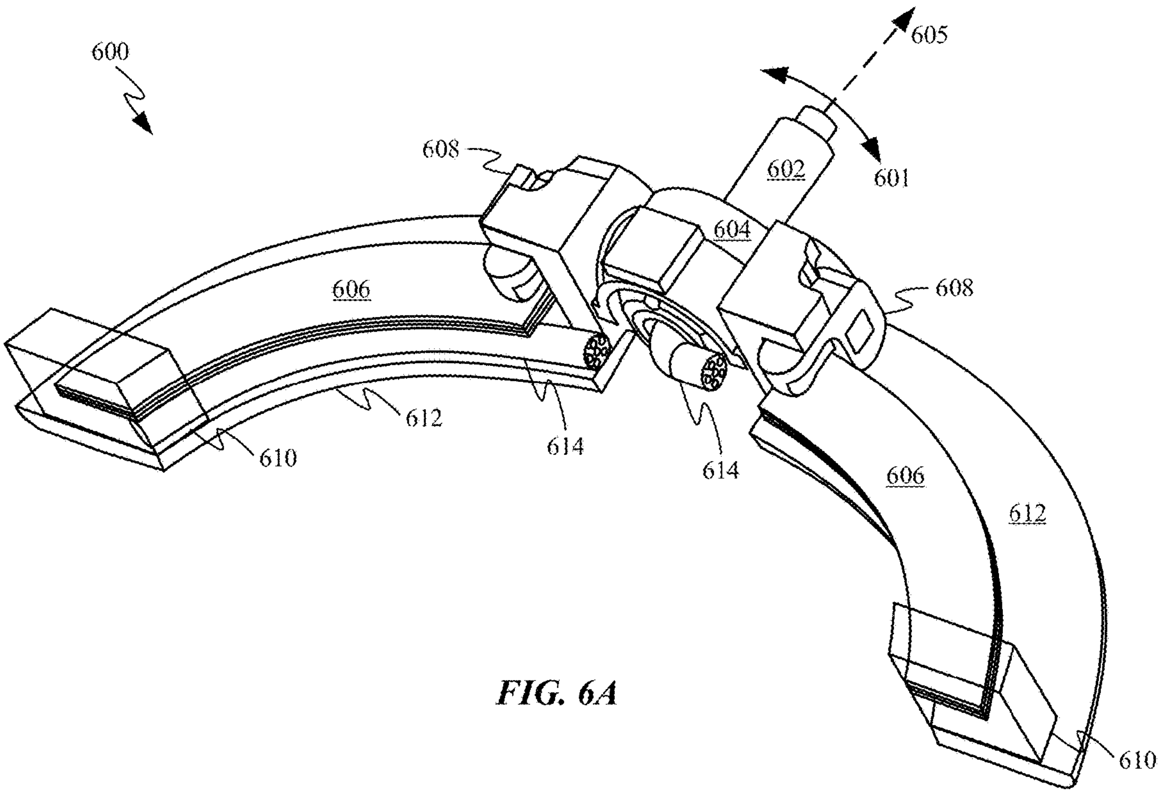
FIG. 6A shows a perspective view of another pivot mechanism that includes leaf springs.

FIG. 6A shows a perspective view of another pivot mechanism 600 that is configured to fit within a top portion of earpieces 404 of headphones. The overall shape of pivot mechanism 600 is configured to conform to space available within the top portion of the earpieces. Pivot mechanism 600 utilizes leaf springs instead of torsion springs to oppose motion in the directions indicated by arrows 601 (e.g., a roll direction) of earpieces 404. Pivot mechanism 600 includes stem 602, which has one end disposed within bearing 604. Bearing 604 allows for rotation of stem 602 about yaw axis 605. Bearing 604 also couples stem 602 to a first end of leaf spring 606 through spring lever 608. A second end of each of leaf springs 606 is coupled to a corresponding one of spring anchors 610. Spring anchors 610 are depicted as being transparent so that the position at which the second end of each of leaf springs 606 engages a central portion of spring anchors 610 can be seen. This positioning allows leaf springs 606 to bend in two different directions. Spring anchors 610 couple the second end of each leaf spring 606 to earpiece housing 612. In this way, leaf springs 606 create a flexible coupling between stem 602 and earpiece housing 612. Pivot mechanism 600 can also include cabling 614 configured to route electrical signals between two earpieces 404 by way of headband assembly 402 (not depicted).

Figures 6B, 6C, 6D:
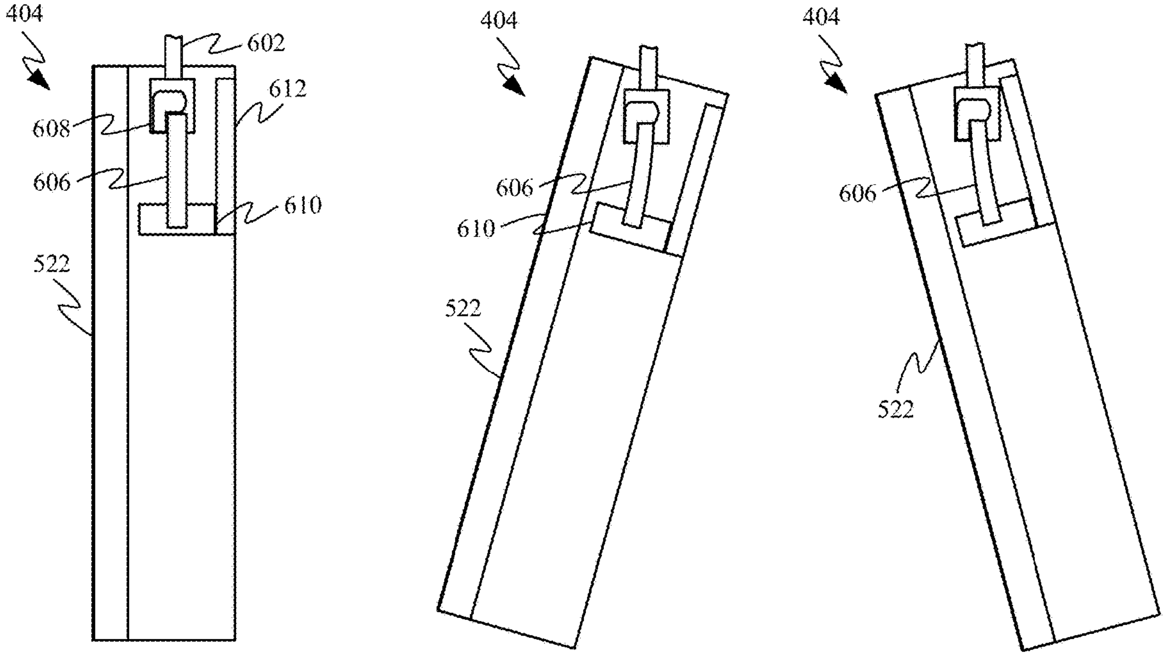
FIG. 6B-6D show a range of motion of an earpiece using the pivot mechanism depicted in FIG. 6A.

FIGS. 6B-6D show a range of motion of earpiece 404. FIG. 6B shows earpiece 404 in a neutral state with leaf springs 606 in an undeflected state. FIG. 6C shows leaf springs 606 being deflected in a first direction and FIG. 6D shows leaf spring 606 being deflected in a second direction opposite the first direction. FIGS. 6C-6D also show how the area between cushion 522 and earpiece housing 612 can accommodate the deflection of leaf springs 606.

Figure 6E:
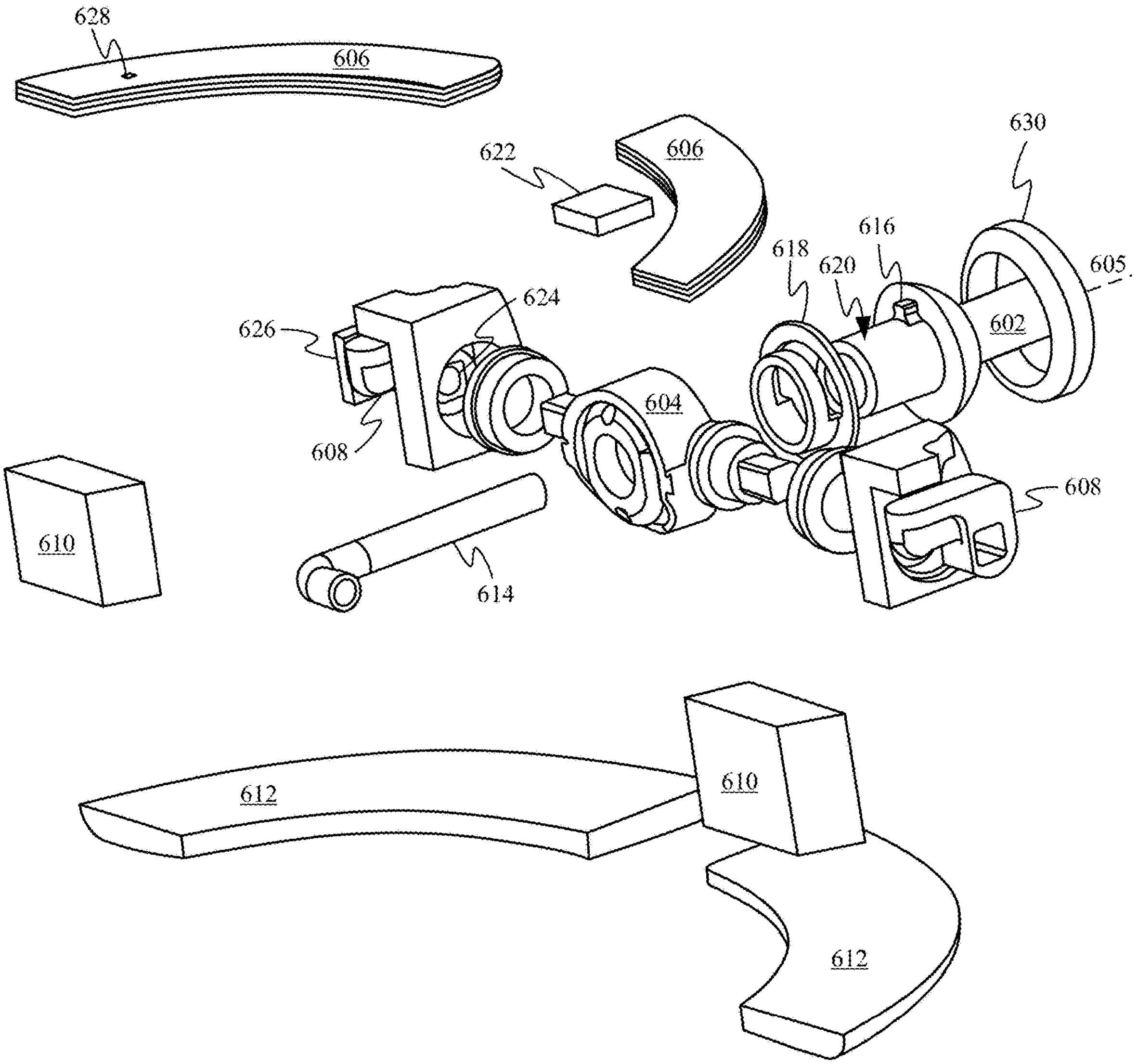
FIG. 6E shows an exploded view of the pivot mechanism depicted in FIG. 6A.

FIG. 6E shows an exploded view of pivot mechanism 600. FIG. 6E depicts mechanical stops that govern the amount of rotation possible about yaw axis 605. Stem 602 includes a protrusion 616, which is configured to travel within a channel defined by an upper yaw bushing 618. As depicted, the channel defined by upper yaw bushing 618 has a length that allows for greater than 180 degrees of rotation. In some embodiments, the channel can include a detent configured to define a neutral position for earpiece 404. FIG. 6E also depicts a portion of stem 602 that can accommodate yaw magnet 620. A magnetic field emitted by magnet 620 can be detected by magnetic field sensor 622. Magnetic field sensor 622 can be configured to determine an angle of rotation of stem 602 with respect to the rest of pivot mechanism 600. In some embodiments, magnetic field sensor 622 can be a Hall Effect sensor.

FIG. 6E also depicts roll magnet 624 and magnetic field sensor 626, which can be configured to measure an amount of deflection of leaf springs 606. In some embodiments, pivot mechanism 600 can also include strain gauge 628 configured to measure strain generated within leaf spring 606. The strain measured in leaf spring 606 can be used to determine which direction and how much leaf spring is being deflected. In this way, a processor receiving sensor readings recorded by strain gauge 628 can determine whether and in which direction leaf springs 606 are bending. In some embodiments, readings received from strain gauge can be configured to change an operating state of headphones associated with pivot mechanism 600. For example, the operating state can be changed from a playback state in which media is being presented by speakers associated with pivot mechanism 600 to a standby or inactive state in response to the readings from the strain gauge. In some embodiments, when leaf springs 606 are in an undeflected state this can be indicative of headphones associated with pivot mechanism 600 not being worn by a user. In other embodiments, the strain gauge can be positioned upon a headband spring. For this reason, ceasing playback based on this input can be very convenient as it allows a user to maintain a location in a media file until putting the headphones back on the head of the user at which point the headphones can be configured to resume playback of the media file. Seal 630 can close an opening between stem 602 and an exterior surface of an earpiece in order to prevent the ingress of foreign particulates that could interfere with the operation of pivot mechanism 600.

Figure 6F:
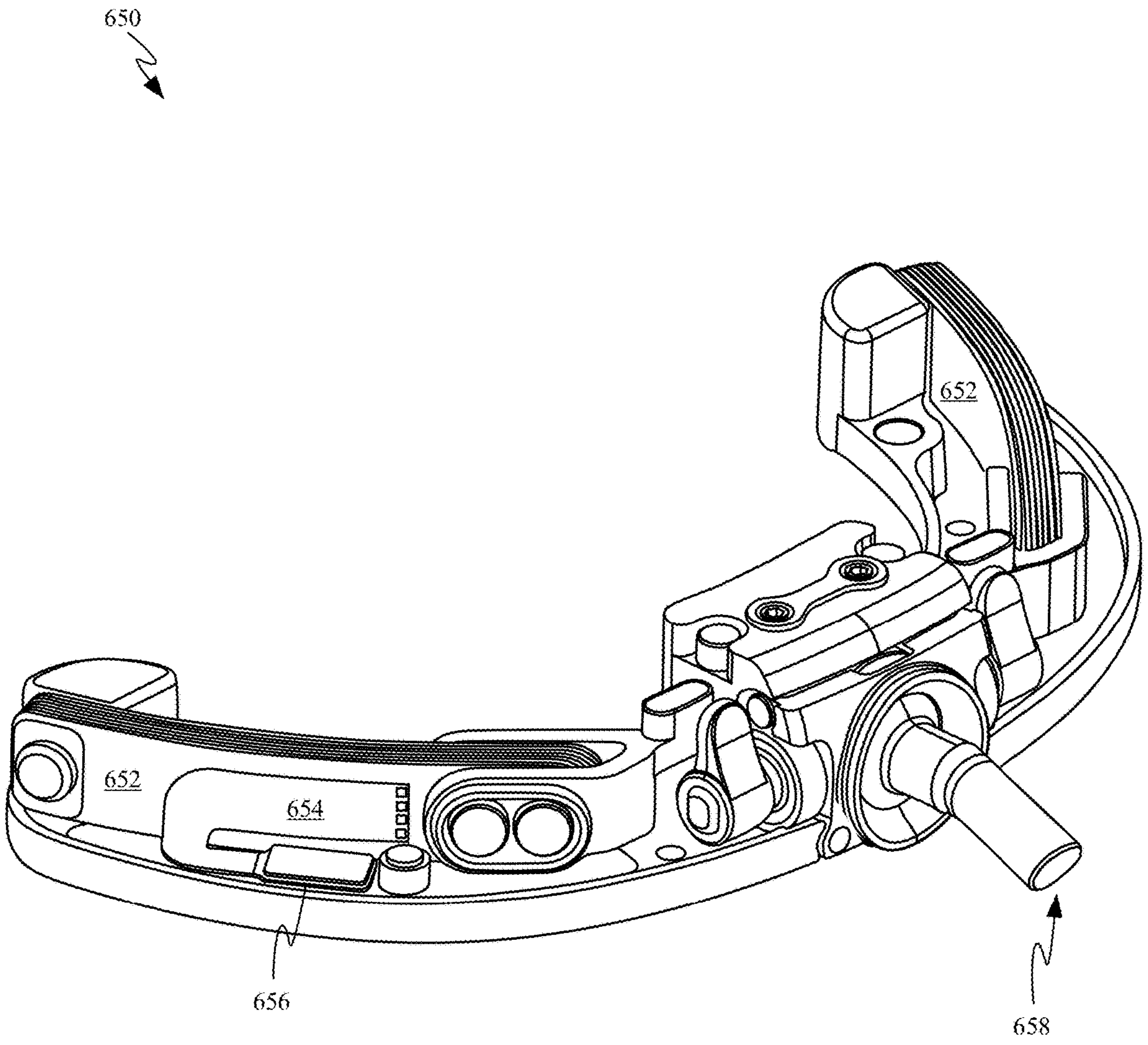
FIG. 6F shows a perspective view of another pivot mechanism.

FIG. 6F shows a perspective view of another pivot mechanism 650, which differs in some ways from pivot mechanism 600. Leaf springs 652 have a different orientation than leaf springs 606 of pivot mechanism 600. In particular, an orientation of leaf springs 652 is about 90 degrees different than an orientation of leaf springs 606. This results in a thick dimension of leaf springs 652 opposing rotation of an earpiece associated with pivot mechanism 650. FIG. 6F also shows flexible circuit 654 and board-to-board connector 656. Flexible circuit can electrically couple a strain gauge positioned upon leaf spring 652 to a circuit board or other electrically conductive pathways on pivot mechanism 650. Electrical signals can be routed through a distal end 658 of pivot mechanism 650, which allows electrical signals to be routed between the earpieces.

Figure 6G:
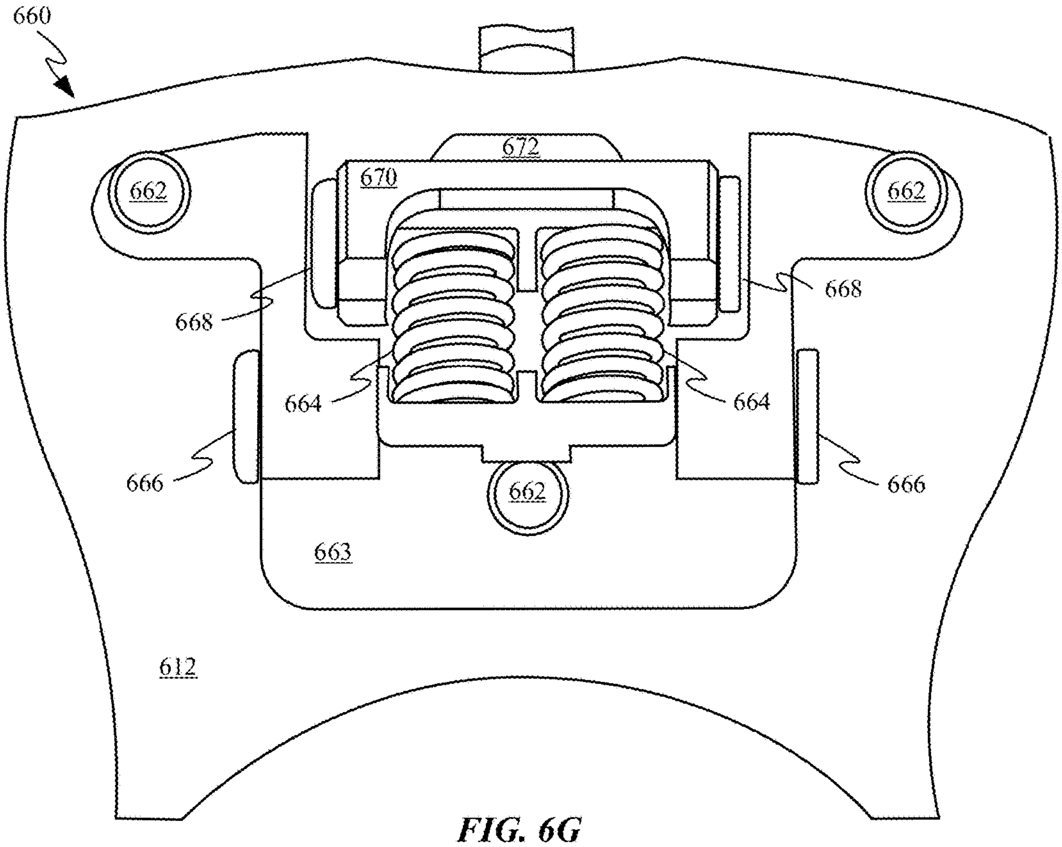
FIG. 6G shows yet another pivot mechanism.

FIG. 6G shows another pivot assembly 660 attached to earpiece housing 612 by fasteners 662 and bracket 663. Pivot assembly 660 can include multiple helical springs 664 arranged side by side. In this way, helical coils 664 can act in parallel increasing the amount of resistance provided by pivot assembly 660. Helical springs 664 are held in place and stabilized by pins 666 and 668. Actuator 670 translates any force received from rotation of stem base 672 to helical springs 664. In this way, helical springs 664 can establish a desired amount of resistance to rotation of stem base 672.

Figure 6H:
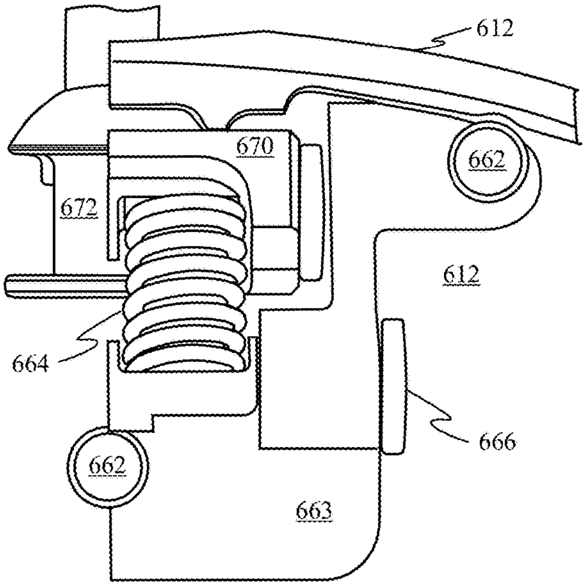
FIGS. 6H-6I show the pivot mechanism depicted in FIG. 6G with one side removed in order to illustrate rotation of a stem base in different positions.
Figure 6I:
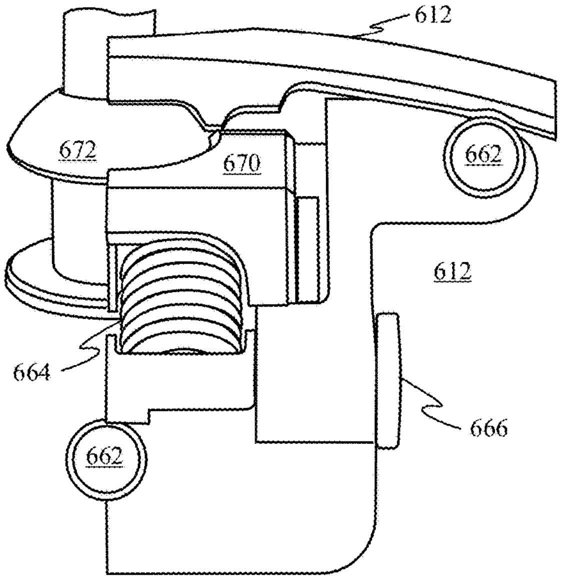

FIGS. 6H-6I show pivot assembly 660 with one side removed in order to illustrate rotation of stem base 672 in different positions. In particular, FIGS. 6H-6I shows how rotation of stem base 672 results in rotation of actuator 670 and compression of helical springs 664.

Figure 6J:
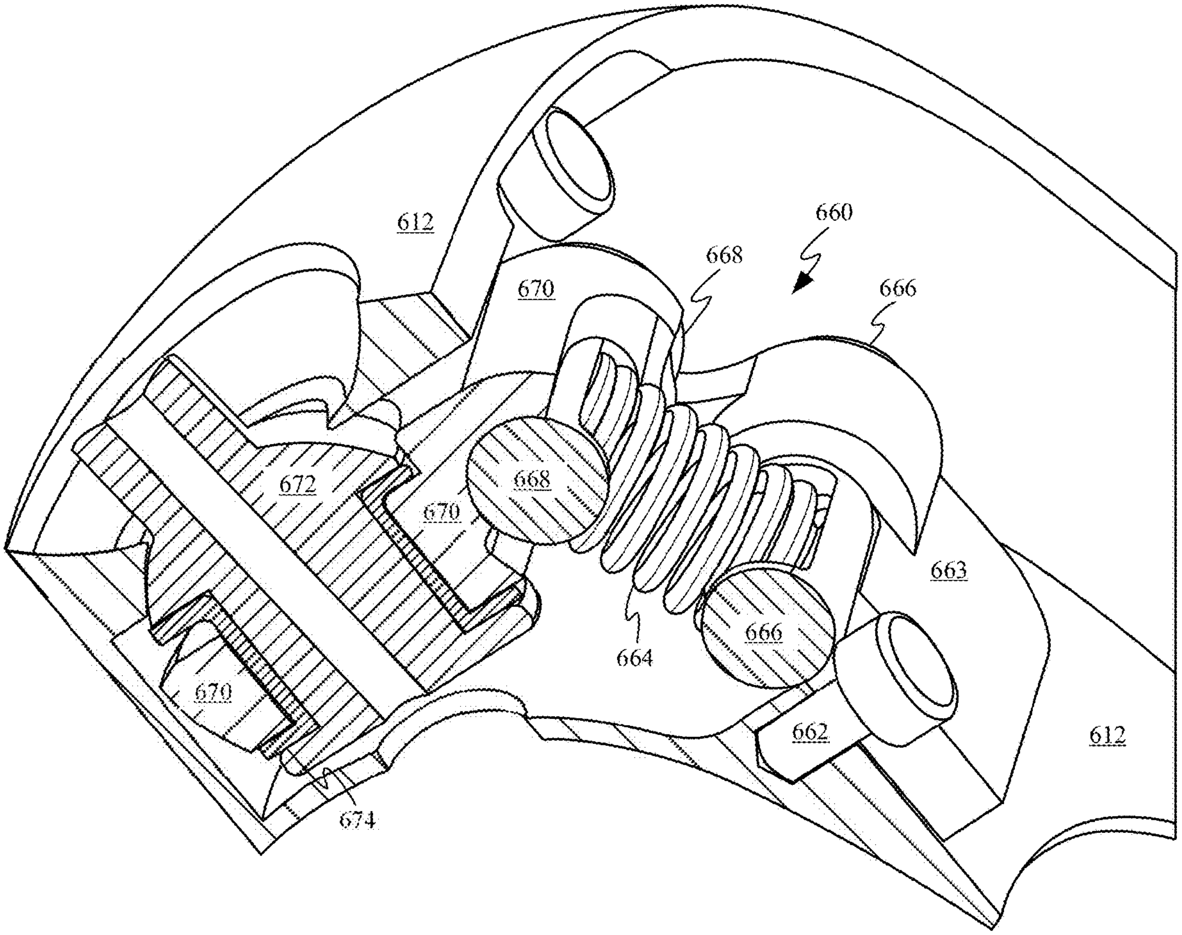
FIG. 6J shows a cutaway perspective view of the pivot assembly of FIG. 6G disposed within an earpiece housing.

FIG. 6J shows a cutaway perspective view of pivot assembly 660 disposed within earpiece housing 612. In some embodiments, stem base 672 can include a bearing 674, as depicted, to reduce friction between stem base 672 and actuator 670. FIG. 6J also shows how bracket 663 can define a bearing for securing pin 666 in place. Pins 666 and 668 are also shown defining flattened recesses for keeping helical springs 664 securely in place. In some embodiments, the flattened recess can include protrusions that extends into central openings of helical springs 664.

Figure 6K:
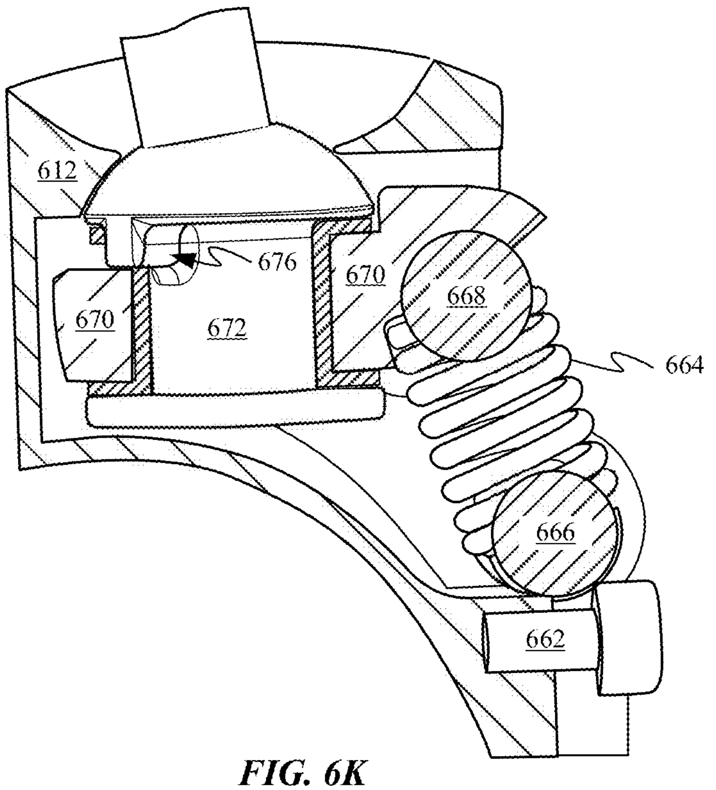
FIGS. 6K-6L show partial cross-sectional side views of the pivot assembly positioned within the earpiece housing with helical springs in relaxed and compressed states.
Figure 6L:
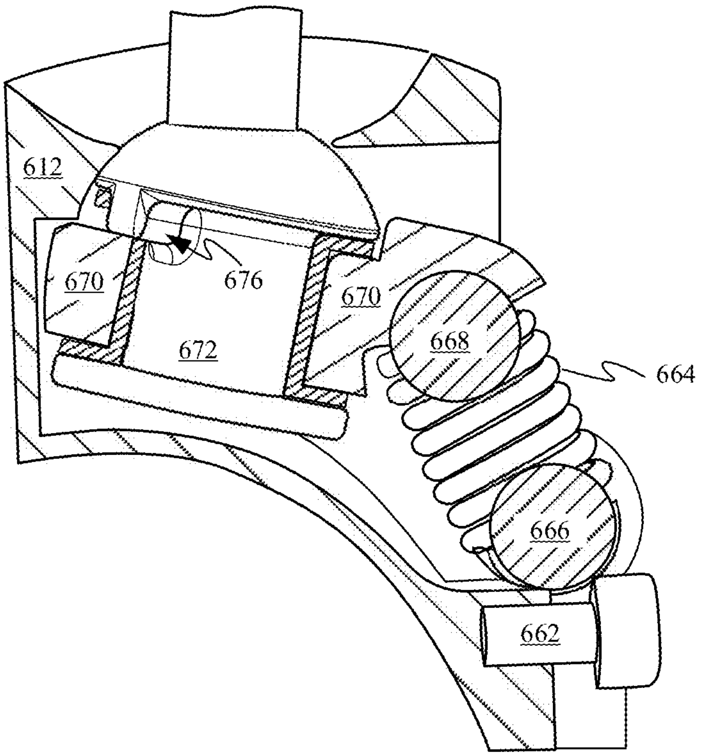

FIGS. 6K-6L show partial cross-sectional side views of pivot assembly 660 positioned within earpiece housing with helical springs 664 in relaxed and compressed states. In particular, the motion undergone by actuator 670 when shifting from a first position in FIG. 6K to a second position of maximum deflection is clearly depicted. FIGS. 6K and 6L also depict mechanical stop 676 which helps limit an amount of rotation earpiece housing can achieve relative to stem base.

Low Spring-Rate Band

Figure 7A:
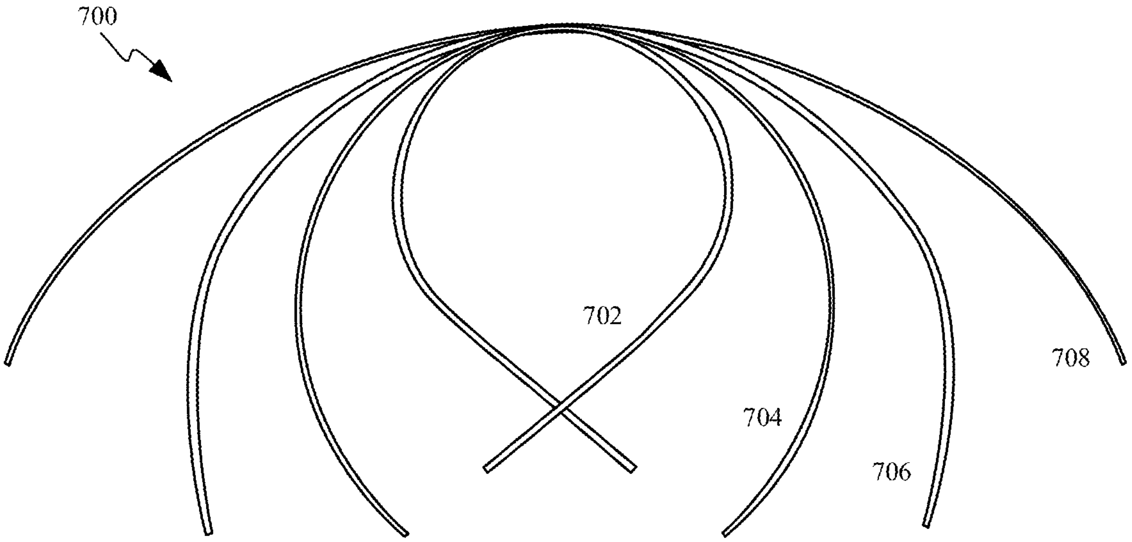
FIG. 7A shows multiple positions of a spring band suitable for use in a headband assembly.

FIG. 7A shows multiple positions of a spring band 700 suitable for use in a headband assembly. Spring band 700 can have a low spring rate that causes a force generated by the band in response to deformation of spring band 700 to change slowly as a function of displacement. Unfortunately, the low spring rate also results in the spring having to go through a larger amount of displacement before exerting a particular amount of force. Spring band 700 is depicted in different positions 702, 704, 706 and 708. Position 702 can correspond to spring band 700 being in a neutral state at which no force is exerted by spring band 700. At position 704, a spring band 700 can begin exerting a force pushing spring band 700 back toward its neutral state. Position 706 can correspond to a position at which users with small heads bend spring band 700 when using headphones associated with spring band 700. Position 708 can correspond to a position of spring band 700 in which the users with large heads bend spring band 700. The displacement between positions 702 and 706 can be sufficiently large for spring band 700 to exert an amount of force sufficient to keep headphones associated with spring band 700 from falling off the head of a user. Further, due to the low spring rate the force exerted by spring band 700 at position 708 can be small enough so that use of headphones associated with spring band 700 is not high enough to cause a user discomfort. In general, the lower the spring rate of spring band 700, the smaller the variation in force exerted by spring band 700. In this way, use of a low spring-rate spring band 700 can allow headphones associated with spring band 700 to give users with different sized heads a more consistent user experience.

Figure 7B:
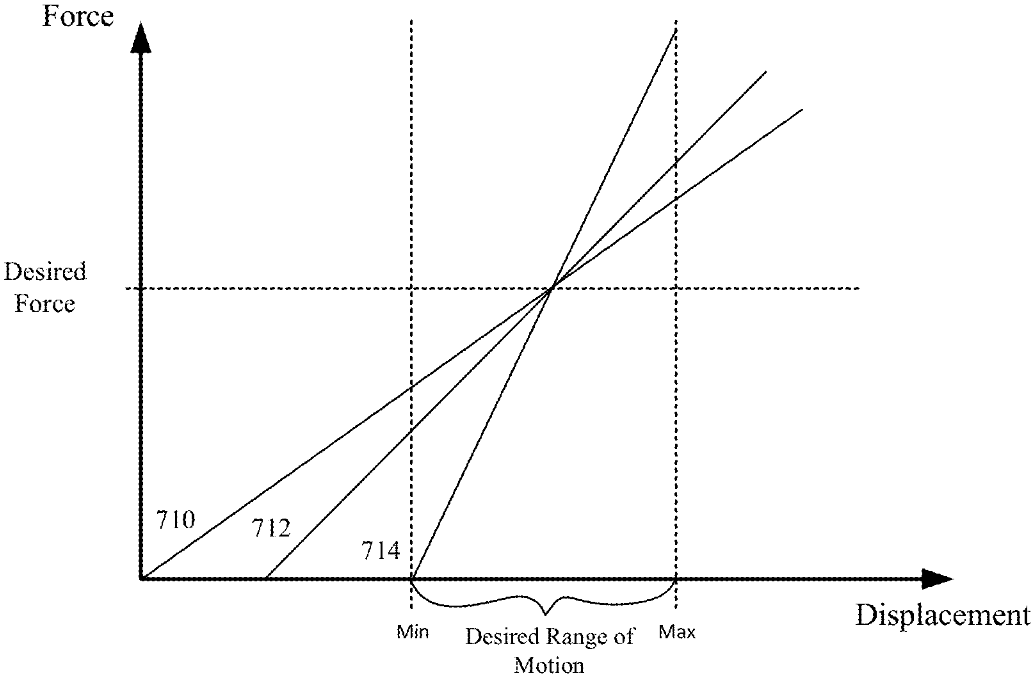
FIG. 7B shows a graph illustrating how spring force varies based on spring rate as a function of displacement of the spring band depicted in FIG. 7A.

FIG. 7B shows a graph illustrating how spring force varies based on spring rate as a function of displacement of spring band 700. Line 710 can represent spring band 700 having its neutral position equivalent to position 702. As depicted, this allows spring band 700 to have a relatively low spring rate that still passes through a desired force in the middle of the range of motion for a particular pair of headphones. Line 712 can represent spring band 700 having its neutral position equivalent to position 704. As depicted, a higher spring rate is required to achieve a desired amount of force being exerted in the middle of the desired range of motion. Finally, line 714 represents spring band 700 having its neutral position equivalent to position 706. Setting spring band 700 to have a profile consistent with line 714 would result in no force being exerted by spring band 700 at the minimum position for the desired range of motion and over twice the amount of force exerted compared with spring band 700 having a profile consistent with line 710 at the maximum position. While configuring spring band 700 to travel through a greater amount of displacement prior to the desired range of motion has clear benefits when wearing headphones associated with spring band 700, it may not be desirable for the headphones to return to position 702 when worn around the neck of a user. This could result in the headphones uncomfortably clinging to the neck of a user.

Figure 8A:
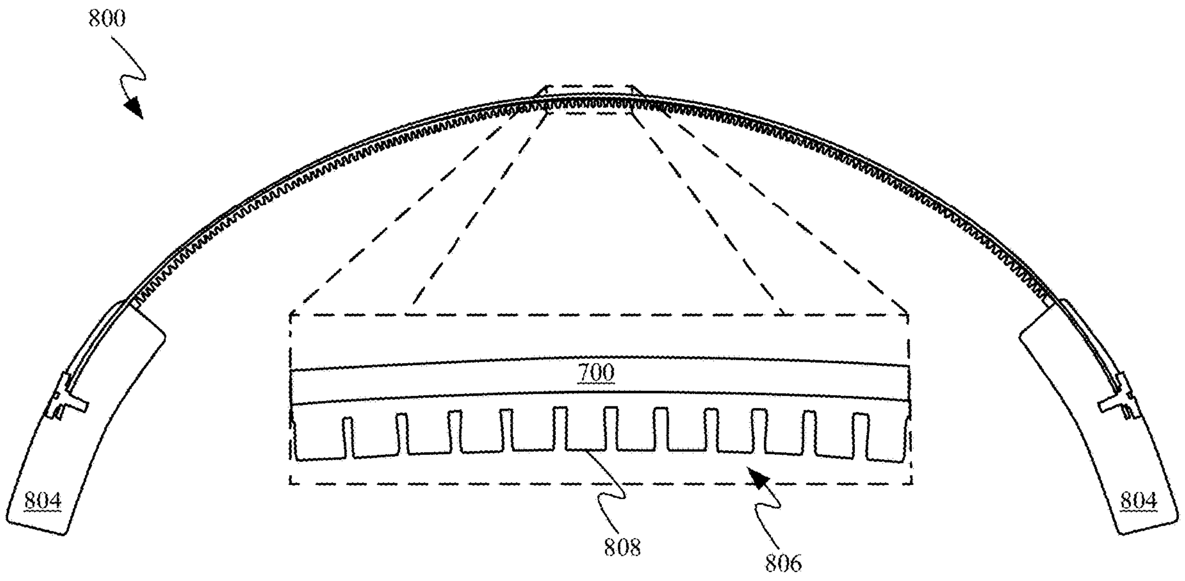
FIGS. 8A-8B show a solution for preventing discomfort caused by headphones wrapping too tightly around the neck of a user.
Figure 8B:
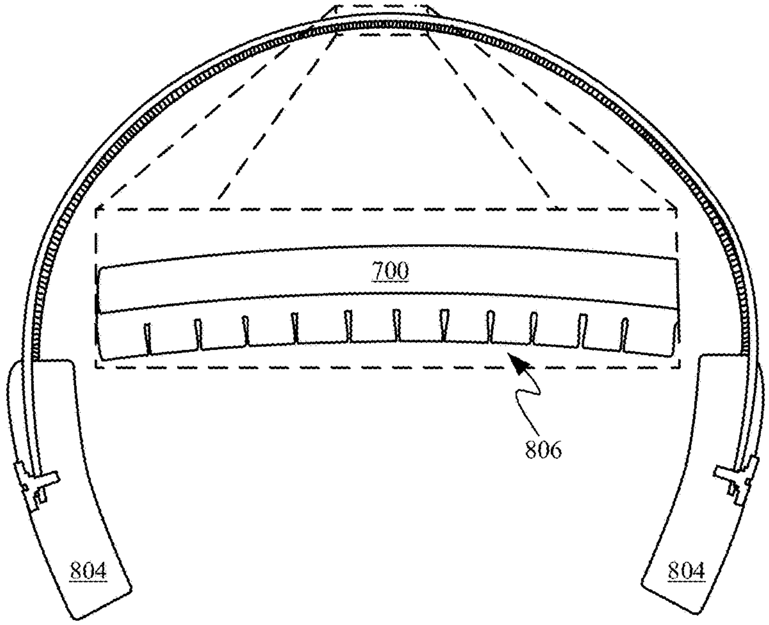

FIG. 8A-8B show a solution for preventing discomfort caused by headphones 800 utilizing a low spring-rate spring band from wrapping too tightly around the neck of a user. Headphones 800 include a headband assembly 802 joining earpieces 804. Headband assembly 802 includes compression band 806 coupled to an interior-facing surface of spring band 700. FIG. 8A shows spring band 700 in position 708, corresponding to a maximum deflection position of headphones 800. The force exerted by spring band 700 can act as a deterrent to stretching headphones 800 past this maximum deflection position. In some embodiments, an exterior facing surface of spring band 700 can include a second compression band configured to oppose deflection of spring band 700 past position 708. As depicted, knuckles 808 of compression band 806 serve little purpose when spring band is in position 708 because none of the lateral surfaces of knuckles 808 are in contact with adjacent knuckles 808.

Figure 8C:
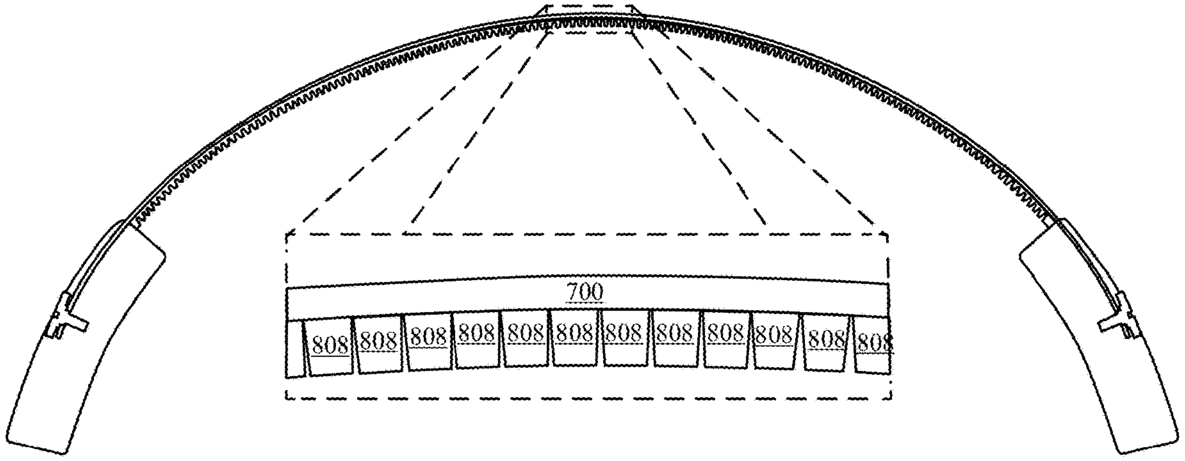
FIGS. 8C-8D show how separate and distinct knuckles can be arranged along the lower side of a spring band to prevent the spring band from returning to a neutral position.
Figure 8D:
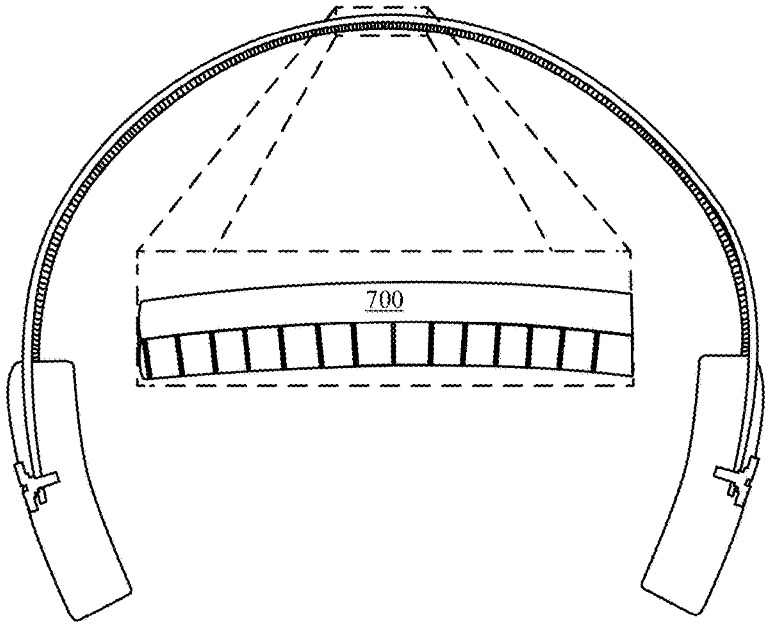

FIG. 8B shows spring band 700 in position 706. At position 706, knuckles 808 come into contact with adjacent knuckles 808 to prevent further displacement of spring band 700 towards position 704 or 702. In this way, compression band 806 can prevent spring band 700 from squeezing the neck of a user of headphones 800 while maintaining the benefits of the low-spring rate spring band 700. FIGS. 8C-8D show how separate and distinct knuckles 808 can be arranged along the lower side of spring band 700 to prevent spring band 700 from returning past position 706.

Figure 8E:
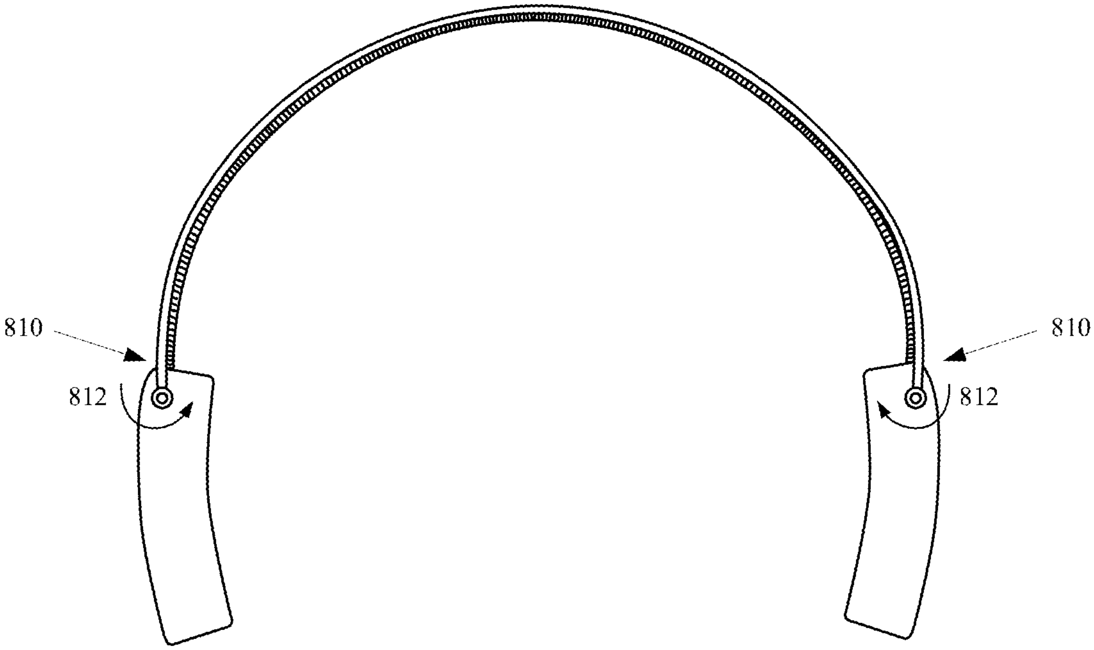
FIGS. 8E-8F show how springs joining a headband assembly to earpieces can cooperate with spring band 700 to set the actual amount of force applied to a user by headphones.
Figure 8F:
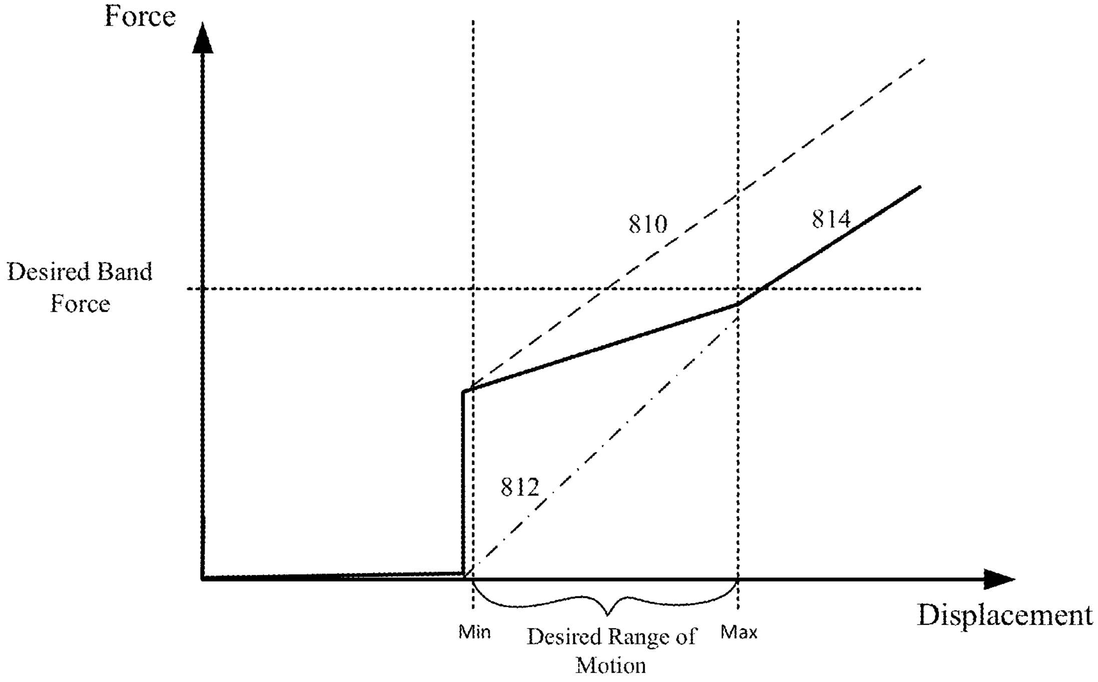

FIGS. 8E-8F show how the use of springs to control the motion of headband assembly 802 with respect to earpieces 804 can change the amount of force applied to a user by headphones 800 when compared to the force applied by spring band 700 alone. FIG. 8E shows forces 810 exerted by spring band 700 and forces 812 exerted by springs controlling the motion of earpieces 804 with respect to headband assembly 802. FIG. 8F shows exemplary curves illustrating how forces 810 and 812 supplied by at least two different springs can vary based on spring displacement. Force 810 does not begin to act until just prior to the desired range of motion because of the compression band preventing spring band 700 from returning all the way to a neutral state. For this reason, the amount of force imparted by force 810 begins at a much higher level, resulting in a smaller variation in force 810. FIG. 8F also illustrates force 814, the result of forces 810 and 812 acting in series. By arranging the springs in series, a rate at which the resulting force changes as headphones 800 change shape to accommodate the size of a user's head is reduced. In this way, the dual spring configuration helps to provide a more consistent user experience for a user base that includes a great diversity of head shapes.

Figure 9A:
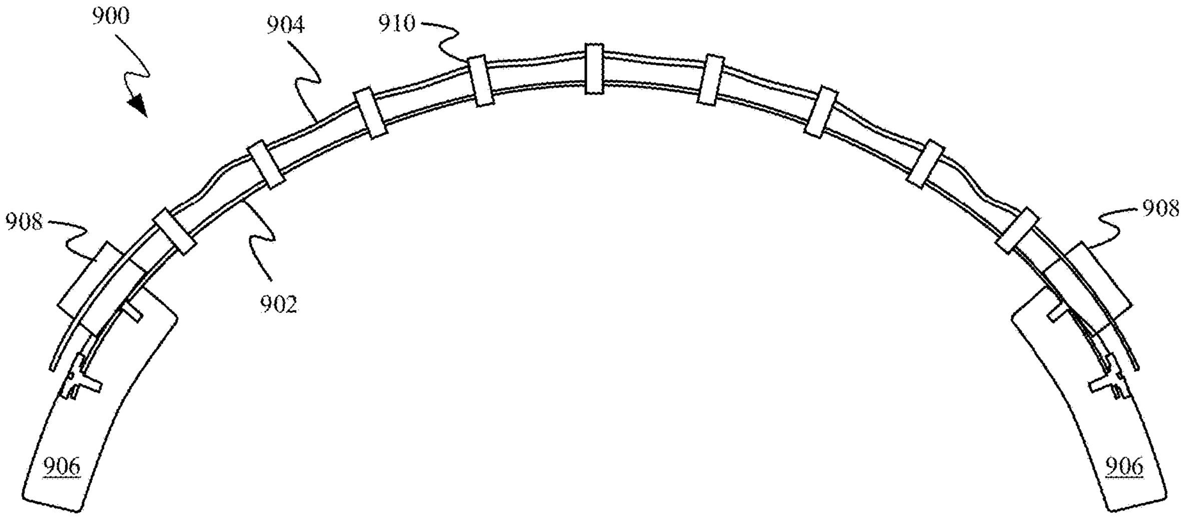
FIGS. 9A-9B show another way in which to limit the range of motion of a pair of headphones using a low spring-rate band.
Figure 9B:
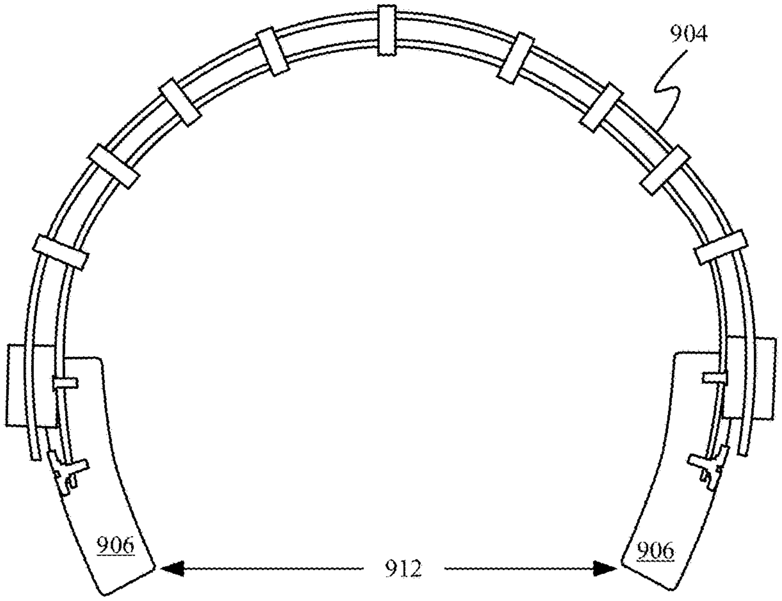

FIGS. 9A-9B show another way in which to limit the range of motion of a pair of headphones 900 using a low spring-rate band 902. FIG. 9A shows cable 904 in a slack state on account of earpieces 906 being pulled apart. The range of motion of low spring-rate band 902 can be limited by cable 904 achieving a similar function to the function of compression band 806, engaging as a result of function of tension instead of compression. Cable 904 is configured to extend between earpieces 906 and is coupled to each of earpieces 906 by anchoring features 908. Cable 904 can be held above low spring-rate band 902 by wire guides 910. Wire guides 910 can be similar to wire guides 210 depicted in FIGS. 2A-2G, with the difference that wire guides 910 are configured to elevate cable 904 above low spring-rate band 902. Bearings of wire guides 910 can prevent cable 904 from catching or becoming undesirably tangled. It should be noted that cable 904 and low spring-rate band 902 can be covered by a cosmetic cover. It should also be noted that in some embodiments, cable 904 could be combined with the embodiments shown in FIGS. 2A-2G to produce headphones capable of synchronizing earpiece position and controlling the range of motion of the headphones.

FIG. 9B shows how when earpieces 906 are brought closer together cable 904 tightens and eventually stops further movement of earpieces 906 closer together. In this way, a minimum distance 912 between earpieces 906 can be maintained that allows headphones 900 to be worn comfortably around the neck of a broad population of users without squeezing the neck of the user too tightly.

Left/Right Ear Detection

Figure 10A:
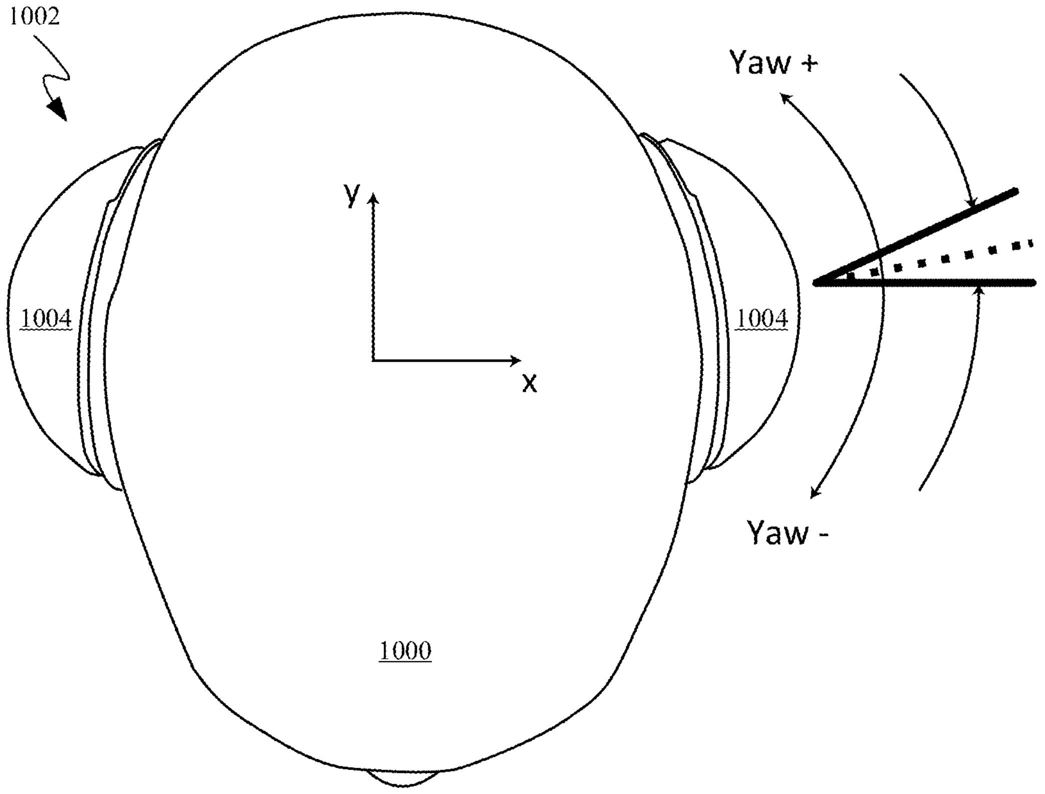
FIG. 10A shows a top view of an exemplary head of a user wearing headphones.
Figure 10B:
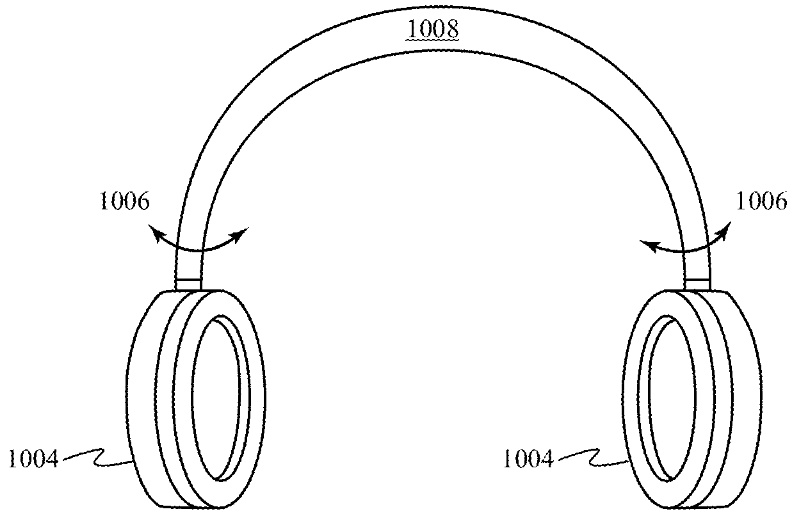
FIG. 10B shows a front view of the headphones depicted in FIG. 10A.

FIG. 10A shows a top view of an exemplary head of a user 1000 wearing headphones 1002. Earpieces 1004 are depicted on opposing sides of user 1000. A headband joining earpieces 1004 is omitted to show the features of the head of user 1000 in greater detail. As depicted, earpieces 1004 are configured to rotate about a yaw axis so they can be positioned flush against the head of user 1000 and oriented slightly towards the face of user 1000. In a study performed upon a large group of users it was found that on average, earpieces 1004 when situated over the ears of a user were offset above the x-axis as depicted. Furthermore, for over 99% of users the angle of earpieces 1004 with respect to the x-axis was above the x-axis. This means that only a statistically irrelevant portion of users of headphones 1002 would have head shapes causing earpieces 1004 to be oriented forward of the x-axis. FIG. 10B shows a front view of headphones 1002. In particular, FIG. 10B shows yaw axes of rotation 1006 associated with earpieces 1004 and how earpieces 1004 are both oriented toward the same side of headband 1008 joining earpieces 1004.

Figure 10C:
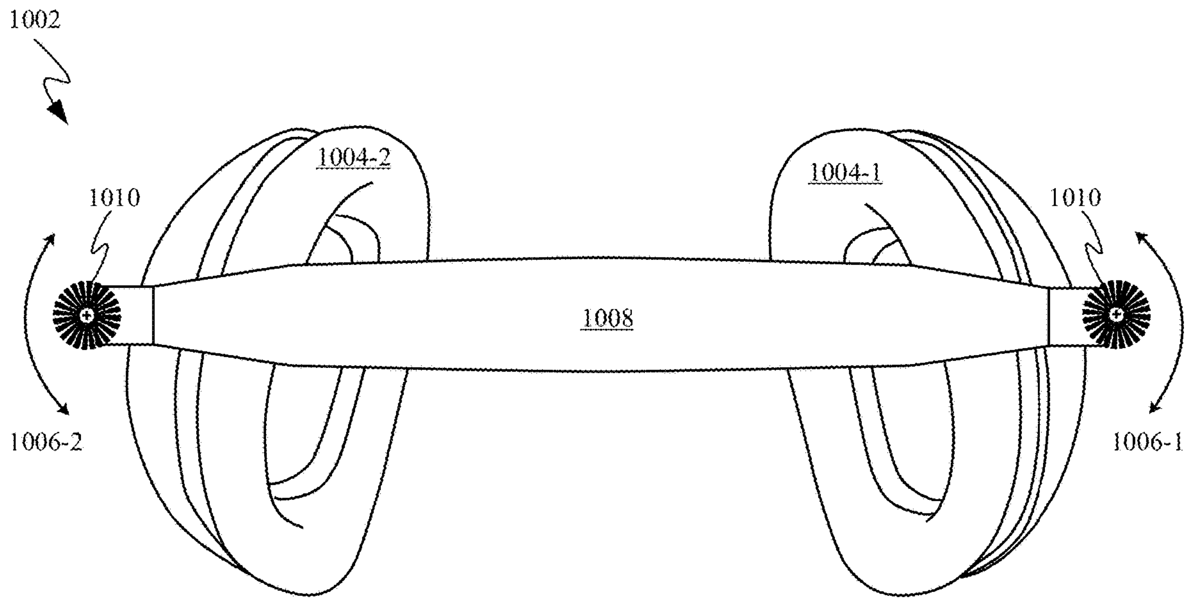
FIGS. 10C-10D show top views of the headphones depicted in FIG. 10A and how earpieces of the headphones are able to rotate about respective yaw axes.
Figure 10D:
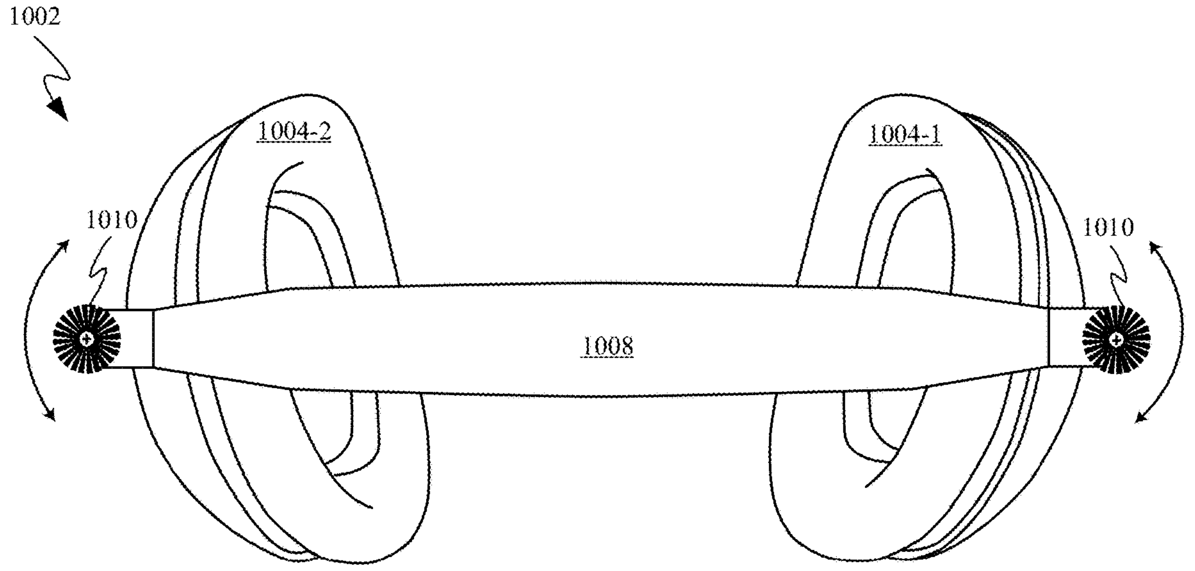

FIGS. 10C-10D show top views of headphones 1002 and how earpieces 1004 are able to rotate about yaw axes of rotation 1006. FIGS. 10C-10D also show earpieces 1004 being joined together by headband 1008. Headband 1008 can include yaw position sensors 1010, which can be configured to determine an angle of each of earpieces 1004 with respect to headband 1008. The angle can be measured with respect to a neutral position of earpieces with respect to headband 1008. The neutral position can be a position in which earpieces 1004 are oriented directly toward a central region of headband 1008. In some embodiments, earpieces 1004 can have springs that return earpieces 1004 to the neutral position when not being acted upon by an external force. The angle of earpieces relative to the neutral position can change in a clockwise direction or counter clockwise direction. For example, in FIG. 10C earpiece 1004-1 is biased about axis of rotation 1006-1 in a counter clockwise direction and earpiece 1004-2 is biased about axis of rotation 1006-2 in a clockwise direction. In some embodiments, sensors 1010 can be time of flight sensors configured to measure angular change of earpieces 1004. The depicted pattern associated and indicated as sensor 1010 can represent an optical pattern allowing accurate measurement of an amount of rotation of each of the earpieces. In other embodiments, sensors 1010 can take the form of magnetic field sensors or Hall Effect sensors as described in conjunction with FIGS. 5B and 6E. In some embodiments, sensors 1010 can be used to determine which ear each earpiece is covering for a user. Because earpieces 1004 are known to be oriented behind the x-axis for almost all users, when sensors 1010 detect both earpieces 1004 oriented to towards one side of the x-axis headphones 1002 can determine which earpieces are on which ear. For example, FIG. 10C shows a configuration in which earpiece 1004-1 can be determined to be on the left ear of a user and earpiece 1004-2 is on the right ear of the user. In some embodiments, circuitry within headphones 1002 can be configured to adjust the audio channels so the correct channel is being delivered to the correct ear.

Similarly, FIG. 10D shows a configuration in which earpiece 1004-1 is on the right ear of a user and earpiece 1004-2 is on the left ear of a user. In some embodiments, when earpieces are not oriented towards the same side of the x-axis, headphones 1002 can request further input prior to changing audio channels. For example, when earpieces 1004-1 and 1004-2 are both detected as being biased in a clockwise direction, a processor associated with headphones 1002 can determine headphones 1002 are not in current use. In some embodiments, headphones 1002 can include an override switch for the case where the user wants to flip the audio channels independent of the L/R audio channel routing logic associated with yaw position sensors 1010. In other embodiments, another sensor or sensors can be activated to confirm the position of headphones 1002 relative to the user.

Figure 10E:
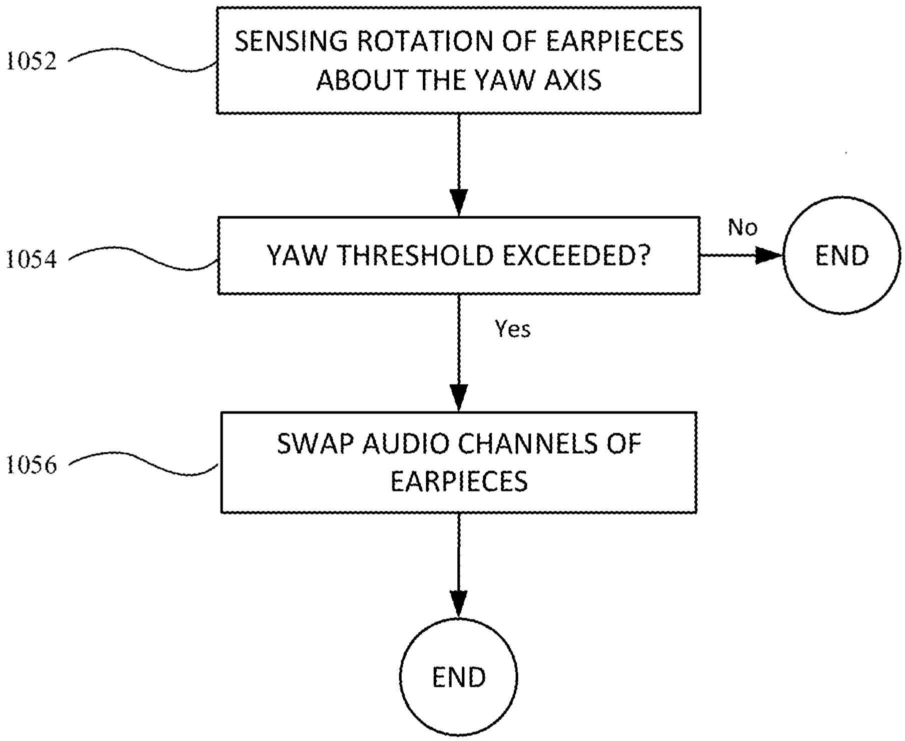
FIGS. 10E-10F show flow charts describing control methods that can be carried out when roll and/or yaw of the earpieces with respect to the headband is detected.
Figure 10F:
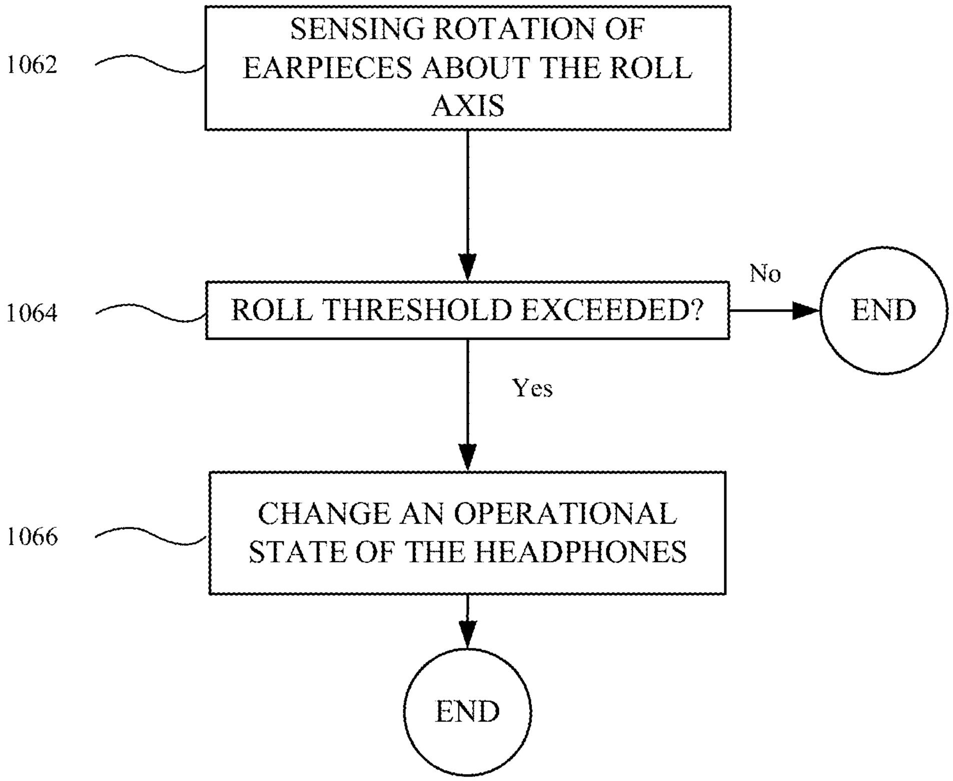

FIGS. 10E-10F show flow charts describing control methods that can be carried out when roll and/or yaw of the earpieces with respect to the headband is detected. FIG. 10E shows a flow chart that describes a response to detection of rotation of earpieces with respect to a headband of headphones about a yaw axis. The yaw axes can extend through a point located near the interface between each earpiece and the headband. When the headphones are being used by a user, the yaw axes can be substantially parallel to a vector defining the intersection of the sagittal and coronal anatomical planes of the user. At 1052, rotation of the earpieces about the yaw axes can be detected by a rotation sensor associated with a pivot mechanism. In some embodiments, the pivot mechanism can be similar to pivot mechanism 500 or pivot mechanism 600, which depict yaw axes 506 and 605. At 1054, a determination can be made regarding whether a threshold associated with rotation about the yaw axis has been exceeded. In some embodiments, the yaw threshold can be met anytime the earpieces pass through a position where the ear-facing surfaces of the two earpieces can be facing directly towards one another. At 1056, in the case where at least one of the earpieces passes through the threshold and both earpieces are determined to be oriented in the same direction, the audio channels being routed to the two earpieces can be swapped. In some embodiments, the user can be notified of the change in audio channels. In some embodiments, an amount of roll detected by the pivot mechanism can be factored into a determination of how to assign the audio channels.

FIG. 10F shows a flow chart that describes a response to detection of rotation of earpieces with respect to a headband of headphones about roll axes. The roll axes can pass through a point near the interface between each earpiece and the headband. When the headphones are being used by a user, the roll axes can be substantially parallel to a vector defining the intersection of the sagittal and axial anatomical planes of the user. At 1062, rotation of the earpieces about the yaw axes can be detected by a rotation sensor associated with a pivot mechanism. In some embodiments, the pivot mechanism can be similar to pivot mechanism 500 or pivot mechanism 600, which depict roll axis 510 and roll direction 601, respectively. At 1064, a determination can be made regarding whether a threshold associated with rotation about the roll axis has been exceeded. In some embodiments, the threshold can be met anytime the spring(s) controlling the rotation of the earpieces with respect to the headband are required to exert a force. In some embodiments, a position sensor such as a Hall Effect sensor can be configured to measure an angle of the earpieces with respect to the roll axis. At 1066, an operational state of the headphones is changed when the roll angle of the earpieces with respect to the headband indicates the headphones have gone from being in use to out of use or vice versa.

Figure 10G:
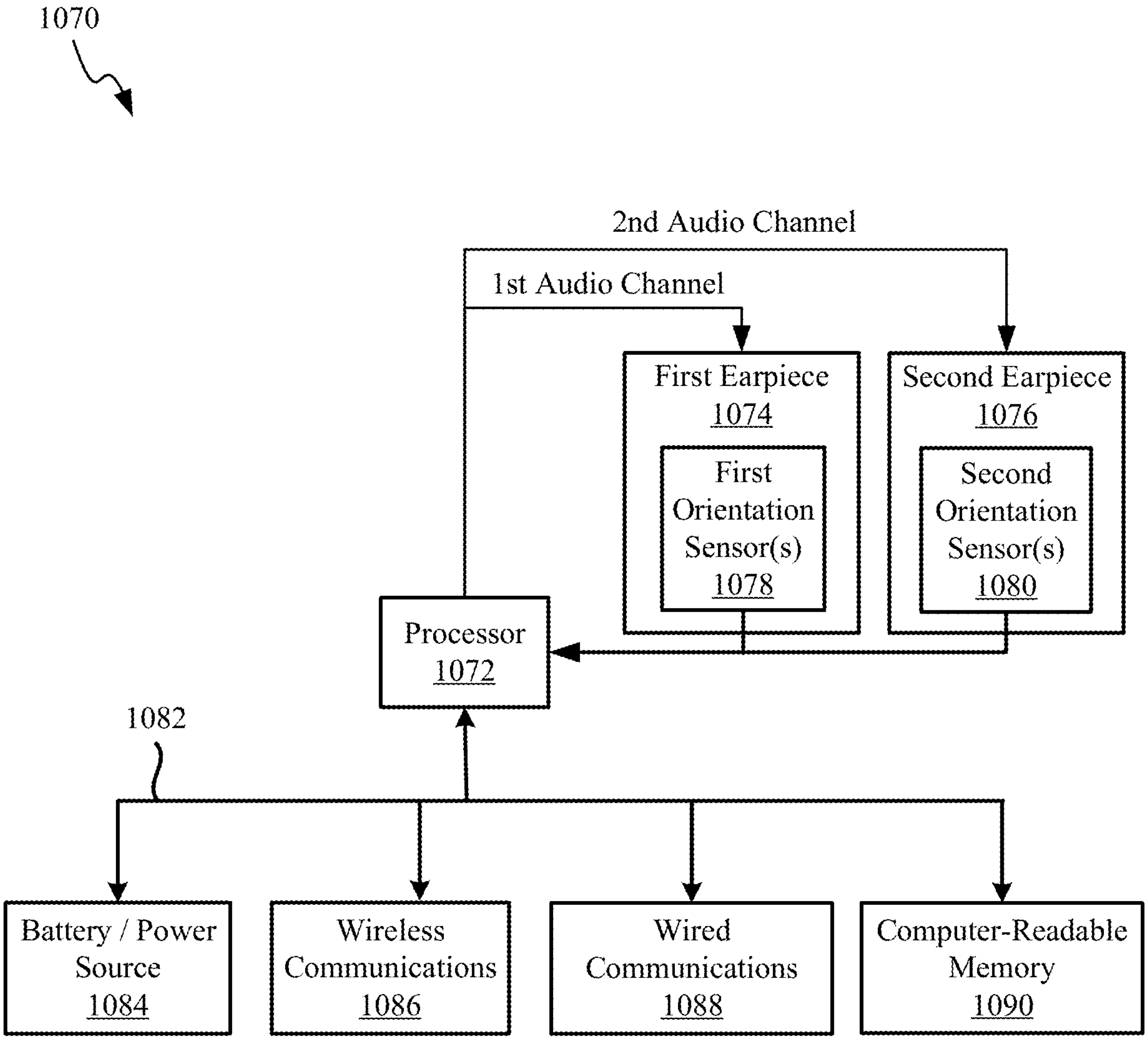
FIG. 10G shows a system level block diagram of a computing device 1070 that can be used to implement the various components described herein.

FIG. 10G shows a system level block diagram of a computing device 1070 that can be used to implement the various components described herein, according to some embodiments. In particular, the detailed view illustrates various components that can be included in headphones 1002 illustrated in FIGS. 10A-10D. As shown in FIG. 10G, the computing device 1070 can include a processor 1072 that represents a microprocessor or controller for controlling the overall operation of computing device 1070. The computing device 1070 can include first and second earpieces 1074 and 1076 joined by a headband assembly, the earpieces including speakers for presenting media content to the user. Processor 1072 can be configured to transmit first and second audio channels to first and second earpieces 1074 and 1076. In some embodiments, first orientation sensor(s) 1078 can be configured to transmit orientation data of first earpiece 1074 to processor 1072. Similarly, second orientation sensor(s) 1080 can be configured to transmit orientation data of second earpiece 1076 to processor 1072. Processor 1072 can be configured to swap the 1st Audio Channel with the 2nd Audio Channel in accordance with information received from first and second orientation sensors 1078 and 1080. A data bus 1082 can facilitate data transfer between at least battery/power source 1084, wireless communications circuitry 1086, wired communications circuitry 1088 computer readable memory 1090 and processor 1072. In some embodiments, processor 1072 can be configured to instruct battery/power source 1084 in accordance with information received by first and second orientation sensors 1078 and 1080. Wireless communications circuitry 1086 and wired communications circuitry 1088 can be configured to provide media content to processor 1072. In some embodiments, processor 1072, wireless communications circuitry 1086 and wired communications circuitry 1088 can be configured to transmit and receive information from computer-readable memory 1090. Computer readable memory 1090 can include a single disk or multiple disks (e.g. hard drives) and includes a storage management module that manages one or more partitions within computer readable memory 1090.

Foldable Headphones

Figure 11A:
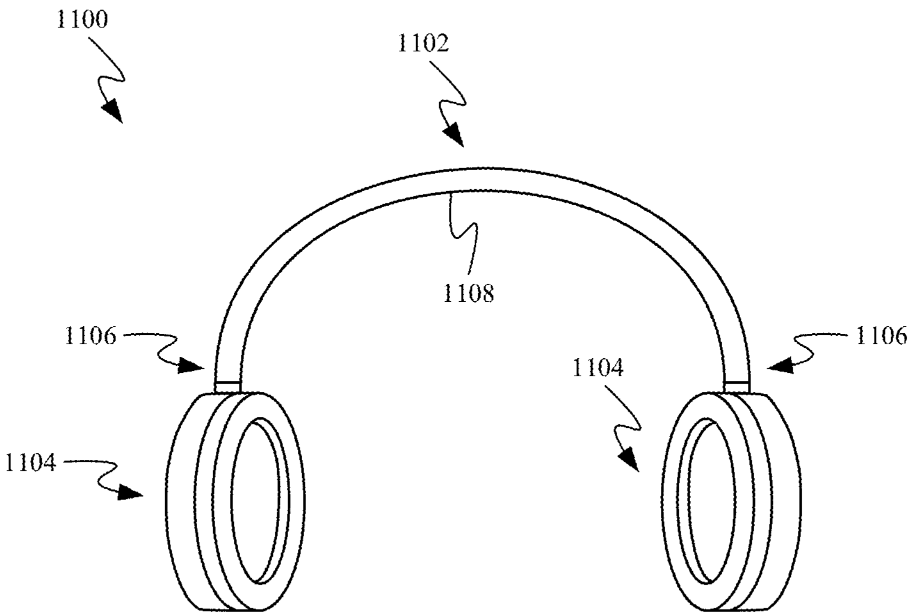
FIGS. 11A-11C show foldable headphones.
Figure 11B:
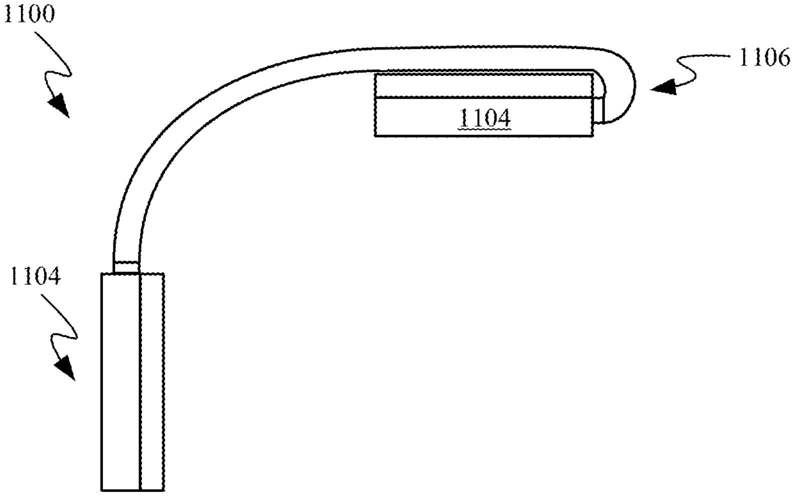

FIGS. 11A-11B show headphones 1100 having a deformable form factor. FIG. 11A shows headphones 1100 including deformable headband assembly 1102, which can be configured to mechanically and electrically couple earpieces 1104. In some embodiments, earpieces 1104 can be ear cups and in other embodiments, earpieces 1104 can be on-ear earpieces. Deformable headband assembly 1102 can be joined to earpieces 1104 by foldable stem regions 1106 of headband assembly 1102. Foldable stem regions 1106 are arranged at opposing ends of deformable band region 1108. Each of foldable stem regions 1106 can include an over-center locking mechanism that allows each of earpieces 1104 to remain in a flattened state after being rotated against deformable band region 1108. The flattened state refers to the curvature of deformable band region 1108 changing to become flatter than in the arched state. In some embodiments, deformable band region 1108 can become very flat but in other embodiments, the curvature can be more variable (as shown in the following figures). The over-center locking mechanism allows earpieces 1104 to remain in the flattened state until a user rotates the over-center locking mechanism back away from deformable band region 1108. In this way, a user need not find a button to change the state, but simply perform the intuitive action of rotating the earpiece back into its arched state position.

Figure 11C:
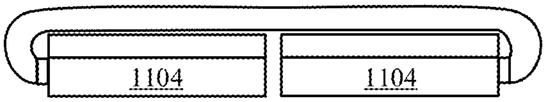

FIG. 11B shows one of earpieces 1104 rotated into contact with deformable band region 1108. As depicted, rotation of just one of earpieces 1104 against deformable band region 1108 causes half of deformable band region 1108 to flatten. FIG. 11C shows the second one of earpieces rotated against deformable band region 1108. In this way, headphones 1100 can be easily transformed from an arched state (i.e. FIG. 11A) to a flattened state (i.e. FIG. 11C). In the flattened state headphones, the size of headphones 1100 can be reduced to a size equivalent to two earpieces arranged end to end. In some embodiments, deformable band region can press into cushions of earpieces 1104, thereby substantially preventing headband assembly 1102 from adding to the height of headphones 1100 in the flattened state.

Figure 11D:
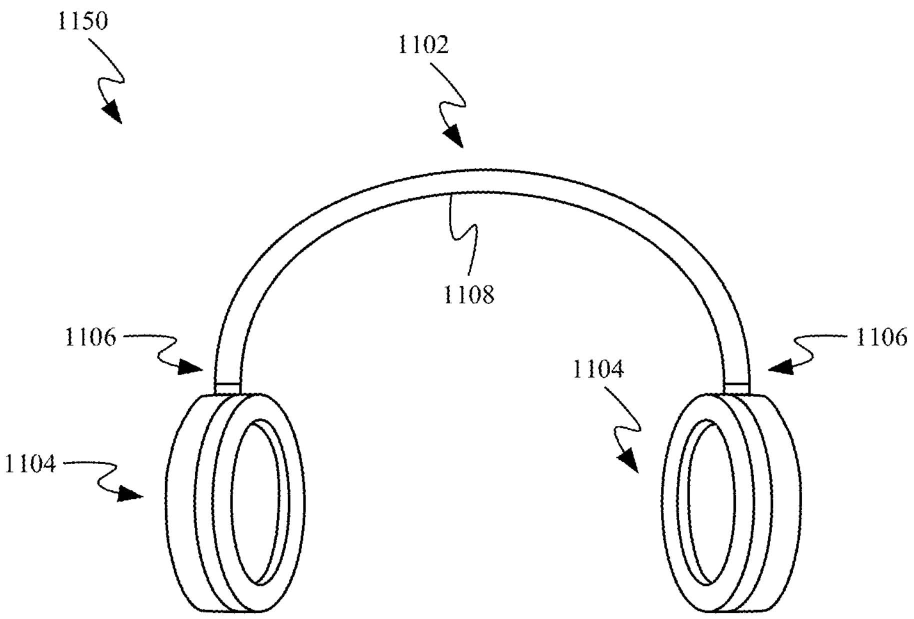
FIGS. 11D-11F show how earpieces of foldable headphones can be folded towards an exterior-facing surface of a deformable band region.
Figure 11E:
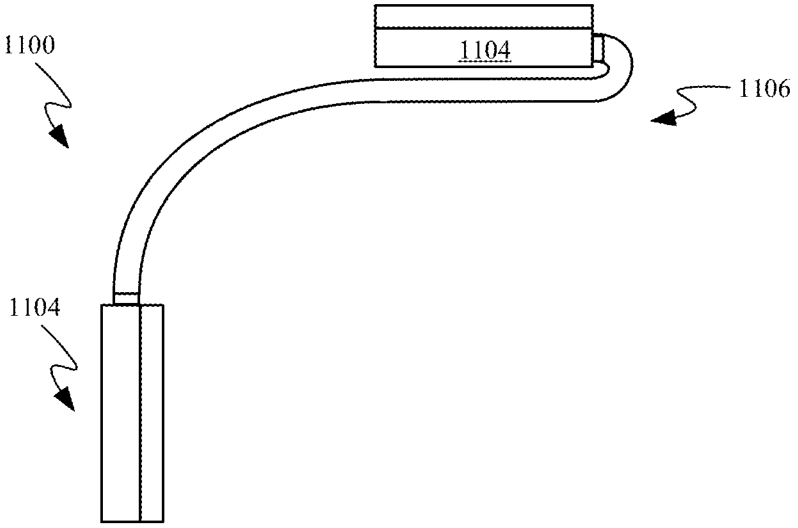
Figure 11F:
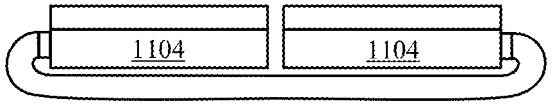

FIGS. 11D-11F show how earpieces 1104 of headphones 1150 can be folded towards an exterior-facing surface of deformable band region 1108. FIG. 11D shows headphones 11D in an arched state. In FIG. 11E, one of earpieces 1104 is folded towards the exterior-facing surface of deformable band region 1108. Once earpiece 1104 is in place as depicted, the force exerted in moving earpiece 1104 to this position can place one side of deformable headband assembly 1102 in a flattened state while the other side stays in the arched state. In FIG. 11F, the second earpiece 1104 is also shown folded against the exterior-facing surface of deformable band region 1108.

Figure 12A:
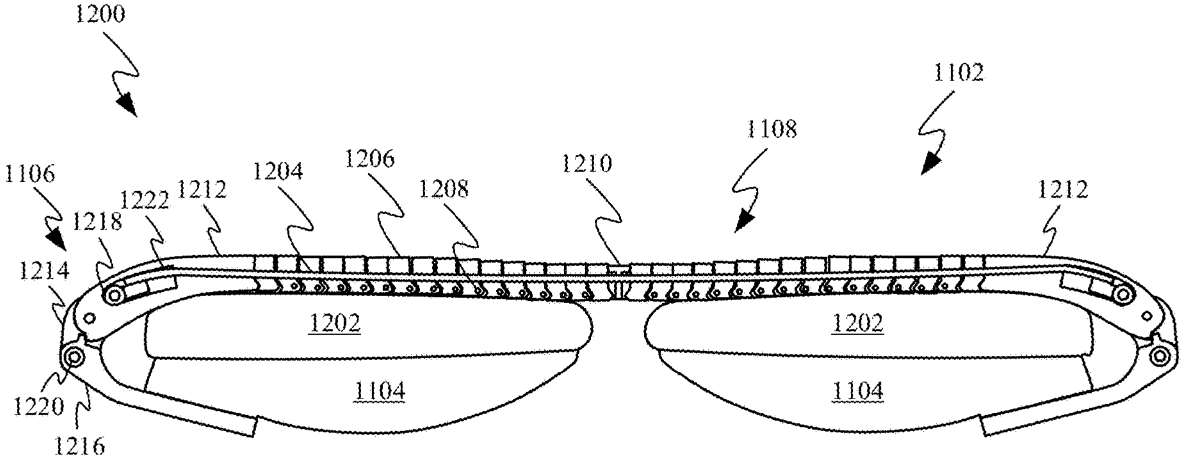
FIGS. 12A-12B show a headphones embodiment that can be transitioned from an arched state to a flattened state by pulling on opposing sides of a spring band.
Figure 12B:
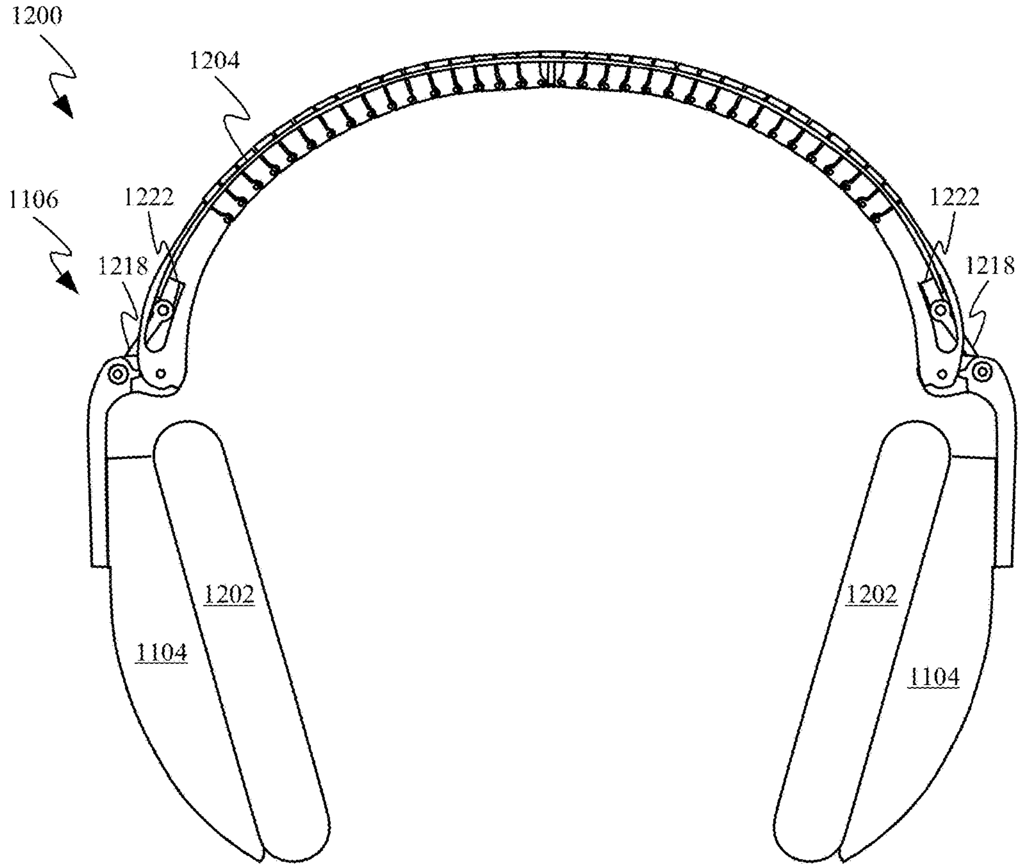

FIGS. 12A-12B show a headphones embodiment in which the headphones can be transitioned from an arched state to a flattened state by pulling on opposing ends of a spring band. FIG. 12A shows headphones 1200, which can be, for example, headphones 1100 shown in FIG. 11, in a flattened state. In the flattened state, earpieces 1104 are aligned in the same plane so that each of ear pads 1202 face in substantially the same direction. In some embodiments, headband assembly 1102 contacts opposing sides of each of ear pads 1202 in the flattened state. Deformable band region 1108 of headband assembly 1102 includes spring band 1204 and segments 1206. Spring band 1204 can be prevented from returning headphones 1200 to the arched state by locking components of foldable stem regions 1106 exerting pulling forces on each end of spring band 1204. Segments 1206 can be connected to adjacent segments 1206 by pins 1208. Pins 1208 allow segments to rotate relative to one another so that the shape of segments 1206 can be kept together but also be able to change shape to accommodate an arched state. Each of segments 1206 can also be hollow to accommodate spring band 1204 passing through each of segments 1206. A central or keystone segment 1206 can include fastener 1210, which engages the center of spring band 1204. Fastener 1210 isolates the two side of spring band 1204 allowing for earpieces 1104 to be sequentially rotated into the flattened state as depicted in FIG. 11B.

FIG. 12A also shows each of foldable stem regions 1106 which include three rigid linkages joined together by pins that pivotally couple upper linkage 1212, middle linkage 1214 and lower linkage 1216 together. Motion of the linkages with respect to each other can also be at least partially governed by spring pin 1218, which can have a first end coupled to a pin 1220 joining middle linkage 1214 to lower linkage 1216 and a second end engaged within a channel 1222 defined by upper linkage 1212. The second end of spring pin 1218 can also be coupled to spring band 1204 so that as the second end of spring pin 1218 slides within channel 1222 the force exerted upon spring band 1204 changes. Headphones 1200 can snap into the flattened state once the first end of spring pin 1218 reaches an over-center locking position. The over-center locking position keeps earpiece 1104 in the flattened position until the first end of spring pin 1218 is moved far enough to be released from the over-center locking position. At that point, earpiece 1104 returns to its arched state position.

FIG. 12B shows headphones 1200 arranged in an arched state. In this state, spring band 1204 is in a relaxed state where a minimal amount of force is being stored within spring band 1204. In this way, the neutral state of spring band 1204 can be used to define the shape of headband assembly 1102 in the arched state when not being actively worn by a user. FIG. 12B also shows the resting state of the second end of spring pins 1218 within channels 1222 and how the corresponding reduction in force on the end of spring band 1204 allows spring band 1204 to help headphones 1200 assume the arched state. It should be noted that while substantially all of spring band 1204 is depicted in FIGS. 12A-12B that spring band 1204 would generally be hidden by segments 1206 and upper linkages 1212.

Figure 12C:
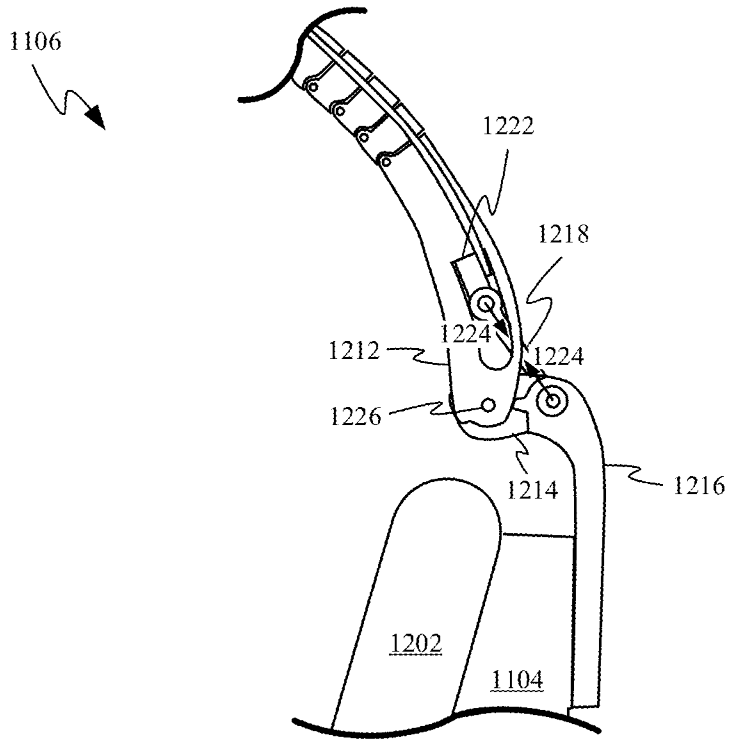
FIGS. 12C-12D show side views of a foldable stem region in arched and flattened states, respectively.
Figure 12D:
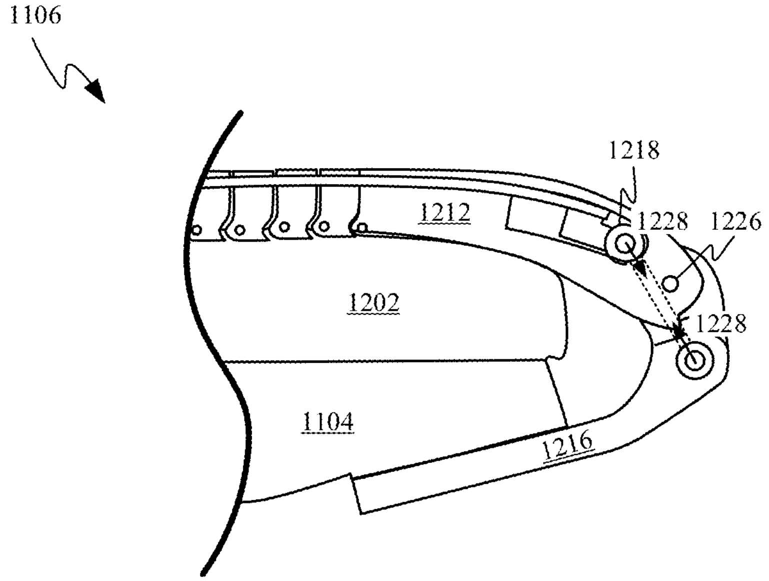

FIGS. 12C-12D show side views of foldable stem region 1106 in arched and flattened states, respectively. FIG. 12C shows how forces 1224 exerted by spring pin 1218 operate to keep linkages 1212, 1214 and 1216 in the arched state. In particular, spring pin 1218 keeps the linkages in the arched state by preventing upper linkage 1212 from rotating about pin 1226 and away from lower linkage 1216. FIG. 12D shows how forces 1228 exerted by spring pin 1218 operate to keep linkages 1212, 1214 and 1216 in the flattened state. This bi-stable behavior is made possible by spring pin 1218 being shifted to an opposite side of the axis of rotation defined by pin 1226 in the flattened state. In this way, linkages 1212-1216 are operable as an over-center locking mechanism. In the flattened state, spring pin 1218 resists transitioning the headphones from moving from the flattened state to the arched state; however, a user exerting a sufficiently large rotational force on earpiece 1104 can overcome the forces exerted by spring pin 1218 to transition the headphones between the flat and arched states.

Figure 12E:
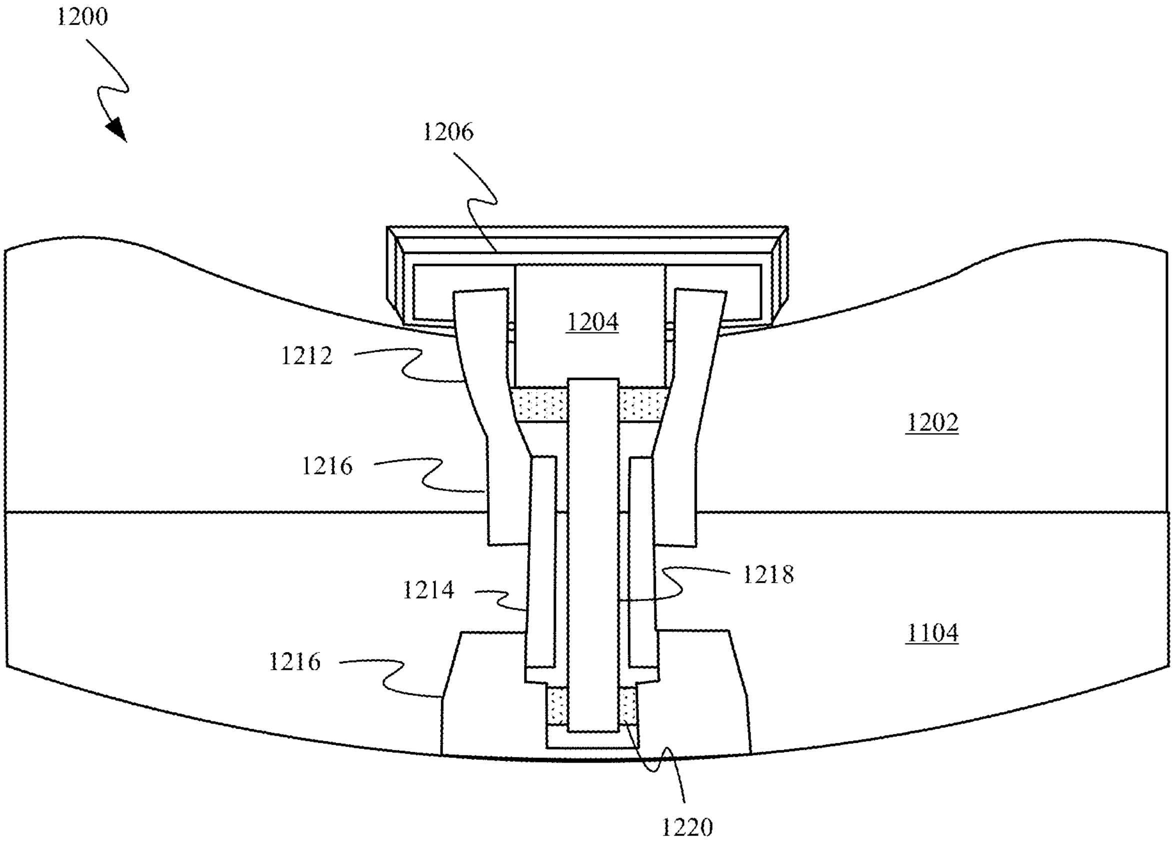
FIG. 12E shows a side view of one end of the headphones depicted in FIG. 12D.

FIG. 12E shows a side view of one end of headphones 1200 in the flattened state. In this view, ear pads 1202 are shown with a contour configured to conform to the curvature of the head of a user. The contour of ear pads 1202 can also help to prevent headband assembly 1102 and particularly segments 1206 making up headband assembly 1102 from protruding substantially farther vertically than ear pads 1202. In some embodiments, the depression of the central portion of ear pads 1202 can be caused at least in part by pressure exerted on them by segments 1206.

Figure 13A:
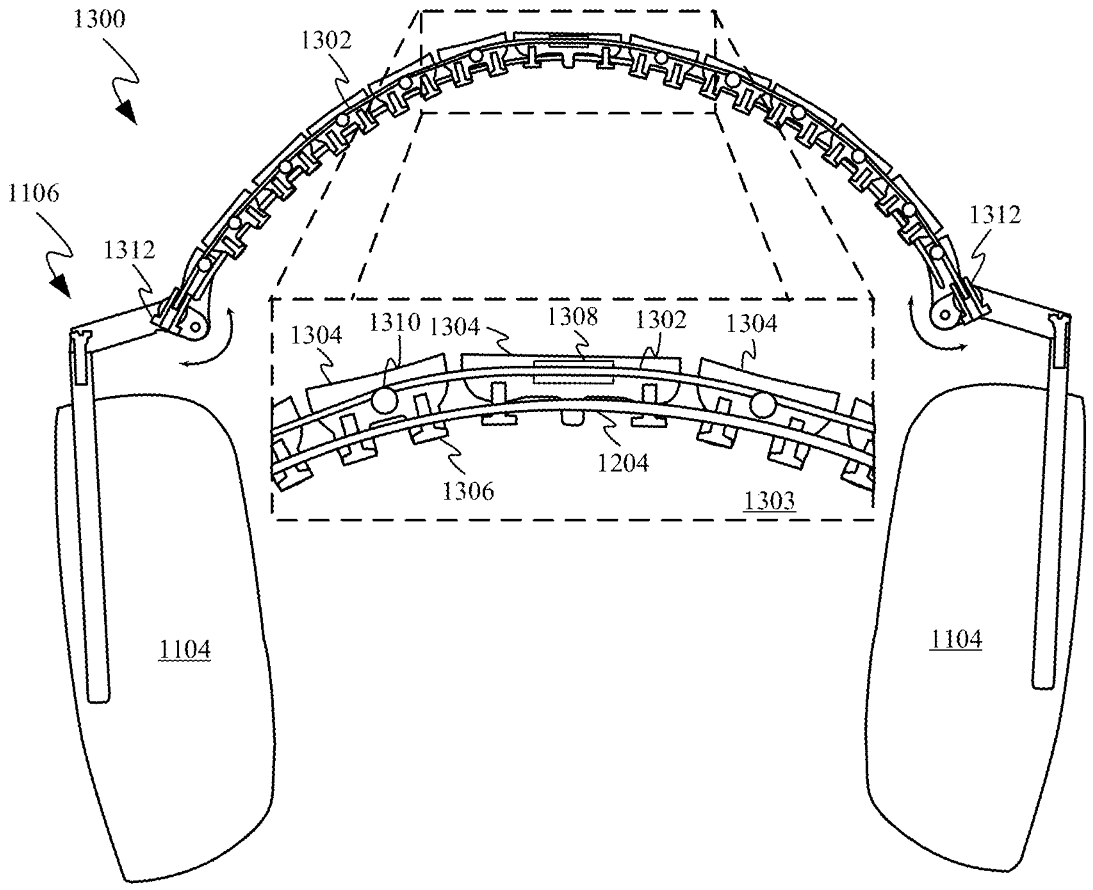
FIGS. 13A-13B show partial cross-sectional views of headphones using an off-axis cable to transition between an arched state and a flattened states.
Figure 13B:
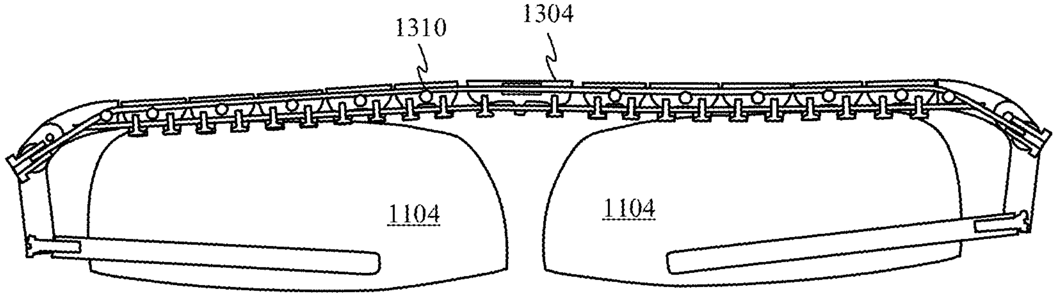

FIGS. 13A-13B show partial cross-sectional views of headphones 1300, which use an off-axis cable to transition between an arched state and a flattened state. FIG. 13A shows a partial cross-sectional view of headphones 1300 in an arched state. Headphones 1300 differ from headphones 1200 in that when earpieces 1104 are rotated towards headband assembly 1102 a cable 1302 is tightened in order to flatten deformable band region 1108 of headband assembly 1102. Cable 1302 can be formed from a highly elastic cable material such as Nitinol™, a Nickel Titanium alloy. Close-up view 1303 shows how deformable band region 1108 can include many segments 1304 that are fastened to spring band 1204 by fasteners 1306. In some embodiments, fasteners 1306 can also be secured to spring band 1204 by an O-ring to prevent any rattling of fasteners 1306 while using headphones 1300. A central one of segments 1304 can include a sleeve 1308 that prevents cable 1302 from sliding with respect to the central one of segments 1304. The other segments 1304 can include metal pulleys 1310 that keep cable 1302 from experiencing substantial amounts of friction as cable 1302 is pulled on to flatten headphones 1300. FIG. 13A also shows how each end of cable 1302 is secured to a rotating fastener 1312. As foldable stem region 1106 rotates, rotating fasteners 1312 keeps the ends of cable 1302 from twisting.

FIG. 13B shows a partial cross-sectional view of headphones 1300 in a flattened state. Rotating fasteners 1312 are shown in a different rotational position to accommodate the change in orientation of cable 1302. The new location of rotating fasteners 1312 also generates an over-center locking position that prevents headphones 1300 from being inadvertently returned to the arched state as described above with respect to headphones 1200. FIG. 13B also shows how the curved geometry of each of segments 1304 allows segments 1304 to rotate with respect to one another in order to transition between the arched and flattened states. In some embodiments, cable 1302 can also be operative to limit a range of motion of spring band 1204 similar in some ways to the embodiment shown in FIGS. 9A-9B.

Figure 14A:
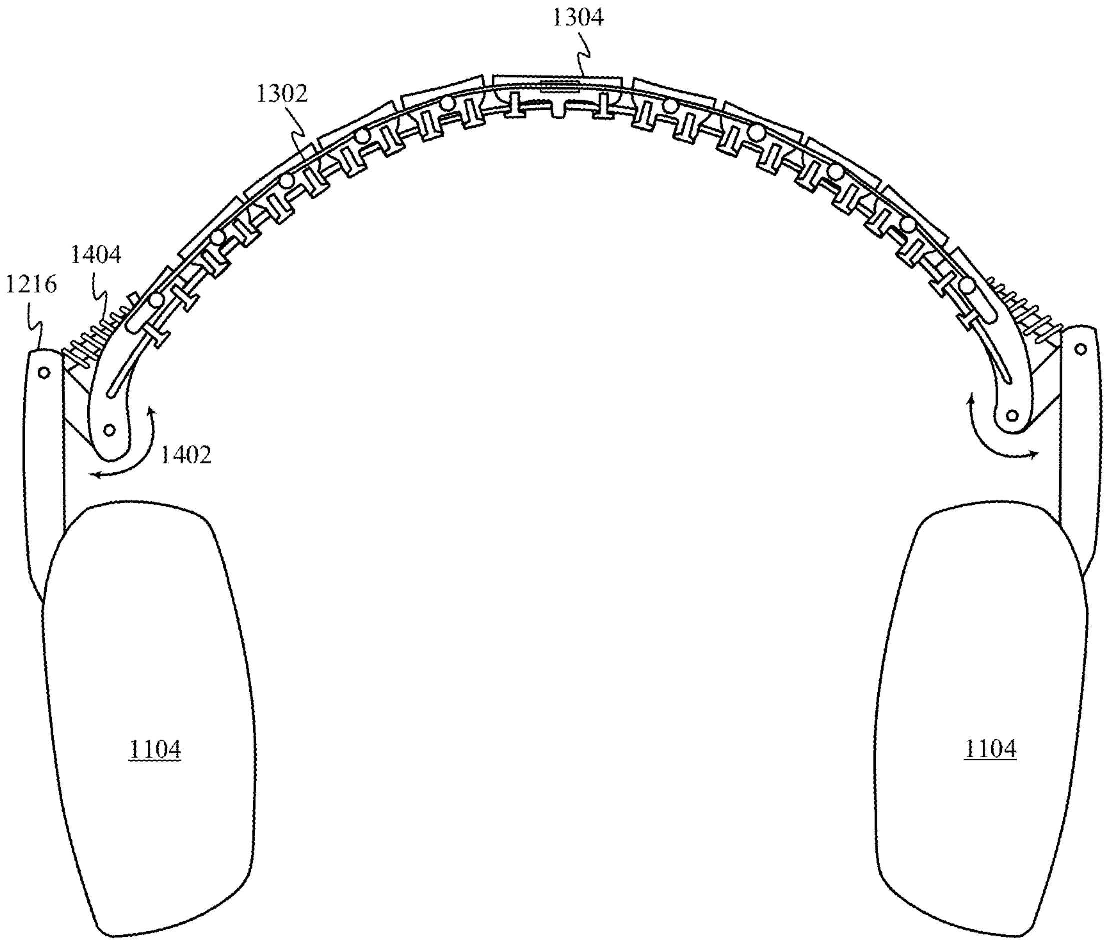
FIGS. 14A-14C show partial cross-sectional views of headphones having a foldable stem region constrained at least in part by an elongating pin that delays flattening of the headphones through a first portion of the travel of the earpieces of the headphones.
Figure 14B:
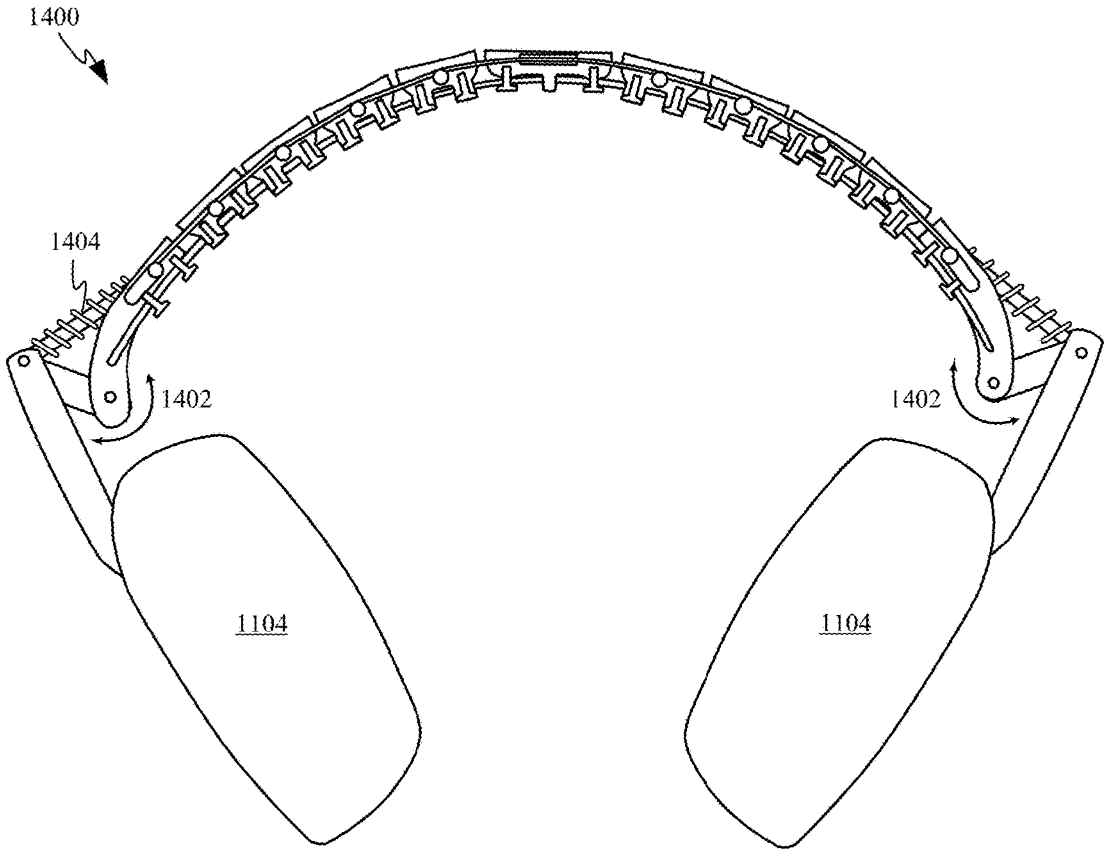
Figure 14C:
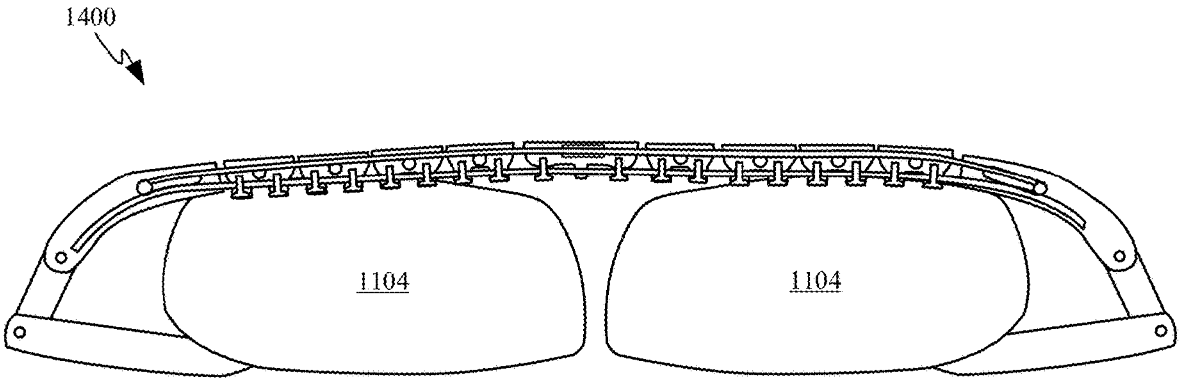

FIG. 14A shows headphones 1400 that are similar to headphones 1300. In particular, headphones 1400 also use cable 1302 to flatten deformable band region 1108. Furthermore, a central portion of cable 1302 is retained by the central segment 1304. In contrast, lower linkage 1216 of foldable stem region 1106 is shifted upward with respect to lower linkage 1216 depicted in FIG. 12A. When earpiece 1104 is rotated about axis 1402 towards deformable band region 1108, spring pin 1404 is configured to elongate as shown in FIG. 14B during a first portion of the rotation. In some embodiments, elongation of spring pin 1404 can allow earpiece to rotate about 30 degrees from an initial position. Once spring pins 1404 reach their maximum length further rotation of earpieces 1104 about axes 1402 results in cable 1302 being pulled, which causes deformable band region 1108 to change from an arched geometry to a flat geometry as shown in FIG. 14C. The delayed pulling motion changes the angle from which cable 1302 is initially pulled. The changed initial angle can make it less likely for cable 1302 to bind when transitioning headphones 1400 from the arched state to the flattened state.

Figure 15A:
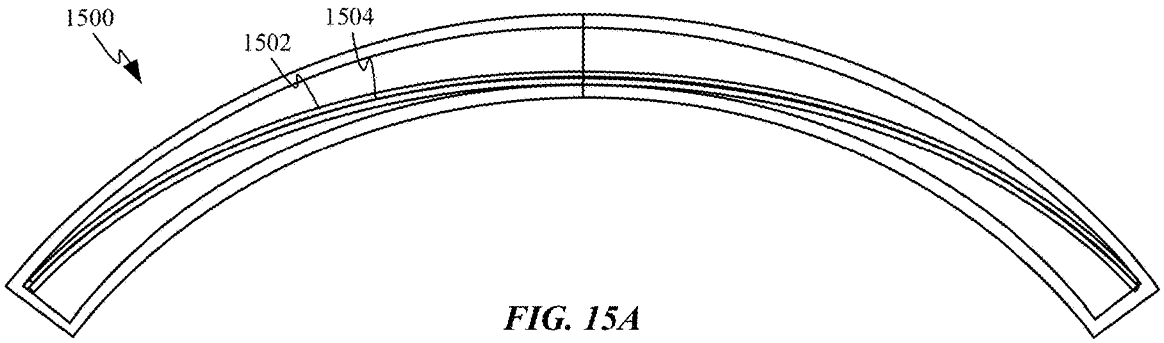
FIGS. 15A-15F show various views of headband assembly 1500 from different angles and in different states.
Figure 15B:
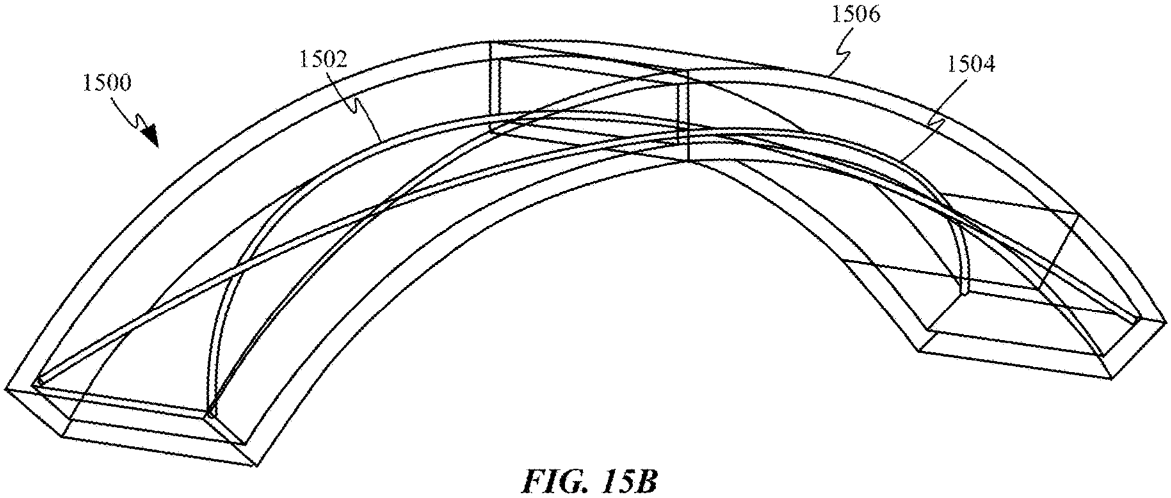
Figure 15C:
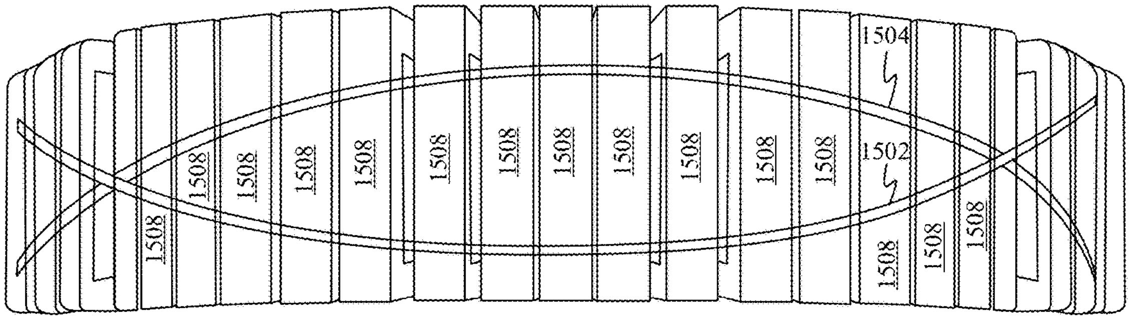

FIGS. 15A-15F show various views of headband assembly 1500 from different angles and in different states. Headband assembly 1500 has a bi-stable configuration that accommodates transitioning between flattened and arched states. FIGS. 15A-15C depict headband assembly 1500 in an arched state. Bi-stable wires 1502 and 1504 are depicted within a flexible headband housing 1506. Headband housing can be configured to change shape to accommodate at least the flattened and arched states. Bi-stable wires 1502 and 1504 extend from one end of headband housing 1506 to another and are configured to apply a clamping force through earpieces attached to opposing ends of headband assembly 1500 to a user's head to keep an associated pair of headphone securely in place during use. FIG. 15C in particular shows how headband housing 1506 can be formed from multiple hollow links 1508, which can be hinged together and cooperatively form a cavity within which bi-stable wires 1502 are able to transition between configurations corresponding to the arched and flattened states. Because links 1508 are only hinged on one side, the links are only able to move to the arched state in one direction. This helps avoid the unfortunate situation where headband assembly 1500 is bent the wrong direction, thereby position the earpieces in the wrong direction.

Figure 15D:
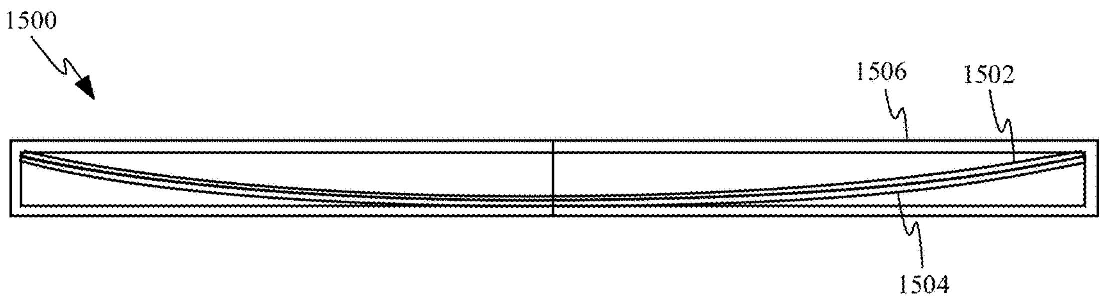
Figure 15E:
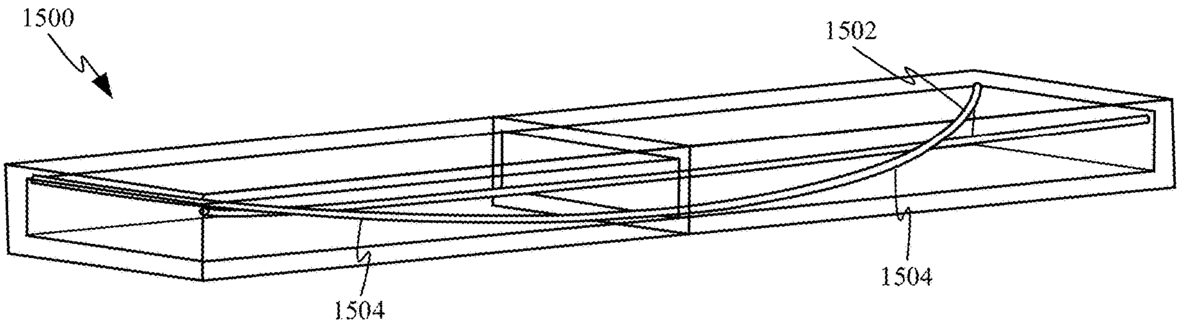
Figure 15F:
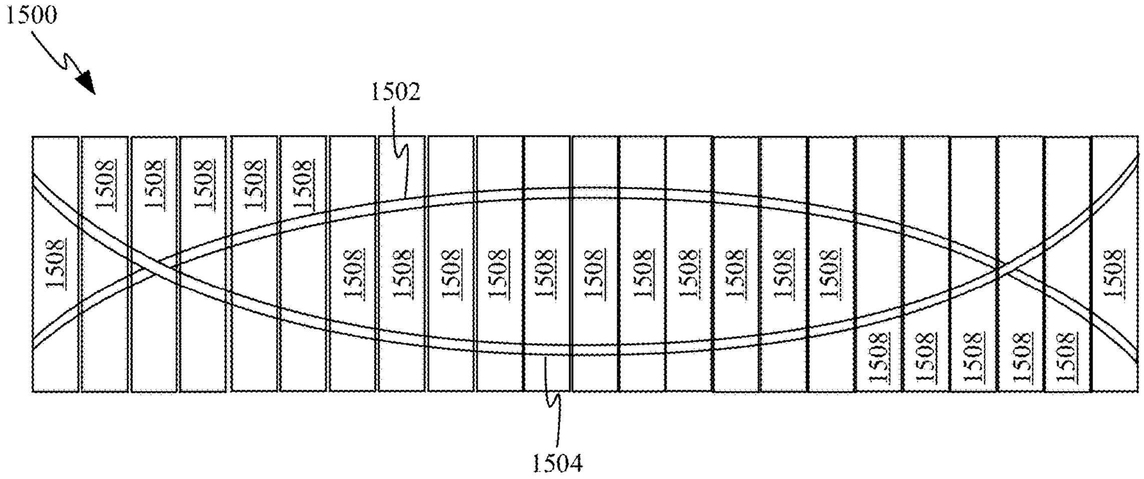

FIGS. 15D-15F show headband assembly in a flattened state. Because the ends of bi-stable wires 1502 and 1504 have passed an over-center point where the ends of wires 1502 and 1504 are higher than a central portion of bi-stable wires 1502 and 1504, the bi-stable wires 1502 now help keep headband assembly 1500 in the flattened state. In some embodiments, bi-stable wires 1502 can also be used to carry signals and/or power through headband assembly 1500 from one earpiece to another.

Figure 16A:
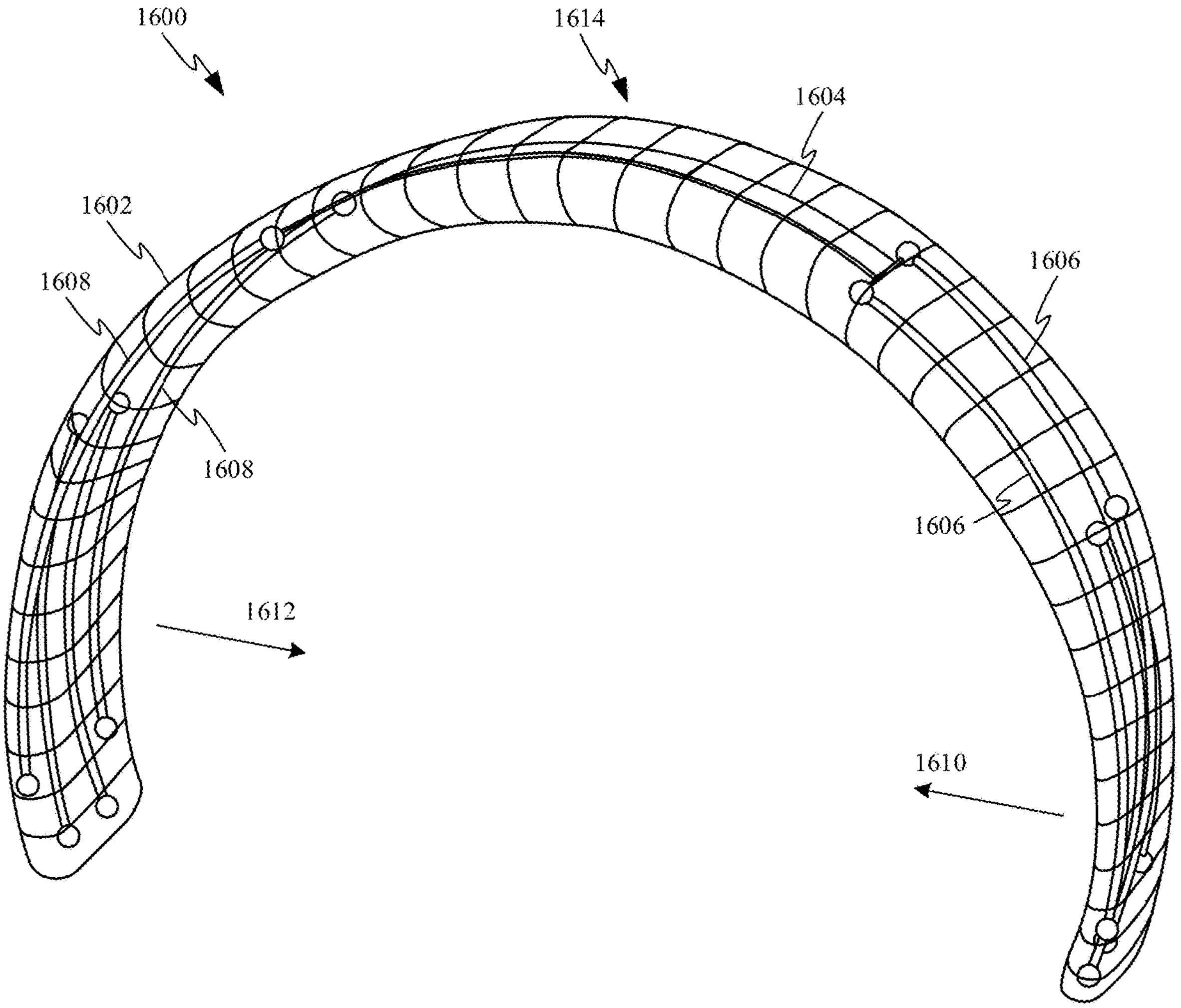
FIGS. 16A-16B show a headband assembly in folded and arched states.
Figure 16B:
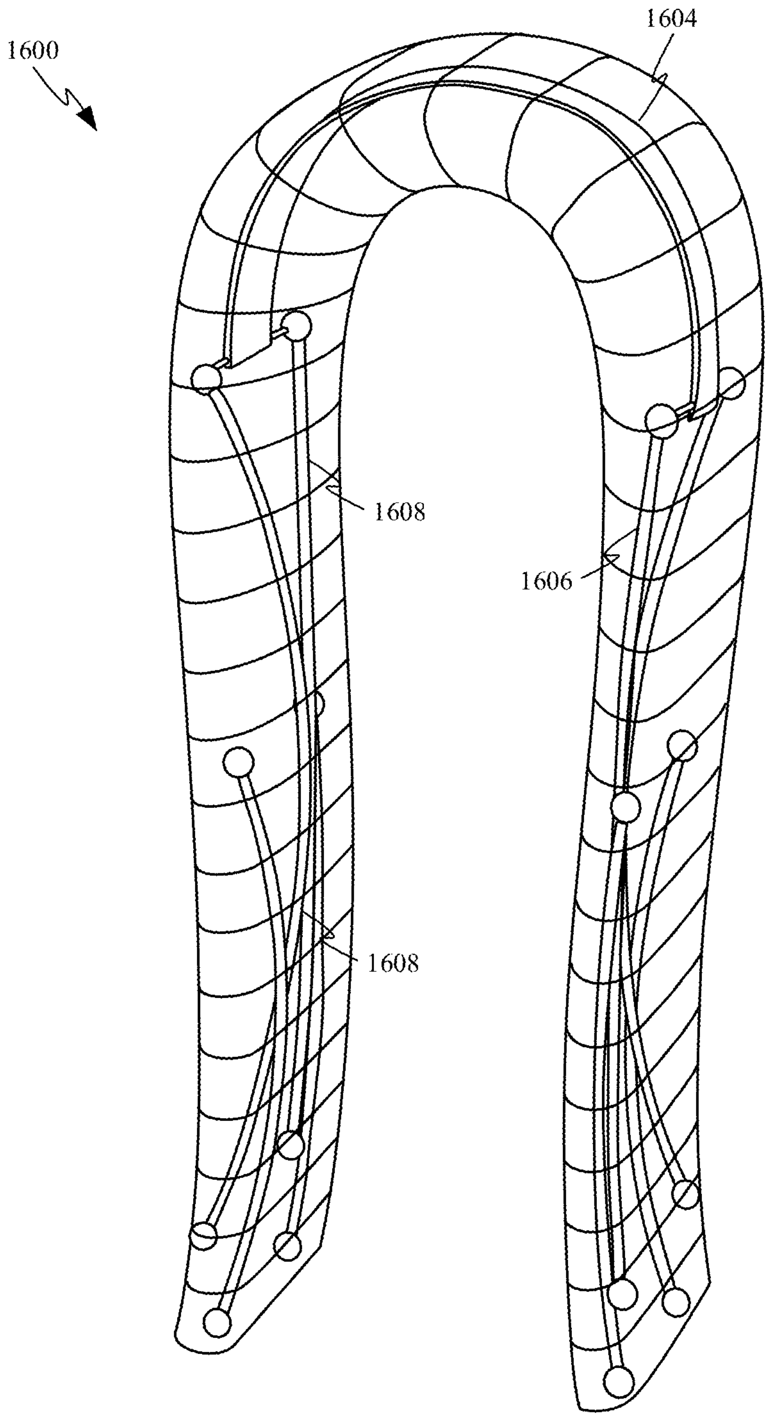

FIGS. 16A-16B show headband assembly 1600 in folded and arched states. FIG. 16A shows headband assembly 1600 in the arched state. Headband assembly, similarly to the embodiment shown in FIGS. 15C and 15F includes multiple hollow links 1602 that cooperatively form a flexible headband housing that define an interior volume. Passive linkage hinge 1604 can be positioned within a central portion of the interior volume and link bi-stable elements 1606 together. FIG. 16A shows bi-stable elements 1606 and 16008 in arched configurations that resist forces acting to squeeze opposing sides of headband assembly 1600. Once opposing sides of headband assembly 1600 are pushed together, in the directions indicated by arrows 1610 and 1612, with enough force to overcome the resistance forces generated by bi-stable elements 1606 and 1608, headband assembly 1600 can transition from the arched state depicted in FIG. 16A to the flattened state depicted in FIG. 16B. Passive linkage hinge 1604 accommodates headphone assembly 1600 being folding around a central region 1614 of headband assembly 1600. FIG. 16B shows how passive linkage hinge 1604 bends to accommodate the flattened state of headband assembly 1600. Bi-stable elements 1606 and 1608 are shown configured in folded configurations in order to bias the opposing sides of headband assembly 1600 toward one another, thereby opposing an inadvertent change in state. The folded configuration, depicted in FIG. 16B, has the benefit of taking up a substantially smaller amount of space by allowing the open area defined by headband assembly 1600 for accommodating the head of a user to be collapsed so that headband assembly 1600 can take up less space when not in active use.

Figure 17A:
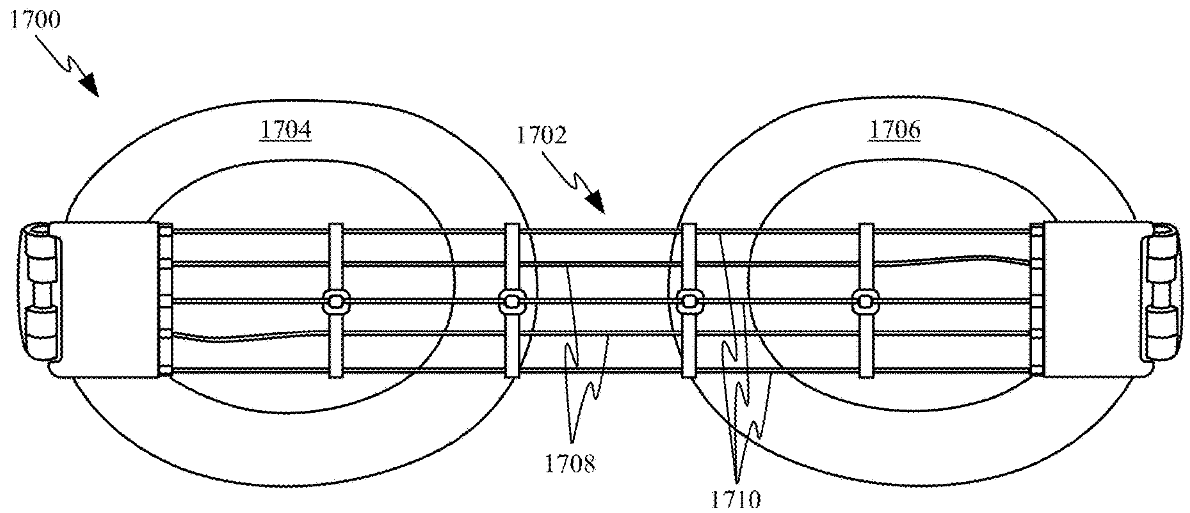
FIGS. 17A-17B show views of another foldable headphones embodiment.
Figure 17B:
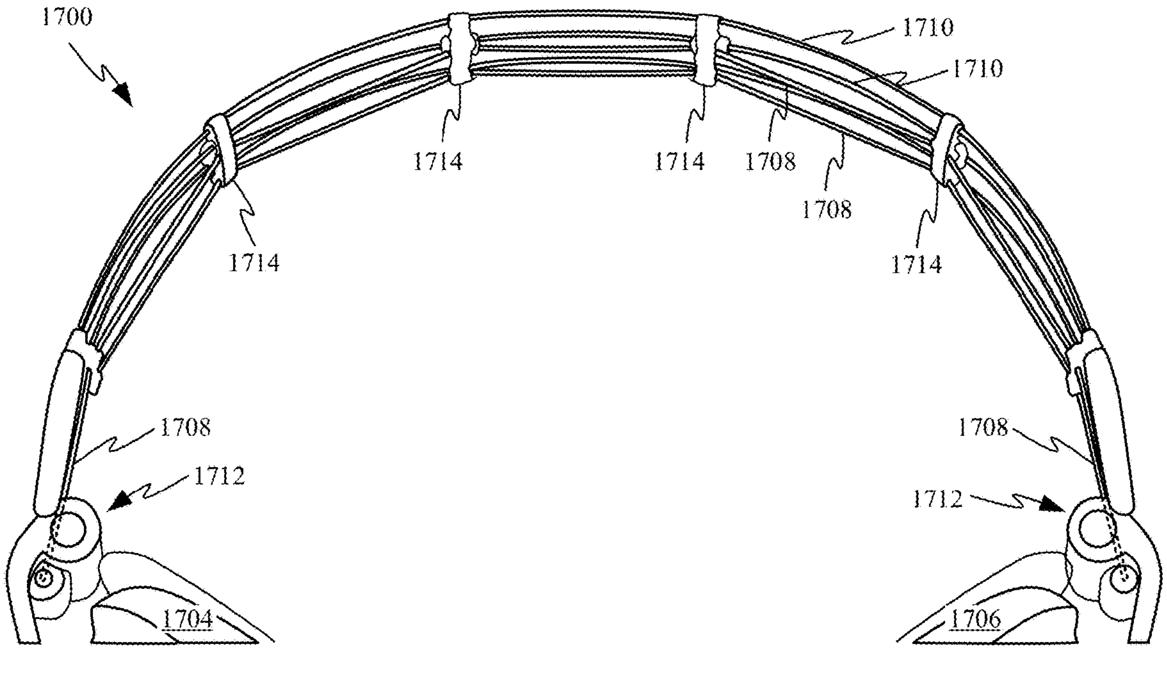

FIGS. 17A-17B show various views of foldable headphones 1700. In particular, FIG. 17A shows a top view of headphones 1700 in a flattened state. Headband 1702, which extends between earpieces 1704 and 1706, includes wires 1708 and springs 1710. In the depicted flattened state, wires 1708 and spring 1710 are straight and in a relaxed state or neutral state. FIG. 17B shows a side view of headphones 1700 in an arched state. Headphones 1700 can be transitioned from the flattened state depicted in FIG. 17A to the arched state depicted in FIG. 17B by rotating earpieces 1704 and 1706 away from headband 1702. Earpieces 1704 and 1706 each include an over-center mechanism 1712 that applies tension to the ends of wires 1708 to keep wires 1708 in tension in order to maintain an arched state of headband 1702. Wires 1708 help maintain the shape of headband 1702 by exerting forces at multiple locations along springs 1710 through wire guides 1714, which are distributed at regular intervals along headband 1702.

While each of the aforementioned improvements has been discussed in isolation it should be appreciated that any of the aforementioned improvements can be combined. For example, the synchronized telescoping earpieces can be combined with the low spring-rate band embodiments. Similarly, off-center pivoting earpiece designs can be combined with the deformable form-factor headphones designs. In some embodiments, each type of improvement can be combined together to produce headphones with all the described advantages.

Headphones are disclosed and include the following: a first earpiece; a second earpiece; and a headband coupling the first and second earpieces together and being configured to synchronize a movement of the first earpiece with a movement of the second earpiece such that a distance between the first earpiece and a center of the headband remains substantially equal to a distance between the second earpiece and the center of the headband.

In some embodiments, the headband comprises a loop of cable routed therethrough.

In some embodiments, a first stem of the first earpiece is coupled to the loop of cable and a second stem of the second earpiece is coupled to the loop of cable.

In some embodiments, the loop of cable is configured to route an electrical signal from the first earpiece to the second earpiece.

In some embodiments the headband includes two parallel leaf springs defining a shape of the headband.

In some embodiments, the headband includes a gear disposed in a central portion of the headband and engaged with gear teeth of stems associated with the first and second earpieces.

In some embodiments the headband includes a loop of wire disposed within the headband, a first stem wire coupling the first earpiece to a first side of the loop of wire, and a second stem wire coupling the second earpiece to a second side of the loop of wire.

In some embodiments, the headphones also include a data synchronization cable extending from the first earpiece to the second earpiece through a channel defined by the headband, the data synchronization cable carrying signals between electrical components of the first and second earpieces.

In some embodiments, a first portion of the data synchronization cable is coiled around the first stem wire and a second portion of the data synchronization cable is coiled around the second stem wire.

Headphones are disclosed and include the following: a headband having a first end and a second end opposite the first end; a first earpiece coupled to the headband a first distance from the first end; a second earpiece coupled to the headband a second distance from the second end; and a cable routed through the headband and mechanically coupling the first earpiece to the second earpiece, the cable being configured to maintain the first distance substantially the same as the second distance by changing the first distance in response to a change in the second distance.

In some embodiments, the cable is arranged in a loop and the first earpiece is coupled to a first side of the loop and the second earpiece is coupled to a second side of the loop.

In some embodiments, the headphones also include stem housings coupled to opposing ends of the headband, each of the stem housings enclosing a pulley about which the cable is wrapped.

In some embodiments, the headphones also include wire guides distributed across the headband and defining a path of the cable through the headband.

Headphones are disclosed and include the following: a first earpiece; a second earpiece; a headband assembly coupling the first and second earpieces together and comprising an earpiece synchronization system, the earpiece synchronization system configured to change a first distance between the first earpiece and the headband assembly concurrently with a change in a second distance between the second earpiece and the headband assembly.

In some embodiments, the headphones also include first and second members coupled to opposing ends of the headband assembly, each of the first and second members being configured to telescope relative to a channel defined by a respective end of the headband assembly.

In some embodiments, the earpiece synchronization system includes a first stem wire coupled to the first earpiece and a second stem wire coupled to the second earpiece.

In some embodiments, the first stem wire is coupled to the second stem wire in a channel disposed within a central region of the headband assembly.

In some embodiments, the headphones also include a reinforcement member disposed within the headband assembly and defining the channel within which the first and second stem wires are coupled together.

In some embodiments, the earpiece synchronization system includes a first stem wire having a first end coupled to the first earpiece and a second end coupled to a second end of the second stem wire and wherein a first end of the second stem wire is coupled to the second earpiece.

In some embodiments, the second end of the first stem wire is oriented in the same direction as the second end of the second stem wire.

Headphones are disclosed and include the following: a first earpiece; a second earpiece; a headband coupling the first earpiece to the second earpiece; earpiece position sensors configured to measure an angular orientation of the first and second earpieces with respect to the headband; and a processor configured to change an operational state of the headphones in accordance with the angular orientation of the first and second earpieces.

In some embodiments, changing the operational state of the headphones comprises switching audio channels routed to the first and second earpieces.

In some embodiments, the earpiece position sensors are configured to measure a position of the first and second earpieces relative to respective yaw axes of the earpieces.

In some embodiments, the earpiece position sensors comprise a time of flight sensor.

In some embodiments, the headphones also include a pivot mechanism joining the first earpiece to the headband, wherein the earpiece position sensors comprise a Hall Effect sensor positioned within the pivot mechanism and configured to measure the angular orientation of the first earpiece.

In some embodiments, the operational state is a playback state.

In some embodiments, the headphones also include a secondary sensor disposed within the first earpiece and configured to confirm sensor readings provided by the earpiece position sensors.

In some embodiments, the secondary sensor is a strain gauge.

Headphones are disclosed and also include: a headband; a first earpiece pivotally coupled to a first side of the headband and having a first axis of rotation; a second earpiece pivotally coupled to a second side of the headband and having a second axis of rotation; earpiece position sensors configured to measure an orientation of the first earpiece relative to the first axis of rotation and an orientation of the second earpiece relative to the second axis of rotation; and a processor configured to: place the headphones in a first operational state when the first earpiece is biased in a first direction from a neutral state of the first earpiece and the second earpiece is biased in a second direction opposite the first direction from a neutral state of the second earpiece, and place the headphones in a second operational state when the first earpiece is biased in the second direction from the neutral state of the first earpiece and the second earpiece is biased in the first direction from a neutral state of the second earpiece.

In some embodiments, in the first operational state a left audio channel is routed to the first earpiece and in the second operational state the left audio channel is routed to the second earpiece.

In some embodiments, the earpiece position sensors are time of flight sensors.

In some embodiments, the headphones also include a pivot mechanism configured to accommodate rotation of the first earpiece about the first axis of rotation and about a third axis of rotation substantially orthogonal to the first axis of rotation.

In some embodiments, one of the earpiece position sensors is positioned on a bearing accommodating rotation of the first earpiece about the first axis of rotation.

In some embodiments, the earpiece position sensors comprise a magnetic field sensor and a permanent magnet.

In some embodiments, the magnetic field sensor is a Hall Effect sensor.

In some embodiments, the pivot mechanism comprises a leaf spring that accommodates rotation of the earpiece about the third axis of rotation.

In some embodiments, the earpiece position sensors comprise a strain gauge positioned on the leaf spring for measuring rotation of the first earpiece about the third axis of rotation.

Headphones are disclosed and include the following: a headband; a first earpiece comprising a first earpiece housing; a first pivot mechanism disposed within the first earpiece housing, the first pivot mechanism comprising: a first stem base portion that protrudes though an opening defined by the first earpiece housing, the first stem base portion coupled to a first portion of the headband, and a first orientation sensor configured to measure an angular orientation of the first earpiece relative to the headband; a second earpiece comprising a second earpiece housing; a second pivot mechanism disposed within the second earpiece housing, the second pivot mechanism comprising: a second stem base portion that protrudes though an opening defined by the second earpiece housing, the second stem base portion coupled to a second portion of the headband, and a second orientation sensor configured to measure an angular orientation of the second earpiece relative to the headband; and a processor that sends a first audio channel to the first earpiece when sensor readings received from the first and second orientation sensors are consistent with the first earpiece covering a first ear of a user and is configured to send a second audio channel to the first earpiece when the sensor readings are consistent with the first earpiece covering a second ear of the user.

In some embodiments, the first pivot mechanism accommodates rotation of the first earpiece about two substantially orthogonal axes of rotation.

In some embodiments, the first and second orientation sensors are magnetic field sensors.

Headphones are disclosed and include the following: a first earpiece having a first earpad; a second earpiece having a second earpad; and a headband joining the first earpiece to the second earpiece, the headphones being configured to move between an arched state in which a flexible portion of the headband is curved along its length and a flattened state, in which the flexible portion of the headband is flattened along its length, the first and second earpieces being configured to fold towards the headband such that the first and second earpads contact the flexible headband in the flattened state.

In some embodiments, the headband includes foldable stem regions at each end of the headband, the foldable stem regions coupling the headband to the first and second earpieces and allowing the earpieces to fold toward the headband.

In some embodiments, the foldable stem region comprises an over-center locking mechanism that prevents the headphones from inadvertently transitioning from the flattened state to the arched state.

In some embodiments, the headband is formed from multiple hollow linkages.

In some embodiments, the headphones also include a data synchronization cable electrically coupling the first and second earpieces and extending through the hollow linkages.

Headphones are disclosed and include the following: a first earpiece; a second earpiece; and a headband assembly coupled to both the first and second earpieces, the headband assembly comprising: linkages pivotally coupled together, and an over-center locking mechanism coupling the first earpiece to a first end of the headband assembly and having a first stable position in which the linkages are flattened and a second stable position in which the linkages form an arch.

In some embodiments, the headband assembly further comprises one or more wires extending through the linkages.

In some embodiments, one or more of the linkages comprises a pulley for carrying the one or more wires.

In some embodiments, one of the linkages defines a channel of the over-center locking mechanism.

In some embodiments, the headphones transition from the second stable position to the first stable position when the first and second earpieces are folded toward the headband assembly.

In some embodiments, the first earpiece comprises an earpad having an exterior-facing surface defining a channel sized to receive a portion of the headband assembly in the first stable position.

Headphones are disclosed and include the following: a first earpiece; a second earpiece; and a flexible headband assembly coupled to both the first and second earpieces, the flexible headband assembly comprising: hollow linkages pivotally coupled together and defining an interior volume within the flexible headband assembly, and bi-stable elements disposed within the interior volume and configured to oppose transition of the flexible headband assembly between a first state in which a central portion of the hollow linkages are straightened and a second state in which the hollow linkages form an arch.

In some embodiments, the bi-stable elements have a first geometry when the flexible headband assembly is in the first state and a second geometry different from the first geometry when the flexible headband assembly is in the second state.

In some embodiments, the bi-stable elements comprise wires extending through the hollow linkages.

In some embodiments, the headphones also include an over-center mechanism through which the wires extend.

In some embodiments, the wires are in tension when the flexible headband assembly is in the first state and in a neutral state when the flexible headband assembly is in the second state.

In some embodiments, each of the hollow linkages has a rectangular geometry.

In some embodiments, the hollow linkages are coupled together by pins.

In some embodiments, one or more of the hollow linkages includes a pulley configured to guide one or more of the bi-stable elements through the flexible headband assembly.

In some embodiments, the flexible headband assembly further comprises a spring band extending through the flexible headband assembly.

What is claimed is:

1. An earpiece comprising:
an earpiece housing defining an interior volume;
a speaker disposed within the interior volume; and
a pivot mechanism coupled to the earpiece housing and operable to enable the earpiece housing to rotate about both a roll axis and a yaw axis, the pivot mechanism comprising:
a bearing disposed within the earpiece housing;
a stem having a first end coupled to the headband and a second end coupled to the bearing enabling the stem to rotate about the yaw axis; and
first and second torsional springs disposed on opposite sides of the bearing and configured to oppose rotation of the stem about the roll axis.

2. The earpiece set forth in claim 1 wherein the pivot mechanism further comprises first and second mounting blocks disposed within the earpiece housing, and wherein the first torsional spring is coupled to the first mounting block and the second torsional spring is coupled to the second mounting block.

3. The earpiece set forth in claim 2 wherein the pivot mechanism further comprises a first fastener that couples the first mounting block to the earpiece housing and a second fastener that couples the second mounting block to the earpiece housing.

4. The earpiece set forth in claim 1 wherein the stem is coupled to the bearing by a threaded cap that allows the stem to twist about the yaw axis.

5. The earpiece set forth in claim 4 wherein the threaded cap defines a plurality of mechanical stops that limit a range of motion through which the stem can twist.

6. The earpiece set forth in claim 1 wherein the pivot mechanism further comprises a magnet and a sensor, the sensor configured to detect a change in a magnetic field of the magnet to detect rotation of the pivot mechanism about the roll axis.

7. The earpiece set forth in claim 1 wherein the pivot mechanism further comprises a magnet coupled to the stem and a sensor, the sensor configured to detect a change in a magnetic field of the magnet to detect rotation of the stem about the yaw axis.

8. The earpiece set forth in claim 1 wherein the pivot mechanism further comprises:
a first magnet and a first sensor, the first sensor configured to detect a change in a magnetic field of the first magnet to detect rotation of the pivot mechanism about the roll axis; and
a second magnet coupled to the stem and a second sensor, the second sensor configured to detect a change in a magnetic field of the second magnet to detect rotation of the stem about the roll axis.

9. An earpiece comprising:
an earpiece housing defining an interior volume;
a speaker disposed within the interior volume; and
a pivot mechanism coupled to the earpiece housing and operable to enable the earpiece housing to rotate, with respect to the headband, about both a roll axis and a yaw axis, the pivot mechanism comprising:

a bearing disposed within the earpiece housing;

a stem having a first end coupled to the headband and a second end coupled to the bearing by a threaded cap that enables the stem to twist about the yaw axis and defines a plurality of mechanical stops that limit the range of motion through which the stem can twist;

first and second mounting blocks disposed within the earpiece housing; and first and second torsional springs disposed on opposite sides of the bearing and configured to oppose rotation of the stem about the roll axis, the first torsional spring coupled to the first mounting block and the second torsional spring coupled to the second mounting block.

10. The earpiece set forth in claim 9 wherein the pivot mechanism further comprises a magnet and a sensor, the sensor configured to detect a change in a magnetic field of the magnet to detect rotation of the pivot mechanism about the roll axis.

11. The earpiece set forth in claim 9 wherein the pivot mechanism further comprises a magnet coupled to the stem and a sensor, the sensor configured to detect a change in a magnetic field of the magnet to detect rotation of the stem about the yaw axis.

12. The earpiece set forth in claim 9 wherein the pivot mechanism further comprises:

a first magnet and a first sensor, the first sensor configured to detect a change in a magnetic field of the first magnet to detect rotation of the pivot mechanism about the roll axis; and a second magnet coupled to the stem and a second sensor, the second sensor configured to detect a change in a magnetic field of the second magnet to detect rotation of the stem about the roll axis.

13. Headphones comprising:

a headband having first and second opposing ends;

a first earpiece pivotably coupled to the first end of the headband; and a second earpiece pivotably coupled to the second end of the headband;

wherein each of the first and second earpieces comprises:

an earpiece housing defining an interior volume;

a speaker disposed within the interior volume; and a pivot mechanism coupled to the earpiece housing and operable to enable the earpiece housing to rotate, with respect to the headband, about both a roll axis and a yaw axis, the pivot mechanism comprising:

a bearing disposed within the earpiece housing;

a stem having a first end coupled to the headband and a second end coupled to the bearing enabling the stem to rotate about the yaw axis; and first and second torsional springs disposed on opposite sides of the bearing and configured to oppose rotation of the stem about the roll axis.

14. The headphones set forth in claim 13 wherein the pivot mechanism further comprises first and second mounting blocks disposed within the earpiece housing, and wherein the first torsional spring is coupled to the first mounting block and the second torsional spring is coupled to the second mounting block.

15. The headphones set forth in claim 14 wherein the pivot mechanism further comprises a first fastener that couples the first mounting block to the earpiece housing and a second fastener that couples the second mounting block to the earpiece housing.

16. The headphones set forth in claim 13 wherein the stem in each of the first and second earpieces is coupled to its respective bearing by a threaded cap that allows the stem to twist about the yaw axis.

17. The headphones set forth in claim 16 wherein the threaded cap in each of the first and second earpieces defines a plurality of mechanical stops that limit the range of motion through which its respective stem can twist.

18. The headphones set forth in claim 13 wherein the pivot mechanism in each of the first and second earpieces further comprises a magnet and a sensor, the sensor configured to detect a change in a magnetic field of the magnet to detect rotation of the pivot mechanism about the roll axis.

19. The headphones set forth in claim 13 wherein the pivot mechanism in each of the first and second earpieces further comprises a magnet coupled to the stem and a sensor, the sensor configured to detect a change in a magnetic field of the magnet to detect rotation of the stem about the yaw axis.

20. The headphones set forth in claim 13 wherein the pivot mechanism in each of the first and second earpieces further comprises:

a first magnet and a first sensor, the first sensor configured to detect a change in a magnetic field of the first magnet to detect rotation of the pivot mechanism about the roll axis; and a second magnet coupled to the stem and a second sensor, the second sensor configured to detect a change in a magnetic field of the second magnet to detect rotation of the stem about the roll axis.

* * * * *